US009510981B2

(12) United States Patent
Lambarth et al.

(10) Patent No.: US 9,510,981 B2
(45) **Date of Patent: *Dec. 6, 2016**

(54) RECONFIGURABLE TRANSPORT APPARATUS

(71) Applicant: Stryker Corporation, Kalamazoo, MI (US)

(72) Inventors: Clifford Edwin Lambarth, Portage, MI (US); Jason James Wroblewski, Kalamazoo, MI (US); Brandon David Naber, Portage, MI (US); Alfred James Dacy, IV, Mendon, MI (US); Thomas Alan Puvogel, Kalamazoo, MI (US); Ross Timothy Lucas, Paw Paw, MI (US)

(73) Assignee: Stryker Corporation, Kalamazoo, MI (US)

( * ) Notice: Subject to any disclaimer, the term of this patent is extended or adjusted under 35 U.S.C. 154(b) by 174 days.

This patent is subject to a terminal disclaimer.

(21) Appl. No.: 14/206,151

(22) Filed: Mar. 12, 2014

(65) Prior Publication Data

US 2014/0265181 A1 Sep. 18, 2014

Related U.S. Application Data

(60) Provisional application No. 61/806,189, filed on Mar. 28, 2013, provisional application No. 61/781,844, (Continued)

(51) Int. Cl.

*B62B 1/00* (2006.01)
*A61G 1/017* (2006.01)
(Continued)

(52) U.S. Cl.

CPC ................. *A61G 1/017* (2013.01); *A61G 1/02* (2013.01); *A61G 1/0275* (2013.01); (Continued)

(58) Field of Classification Search

CPC ...... A61G 1/017; A61G 1/0567; A61G 5/061; A61G 1/0275; A61G 5/006; A61G 1/02; A61G 2007/0513; A61G 1/0262; A61G 1/0212; A61G 2007/165

See application file for complete search history.

(56) References Cited

U.S. PATENT DOCUMENTS 3,644,944 A * 2/1972 Bourgraf .............. A61G 1/0567 296/20
3,786,523 A * 1/1974 Sele ....................... A61G 5/006 5/87.1

(Continued)

FOREIGN PATENT DOCUMENTS

CA 2481694 A1 10/2003
CN 2548611 Y 5/2003

(Continued)

OTHER PUBLICATIONS

PCT International Search Report regarding Application No. PCT/US2014/026370 filed Mar. 13, 2014, a counterpart to U.S. Appl. No. 14/206,151.

(Continued)

*Primary Examiner* — Hau Phan
(74) *Attorney, Agent, or Firm* — Warner Norcross & Judd LLP

(57) ABSTRACT

A transport apparatus includes a frame, a lift mechanism supporting the frame, and a litter deck for supporting a person. The litter deck is adapted to be reconfigured between a chair configuration and a cot configuration. The litter deck is also adapted to be removably mounted to the frame, with the litter deck being adapted to be supported by the frame while the litter deck is in its chair configuration and also while being reconfigured between its chair configuration and its cot configuration.

22 Claims, 50 Drawing Sheets

Related U.S. Application Data filed on Mar. 14, 2013, provisional application No. 61/781,308, filed on Mar. 14, 2013.

(51) Int. Cl.

| | |
|---|---|
| ***A61G 1/02*** | (2006.01) |
| ***A61G 5/00*** | (2006.01) |
| ***A61G 1/056*** | (2006.01) |
| ***A61G 5/06*** | (2006.01) |
| *A61G 7/05* | (2006.01) |
| *A61G 7/16* | (2006.01) |

(52) U.S. Cl.

CPC ........... *A61G 1/0567* (2013.01); *A61G 5/006* (2013.01); *A61G 5/061* (2013.01); *A61G 1/0212* (2013.01); *A61G 1/0262* (2013.01); *A61G 2007/0513* (2013.01); *A61G 2007/165* (2013.01)

(56) References Cited

U.S. PATENT DOCUMENTS 3,813,712 A * 6/1974 Bonnin .................. A47C 23/14 5/110
3,936,893 A * 2/1976 Anderson .............. A61G 5/006 297/19
3,967,328 A 7/1976 Cox
4,078,269 A * 3/1978 Weipert ................. A61G 3/006 254/122
4,193,147 A * 3/1980 Fischer .................. A61G 5/006 297/DIG. 4
4,255,823 A * 3/1981 Boyer .................. A61G 7/1007 280/47.16
4,451,945 A 6/1984 Heinz et al.
4,566,550 A * 1/1986 Misawa ................. A61G 5/061 16/18 B
4,566,706 A * 1/1986 Bihler .................... A61G 5/061 180/8.2
4,691,962 A 9/1987 Holdt
4,813,088 A 3/1989 DiMatteo et al.
4,962,941 A 10/1990 Rembos
5,023,968 A 6/1991 Diehl et al.
5,050,899 A * 9/1991 Stensby ................. A61G 5/006 280/250.1
5,112,076 A * 5/1992 Wilson ................... A61G 5/045 180/907
5,135,350 A 8/1992 Eelman et al.
5,435,027 A * 7/1995 Bourgraf .............. A61G 1/0567 296/20
5,438,722 A 8/1995 Jayamanne
5,659,910 A 8/1997 Weiss
5,790,997 A 8/1998 Ruehl
5,896,602 A * 4/1999 Marblestone ........ A61G 7/1019 5/81.1 HS
6,125,485 A * 10/2000 Way ..................... A61G 1/0565 296/20
6,128,796 A 10/2000 McCormick et al.
6,173,461 B1 * 1/2001 Alexander ............. A61G 5/006 5/613
6,219,864 B1 * 4/2001 Ellis ....................... A61G 1/013 5/600
6,231,067 B1 * 5/2001 Johnson ................... A61G 5/14 180/65.1
6,336,235 B1 1/2002 Ruehl
6,381,781 B1 5/2002 Bourgraf et al.
6,386,614 B1 * 5/2002 Logan .................... A61G 3/061 296/65.03
6,701,545 B1 3/2004 Ferneau et al.
7,140,055 B2 11/2006 Bishop et al.
7,389,552 B1 6/2008 Reed et al.
7,490,884 B2 2/2009 Matunaga et al.
7,581,265 B1 9/2009 Bourgraf et al.
7,805,784 B2 * 10/2010 Lemire .................. A61G 7/005 108/145
7,887,113 B2 2/2011 Lambarth et al.
7,918,473 B2 4/2011 Yao
7,931,288 B1 * 4/2011 Chuang ................ A61G 5/1059 280/250.1
8,051,513 B2 11/2011 Reed et al.
8,056,163 B2 11/2011 Lemire et al.
8,104,121 B2 1/2012 Bourgraf et al.
8,155,918 B2 4/2012 Reed et al.
8,316,480 B2 * 11/2012 Burak, Jr. ............ A61G 7/1019 5/81.1 HS
8,359,685 B2 1/2013 Patwardhan
8,439,416 B2 5/2013 Lambarth et al.
8,459,660 B2 6/2013 Livingston
8,864,205 B2 10/2014 Lemire et al.
8,973,925 B1 3/2015 Helterbrand
2002/0056162 A1 * 5/2002 Flynn ................... A61G 1/0567 5/611
2003/0033672 A1 * 2/2003 Jehn ..................... A61G 1/0567 5/611
2003/0116927 A1 * 6/2003 Quigg .................... A61G 5/061 280/5.22
2004/0034935 A1 2/2004 Ferneau et al.
2004/0111798 A1 6/2004 Matunaga et al.
2004/0133981 A1 7/2004 Walkingshaw
2005/0172405 A1 * 8/2005 Menkedick ........... A61B 5/1115 5/618
2006/0016008 A1 * 1/2006 Choi .................... A61G 1/0562 5/611
2007/0017029 A1 * 1/2007 Wurdeman .............. A61G 7/00 5/618
2007/0174967 A1 8/2007 Bourgraf et al.
2007/0182220 A1 8/2007 Walkinshaw et al.
2009/0165208 A1 7/2009 Reed et al.
2010/0017964 A1 1/2010 Kruse
2010/0117312 A1 5/2010 Walkingshaw et al.
2010/0176618 A1 7/2010 Souke et al.
2012/0139197 A1 6/2012 Livingston
2014/0033435 A1 2/2014 Jutras
2014/0041120 A1 2/2014 Li
2015/0115638 A1 4/2015 Lambarth et al.

FOREIGN PATENT DOCUMENTS

CN 2915071 Y 6/2007
CN 200960241 Y 10/2007
EP 0287857 A2 10/1988
EP 0759735 B1 9/1998
EP 0786396 B1 9/2001
EP 1212025 A1 6/2002
EP 1226803 A1 7/2002
EP 0744934 B1 12/2002
EP 0932385 B1 3/2004
GB 1046444 10/1966
GB 2381256 A * 4/2003 ............. A61G 1/017
WO 0113854 A1 3/2001
WO 02039944 A2 5/2002
WO 02039944 A3 5/2002
WO 2005056376 A1 6/2005
WO 2008127089 A1 10/2008
WO 2008127944 A1 10/2008
WO 2009076630 A1 6/2009
WO 2009114806 A2 9/2009
WO 2010025387 A2 3/2010
WO 2011100556 8/2011
WO 2013052452 A1 4/2013
WO 2013096861 A1 6/2013
WO 2013192411 A2 12/2013
WO 2014035250 A1 3/2014
WO 2014150652 A1 9/2014

OTHER PUBLICATIONS

PCT International Written Opinion regarding Application No. PCT/US2014/026370 filed Mar. 13, 2014, a counterpart to U.S. Appl. No. 14/206,151.

* cited by examiner

RECONFIGURABLE TRANSPORT APPARATUS

CROSS-REFERENCE TO RELATED APPLICATION

This application claims the benefit of U.S. Provisional Patent Application No. 61/781,308, filed Mar. 14, 2013, U.S. Provisional Patent Application No. 61/781,844, filed Mar. 14, 2013, and U.S. Provisional Patent Application No. 61/806,189, filed Mar. 28, 2013, which are incorporated herein by reference in their entirety and commonly owned by Stryker Corporation of Kalamazoo, Mich.

TECHNICAL FIELD AND BACKGROUND OF THE INVENTION

The present invention generally relates to a transport apparatus, and more specifically to a transport apparatus for transporting people, including patients, that provides multiple functions and that can be configured as a chair or an emergency cot. While the term patient is used herein it should construed broadly to encompass not only people undergoing medical treatment, but also people who simply need help or assistance for medical or non-medical reasons.

Patients are handled by a wide range of transport apparatuses or equipment, each with its own functionality. For example, transport apparatuses or equipment may include stair chairs, both powered and non-powered, cots, stretchers, and the like. Each has a configuration that is suited to the particular need of the caregiver or attendant. For example, when a patient needs to transported down stairs, the stair chair has a chair-like configuration and may include a treaded track to help lowering the patient down stairs. A cot on the other hand typically has a generally horizontal deck to support a patient in a supine position. However, when handling a patient, the patient often needs to be transferred from one support to another support, which can add stress to the patient and also to the handlers or caregivers.

SUMMARY OF THE INVENTION

The present invention provides a transport apparatus that may be configured between a chair configuration, such as a stair chair, and a cot. The present invention also provides a transport apparatus with a compact lift mechanism that can be used to raise the deck of the transport apparatus and further tilt the deck while allowing independent articulation of the foot and head sections of the deck. The transport apparatus of the present invention also provides a stair chair with a caster track transition to facilitate handling of the patient.

In one form of the invention, the transport apparatus includes base, a back for supporting a patient, a deck having a head end and a foot end, a lift mechanism supporting the deck on the base, with the lift mechanism a central pivot axis about which the lift mechanism collapses or extends to lower or raise the deck. Further, the transport apparatus has center gravity extending through the central pivot axis of the lift mechanism when the deck is in a fully raised position and which is off-set toward the head end of the deck when the deck is a lowered position.

In one aspect, the lift mechanism comprises an X-frame lift mechanism.

In another aspect, the X-frame comprises first and second X-frames with each of the X-frames having upper ends and lower ends and with the upper ends of the first X-frame pivotally coupled to the lower ends of the second frame.

In addition, each of the first and second X-frames may have telescoping legs. For example, the upper ends of the second X-frame may be provided by its respective telescoping legs. In addition, the lower ends of the first X-frame may be provided by its respective telescoping legs. In this manner, the telescoping legs allow the X-frames to vary the angle of the deck to thereby tilt the deck relative to the base.

In another aspect, the deck comprises an articulatable deck having a head section, a seat section, and a foot section with a lift mechanism coupled with the seat section, with the head and foot sections independently articulatable with respect to the deck section and the lift mechanism.

Further, in any of the above transport apparatuses, the deck section may include a head section or foot section with the head section or foot section including telescoping portions thereby extending the length of the deck.

Further in any of the above, the deck section may include a seat section, a head section, and a foot section, with at least one section comprising a perimeter frame and a pad supported by the frame, wherein the pad is exposed on both sides of the section.

In a further aspect, each section comprises a perimeter frame and a pad supported by each perimeter frame, wherein the pads are exposed on both sides of each section.

For example, the pad may comprise a core cushioning member and a base supporting said cushioning member, with both the base and cushioning member enveloped in a cover, such as a liquid impermeable cover, such as vinyl.

In another form of the invention, the transport apparatus includes a base, a deck for supporting the patient, with the deck having a seat section, a head section articulatable relative to the seat section, and a foot articulatable relative to the seat section. The lift mechanism supports the deck on the base, and includes an X-frame with telescoping legs at one end. The lift mechanism is mounted to the seat section wherein the head section and foot section are each independently articulatable with respect to the deck section and the lift mechanism. Further, the lift mechanism is operable to tilt the seat section to thereby tilt the deck.

In one form, the X-frame comprises first and second X-frames with each of the X-frames having upper ends and lower ends with the upper ends of the first X-frame pivotally coupled to the lower ends of the second X-frame.

For example, each of the first and second X-frames may have telescoping legs. Further, the upper ends of the second X-frame may be provided by its respective telescoping legs.

In another aspect, the head section, foot section, and the seat section are reconfigurable between a generally horizontal configuration to form a cot configuration, and a folded configuration wherein the head section is generally vertical relative to the seat section and the foot section is generally vertical relative to the seat section to form a chair configuration.

In any of the above, the base may include a plurality of casters.

Further, in any of the above, the base may include a track. When the base includes both the track and the casters, the casters may be mounted for movement between a ground engaging position and a non-grounding engaging position to allow the track to engage the ground.

In another aspect, the transport apparatus further includes a drive train for driving the transport apparatus relative to the ground (or stairs). For example, the drive train may drive a track or may drive a removably mounted pair of wheels.

In another form of the invention, a transport apparatus includes a base, a deck for supporting the patient, a lift mechanism for supporting the deck on the base, and an electrically powered device at the transport apparatus. The transport apparatus also includes a wireless user actuatable device at the transport apparatus for controlling the electrically powered device. For example, the electrically powered device may comprise a drive mechanism, for example, to drive a track mounted to the base or for raising or lowering the lift mechanism.

In another aspect, the deck has a seat section, a head section articulatable relative to the seat section and a foot section articulatable relative to the seat section when the drive mechanism is operable to the move the head section or the foot section.

In addition, the present invention provides a transport apparatus that has a first configuration to provide a first functionality and which may be reconfigured to a second configuration to provide a second functionality.

In one form of the invention, a transport apparatus system includes a first wheeled base for forming a part of a first transport apparatus, a litter deck for supporting a patient, the deck having a seat section and an articulatable head or foot section and movably supported with respective to the first base to thereby form the support surface for the first transport apparatus. A second wheeled base is provided for forming a part of a second transport apparatus, with the litter deck releasably mounted with respective to the first base and transferable to the second base and configured to be releasably mounted with respective to the second base to thereby form the support surface for the second transport apparatus.

In one aspect, the transport apparatus system further includes a lifting mechanism for moving the litter deck relative to the first base when mounted with respective to the first base.

In addition, the lifting mechanism may comprise first and second pairs of X-frames, each of the pairs of X-frames having upper ends and lower ends, with the upper ends of the first pair of X-frames pivotally coupled to respective lower ends of the second pair of X-frames.

Optionally, each of the first and second pairs of X-frames may have telescoping legs wherein the lifting mechanism can tilt the deck with respect to the first base.

In another aspect, the second transport apparatus may comprise a stair chair.

In yet another aspect, the first transport apparatus may comprise a cot, and comprise a cot reconfigurable between a chair and a cot.

Further, in any of the above transport apparatuses, the deck section may include a head section or foot section with the head section or foot section including telescoping portions thereby extending the length of the deck. In addition, the deck may have articulatable head and foot sections.

Further, in any of the above first transport apparatuses, the deck may comprise an articulatable deck having an articulatable head section and an articulatable foot section, with a lifting mechanism coupled to the seat section wherein the head and foot sections are each independently articulatable with respect to the deck section and the lift mechanism.

In another form of the invention, a transport apparatus includes wireless switches to allow control of the various accessories or drive mechanisms at the transport apparatus and further allow communication between the attachable devices.

In another form of the invention, a stair chair includes a wheeled base; a frame mounted to the base and supporting at least one track; and a seat section supported by the frame. A foot section is pivotally mounted adjacent an edge of the seat section, and a head section is pivotally mounted adjacent an opposed edge of the seat section.

In one aspect, the seat, foot, and head sections may be releasably mounted to the frame and are removable without disassembly.

In another aspect, the base may include a plurality of casters.

In another aspect, the seat, foot, and head sections may be removable independently.

In yet another aspect, the seat, foot, and head sections may be removable as an assembly.

According to yet another aspect, the stairs chair is collapsible into a configuration so that is can be mounted onto another frame to form a cot.

In yet another form of the invention, an emergency medical cot includes a base, a deck for supporting a patient having a seat section, a head section articulatable relative to the seat section, and a foot section articulatable relative to the seat section. The deck is releasably mounted at the cot and is removable without disassembly. A lifting mechanism supports the deck on the base, which is configured to adjust the angular orientation of the deck while allowing the head section and the foot section to be articulated relative to the seat section.

In one aspect, the lifting mechanism comprises first and second pairs of X-frames, each of the pairs of X-frames having upper ends and lower ends, with the upper ends of the first pair of X-frames pivotally coupled to respective lower ends of the second pair of X-frames.

In another aspect, each of the first and second pairs of X-frames has telescoping legs wherein the lifting mechanism can tilt the deck with respect to the first base.

In another form, a transport apparatus system includes a first wheeled base for forming a part of a first transport apparatus, a litter frame movably mounted to the first wheeled base, and a second wheeled base for forming a part of a second transport apparatus. A frame is mounted to the second base, and a litter deck is mounted to the litter frame for supporting a patient, the litter deck configured in chair configuration, the base, the frame and the deck being reconfigurable to lie in a generally horizontal configuration and adapted to be mounted to the litter frame to thereby form a transport apparatus surface for the first transport apparatus.

In addition, the transport apparatus system may further include a lifting mechanism for moving the litter frame relative to the first base.

In yet another aspect, the deck may have a seat section, and articulatable head and foot sections.

For example, the second transport apparatus may comprise a stair chair. And, the first transport apparatus may comprise a cot.

In one form, the lift mechanism may comprises an X-frame and further may comprise first and second X-frames with each of the X-frames having upper ends and lower ends with the upper ends of the first X-frame pivotally coupled to the lower ends of the second X-frame.

For example, each of the first and second X-frames may have telescoping legs. Further, the upper ends of the second X-frame may be provided by its respective telescoping legs.

In another aspect, the head section, foot section, and the seat section are reconfigurable between a generally horizontal configuration to form a cot configuration, and a folded configuration wherein the head section is generally vertical relative to the seat section and the foot section is generally vertical relative to the seat section to form a chair configuration.

In any of the above, each base may include a plurality of casters.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION OF THE PREFERRED EMBODIMENTS

Figure 1:
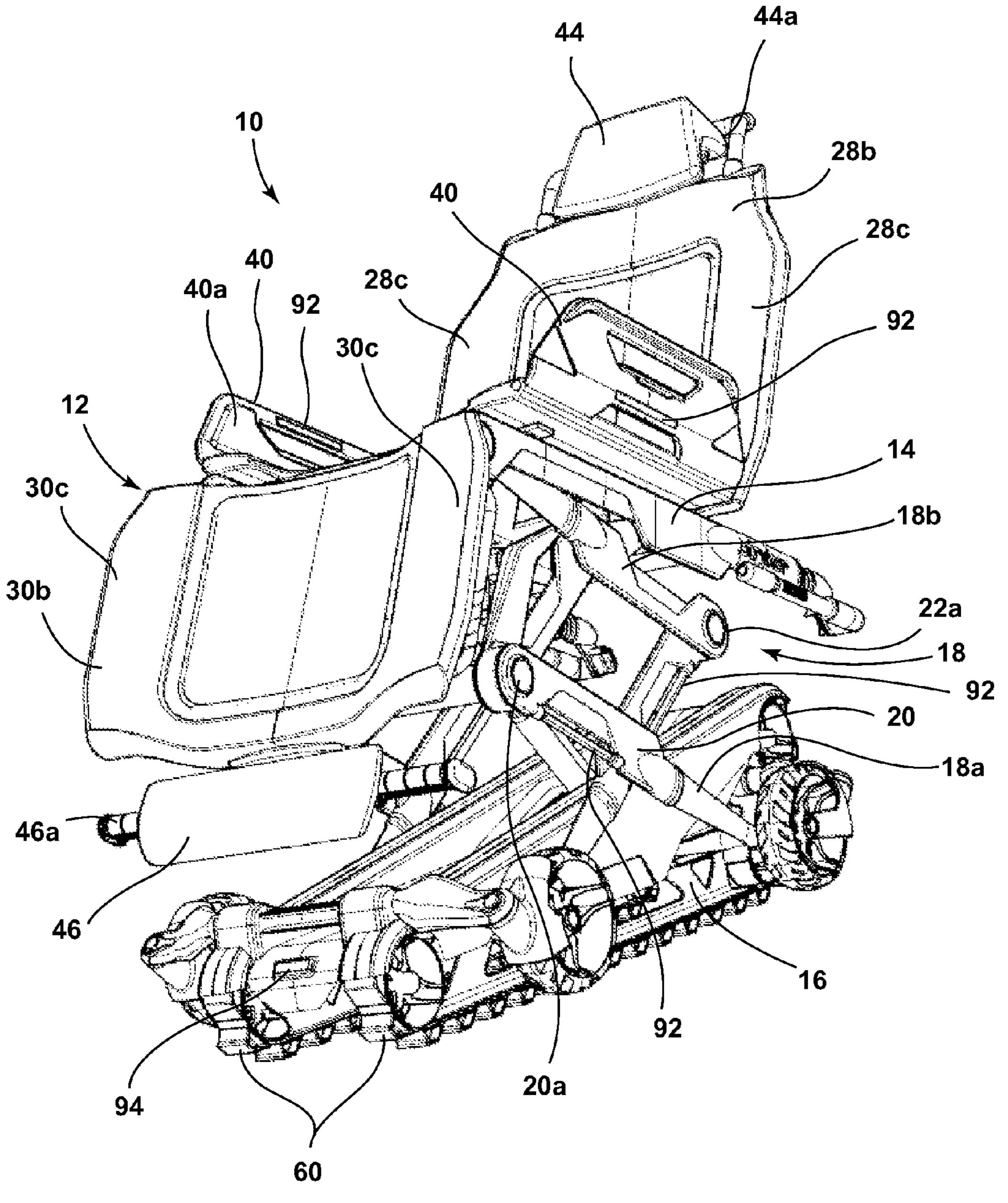
FIG. 1 is a perspective view of a transport apparatus of the present invention shown in a chair configuration.
Figure 2:
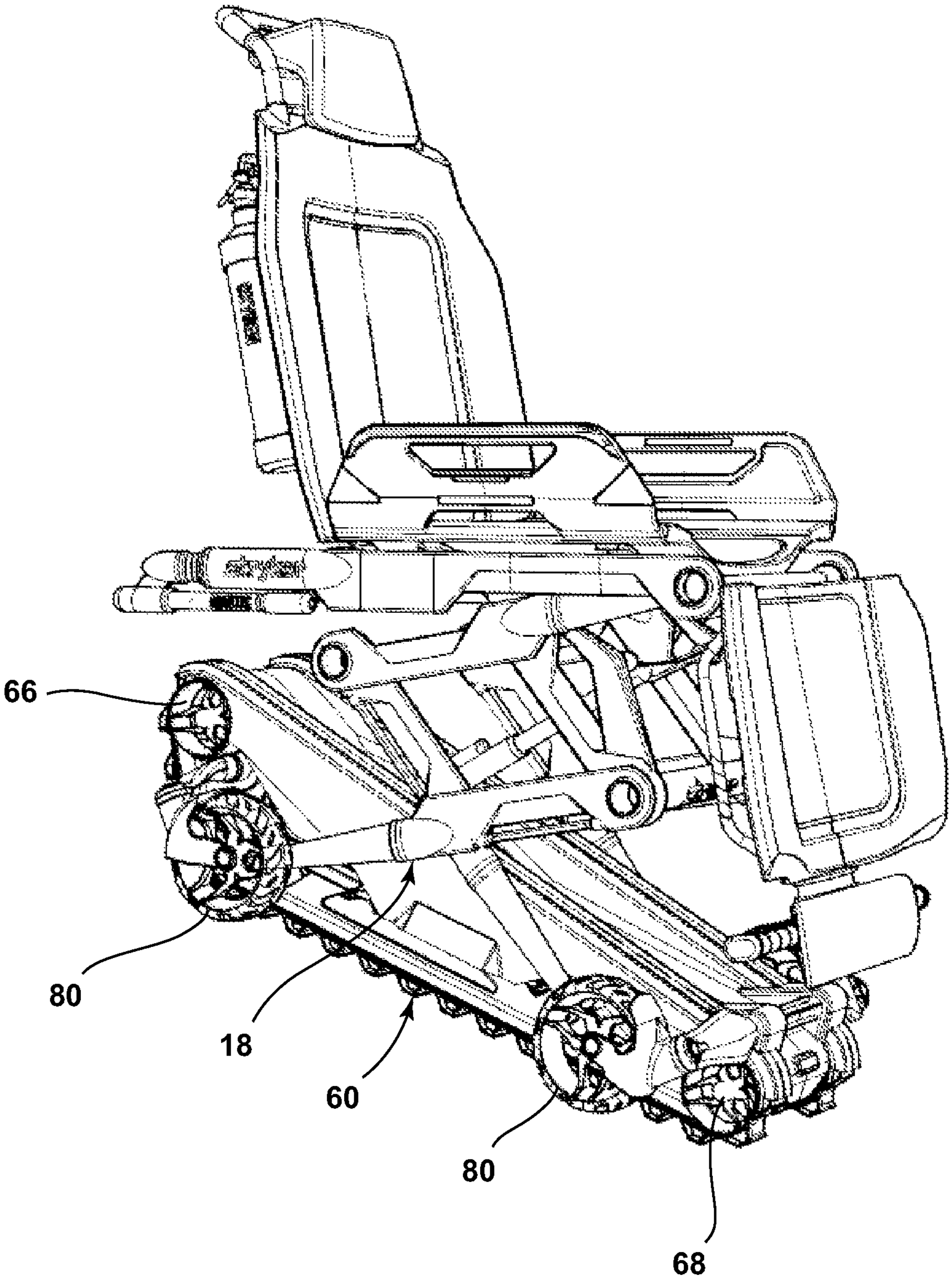
FIG. 2 is another perspective view of the transport apparatus of FIG. 1.
Figure 13:
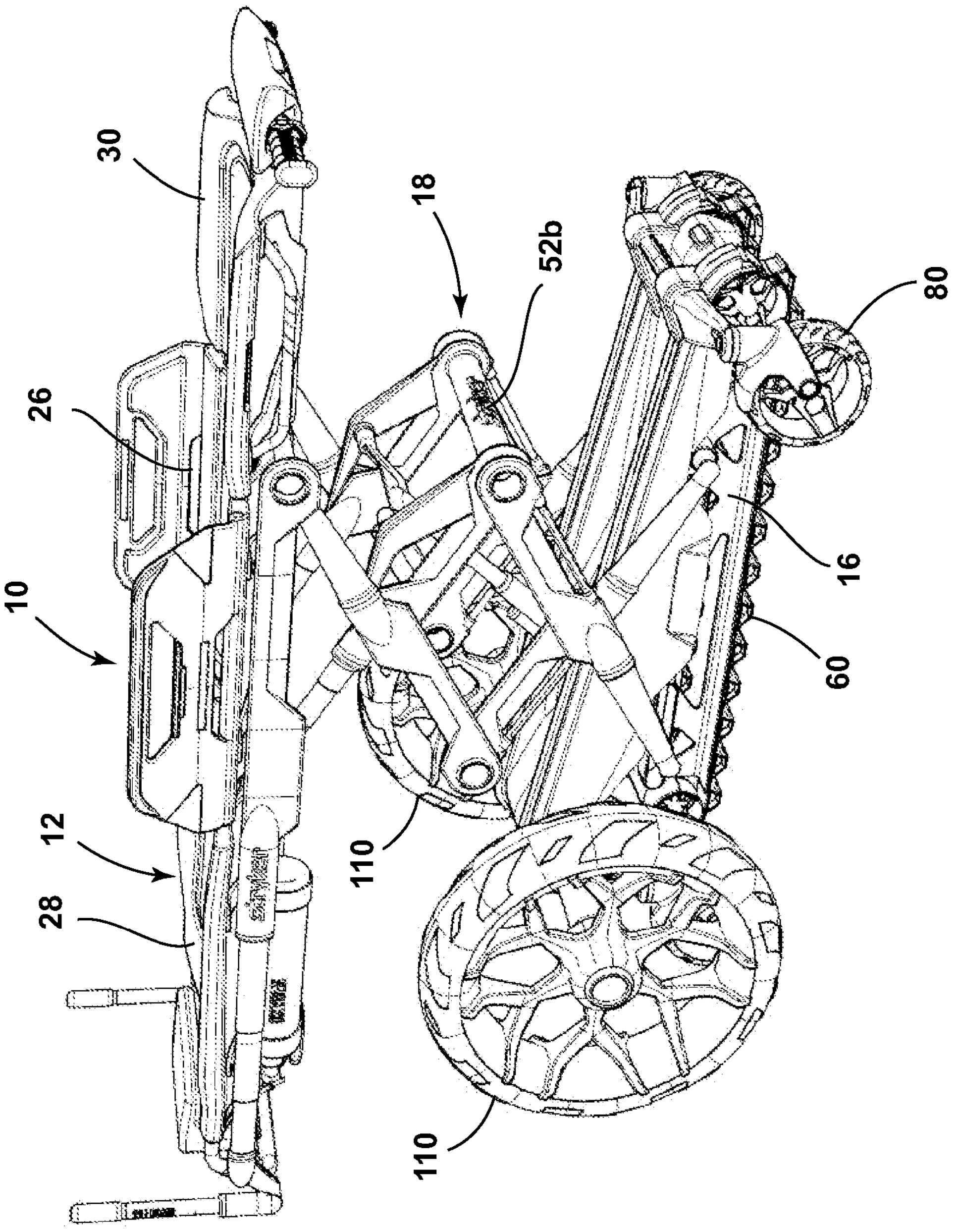
FIG. 13 is a similar view of FIG. 12 with the axillary wheels mounted to the transport apparatus.
Figure 14:
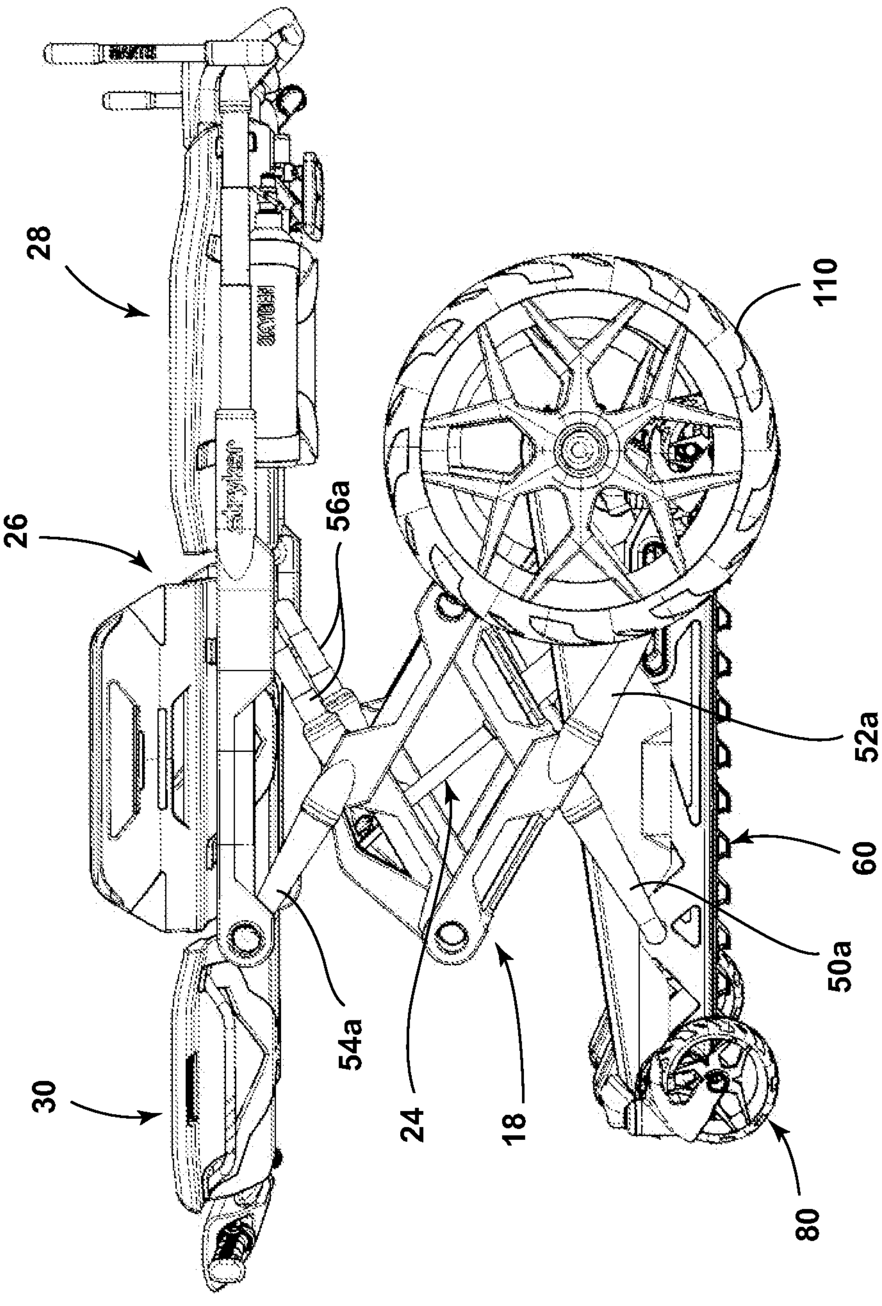
FIG. 14 is a side elevation of the transport apparatus with the axillary wheels mounted.
Figure 15:
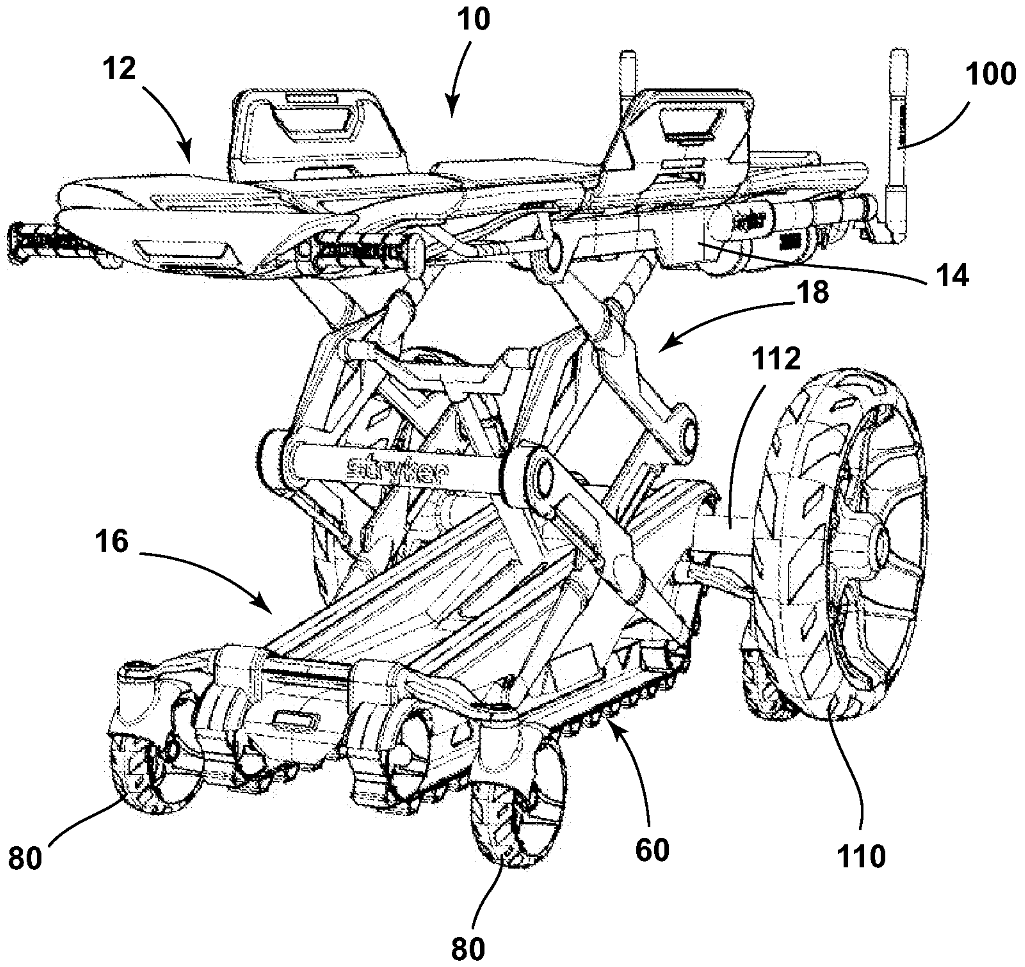
FIG. 15 is a perspective view of the transport apparatus in the cot configuration with the axillary wheels mounted.

Referring to FIG. 1, the numeral 10 generally designates a transport apparatus of the present invention. As will be more fully described below, transport apparatus 10 may include an articulatable deck to allow the transport apparatus to be configured between a chair configuration, such as shown in FIG. 1, and cot configuration, such as shown in FIG. 13. Further, the transport apparatus optionally includes a lift mechanism that has a compact configuration, which can provide a great range of motion and further may tilt the deck section to provide a more comfortable sitting arrangement for a person supported on the transport apparatus when the transport apparatus is a chair configuration. Further, the transport apparatus may incorporate a track assembly and/or a large axillary wheel in addition to its casters to optionally provide a powered transport apparatus and, further, one that offers greater maneuverability.

In another aspect, the transport apparatus may incorporate a releasable litter deck so that the deck may be removed for use as or on another transport apparatus. For example, the litter deck may be transferred to another transport apparatus frame or removed for replacement with another litter deck to thereby customize the transport apparatus. Or the litter may be configured to be removed and then unfolded into a chair configuration, such as a stair chair configuration. In this manner, apparatus 10 may provide increased versatility.

Referring again to FIG. 1, transport apparatus 10 includes a deck 12, which is supported on a deck support frame 14 and a base 16, which supports frame 14 and deck 12 by way of a lift mechanism 18. Optionally, deck 12 may be removable, such as described below in reference to apparatus 210.

In the illustrated embodiment, lift mechanism 18 comprises a double X-frame lift mechanism with a pair of lower X-frames **18*a* and a pair of upper X-frames 18*b*, which are joined at their respective upper and lower ends by pivot connections 20*a* and 22*a*. The lower ends of lower X-frame members 18*a* are pivotally joined to base 16 with one of the lower ends being slidably, pivotally mounted to the base and the other pinned to the base. Similarly, the upper X-frame members are pivotally mounted to frame 14 with one upper end being slidably pivotally mounted and the other end pinned. In this manner, when the X-frames are pivoted about to their respective central pivot axes 20 and 22, frame 14, and hence deck 12, will be lowered or raised relative to base 16**, as would be understood by those skilled in the art.

Figure 3:
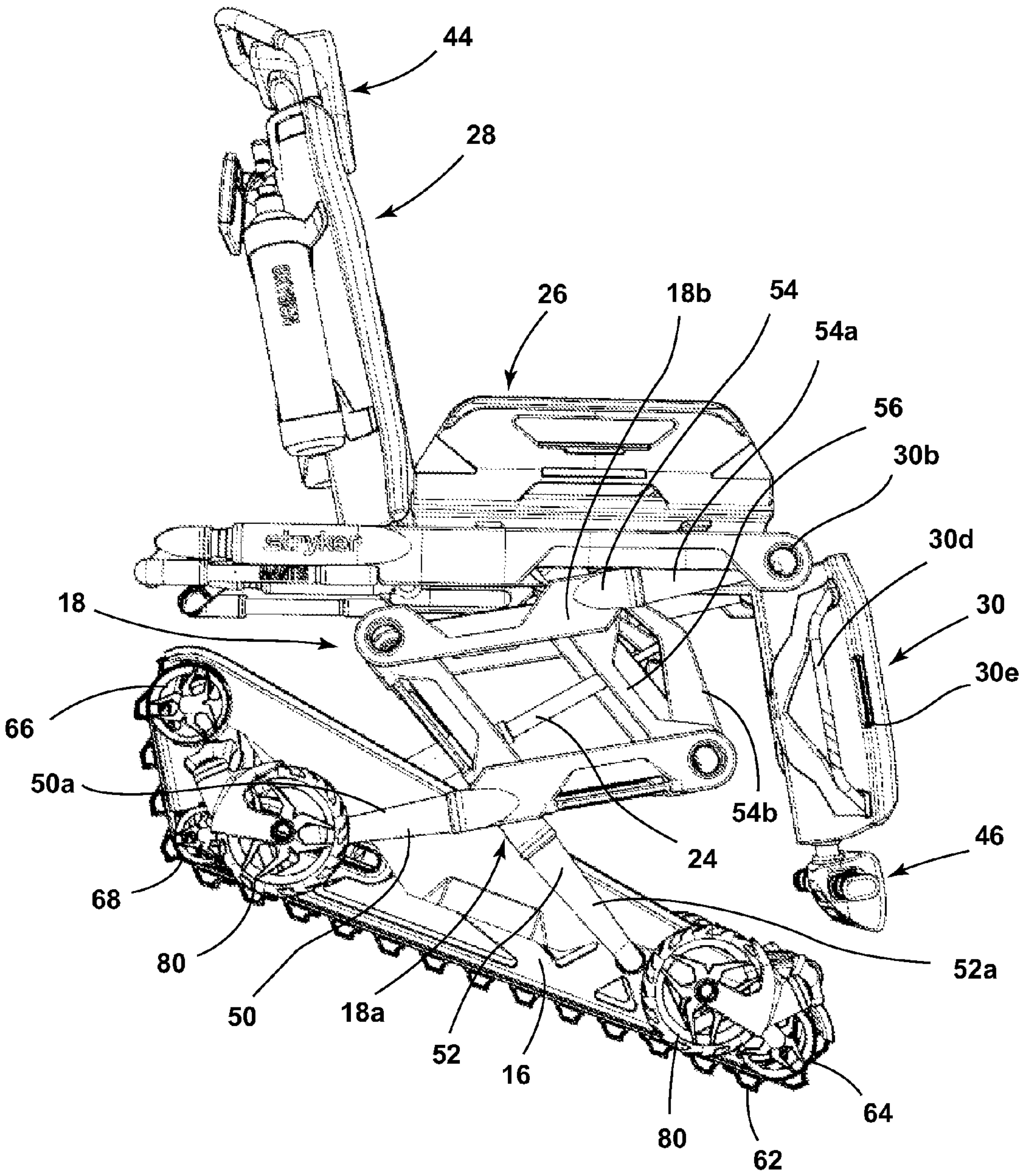
FIG. 3 is a side elevation view of the transport apparatus of FIG. 1.

The unfolding and folding of the respective X-frames is provided by a driver 24, which is best illustrated in FIG. 3, for example, in the form of a cylinder, such as an electrically actuated cylinder, which is mounted on one end to base 16, for example, by way of a pivot connection, such as a bushing, and pivotally mounted by a bushing at its opposed end to a transverse rod 25, which is mounted between the arms of the upper X-frame members, as described below.

Figure 8:
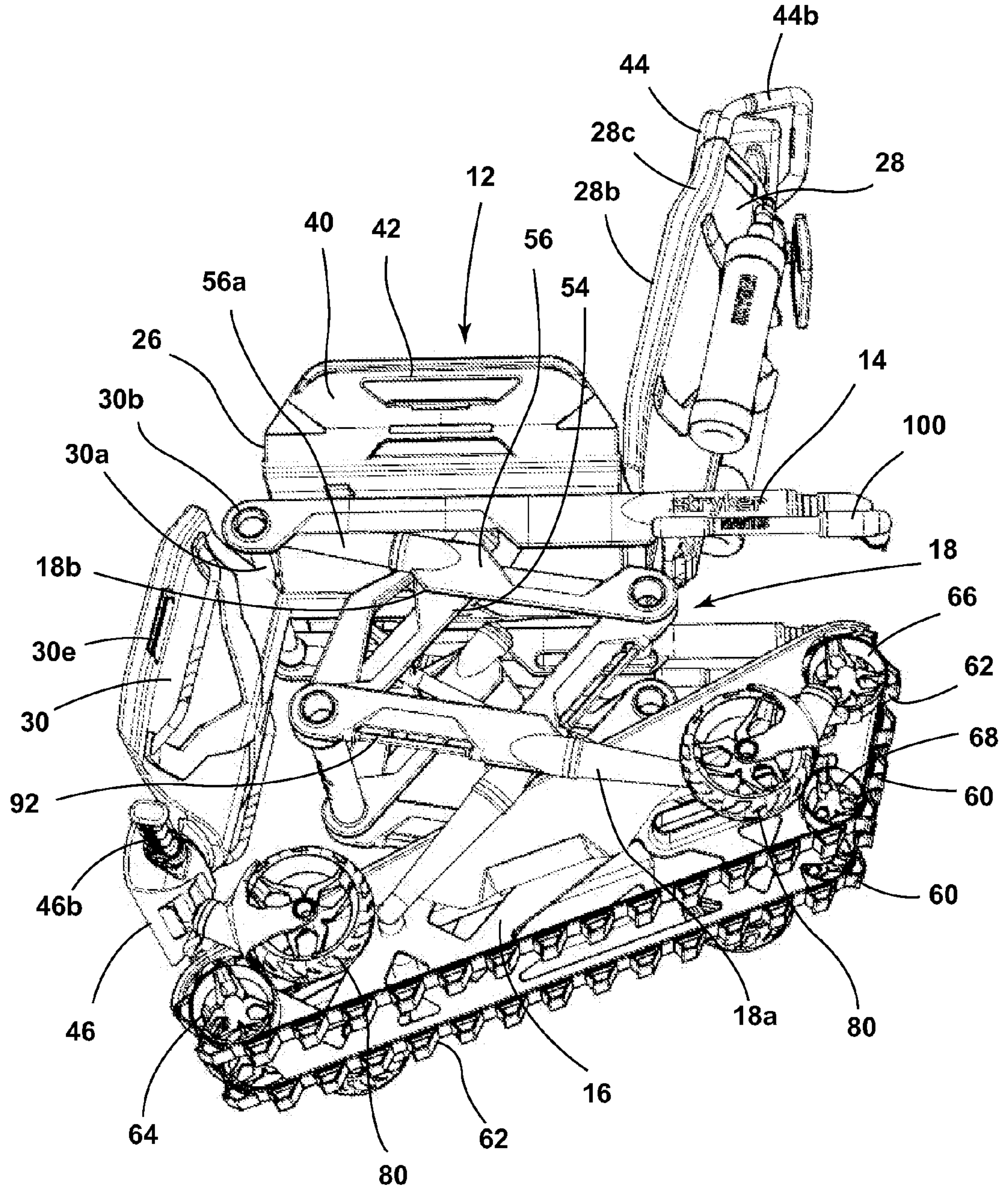
FIG. 8 is a bottom perspective view of the transport apparatus of FIG. 1.

Referring to FIG. 8, deck 12 includes a seat section 26 and a head section 28 and a foot section 30, which are each articulatable relative to the seat section 26 (and independently articulatable relative to the seat section 26) and further with respect to lift mechanism 18. Each section may include a frame and a skin to support pads described below. Alternately, one or more of the seat section, head section, and foot section may comprise a perimeter frame and a pad supported by said frame, wherein the pad is exposed on both sides of the respective section. For example, the pad (or pads) may comprise a core cushioning member and a base supporting the cushioning member, with both the base and cushioning member enveloped in a cover, such as a liquid impermeable cover, such as vinyl. The base may be formed form a variety of materials that provide stiffness to the cushioning member. For example, the base may be solid or a mesh or a lattice and be formed from wood, metal, plastic, including plastic reinforced, for example with fibers or the like or a combination thereof. The base may also be formed from discrete members, such as strips or batons.

Foot section 30 may be pivotally mounted to frame 14 by way of a transverse shaft **30*a*, which is received in bushings 30*b* mounted to frame 14 and secured to the framework of section 30. The head section 28 may be pivotally mounted to the seat section 26 by a pivot shaft or the like, similarly mounted to the head section frame work. The articulatable sections of deck 12 may be manually moved or may be moved by actuators, such as electric actuators. When manually moved, the respective mounts may provide resistance or may incorporate a release mechanism, for example, which are released by handles or the like provided in the head section and/or foot section (such as a handle 30*e* of foot section 30 shown in FIG. 3**).

Each respective section of the deck may include a pad to thereby form a sectioned support surface for a patient. The respective pads are sized and configured (and gatched) such that the deck sections may be moved between the chair configuration as shown in FIGS. 1-10, and further the cot configuration such as shown in FIGS. 13-16 without running interference with the adjacent pad or pads. Additionally, the padded sections **28*b* and 30*b*, may include laterally extending lips 28*c* and 30*c***, respectively, which optionally extend beyond the supporting framework of the deck to reduce the gap between the deck and an adjacent support surface, for example, when the deck is in its cot configuration to facilitate a patient transfer from the cot, so that the lip or lips at least partially fill the space to the adjacent surface to which the patient is being transferred.

Seat section 26 optionally includes side rails 40 that are pivotally mounted about the opposed sides of seat section 26 to frame 14. Side rails 40 may each include a hand hold 42, and further may be provided with a pad 40*a* to provide cushioned lateral support to a patient supported on apparatus 10.

Side rails 40 are mounted in a generally vertical orientation relative to seat section 26 and may further be released from their generally vertical orientation to an angle relative to the support surface to increase the width of the deck, at least of the seat section of the deck. For example, side rails 40 may be configured to be tilted in a range from a generally vertical orientation, such as about 80-90 degrees relative to the patient deck at seat section 26 to an angle in a range from about 30-50 degrees relative to the seat section, and optionally no more than 45 degrees to avoid creating any instability issues.

In addition to seat sections and head sections, deck 12 may also incorporate extendible head and foot rests 44, 46 which may be mounted on telescoping tubes to thereby extend the length of the deck to accommodate taller patients. Telescoping tubes 44*a* and 46*a* may be moved manually, for example, by way of handles 44*b* and 46*b*. For example, the telescoping tubes 44*a* and 46*a* may provide resistance to movement of the respective head rest and foot rest (and provide infinite positioning between a fully extended position and retracted position) or may include detent mechanisms to provide defined positions for the respective rests. Alternately, the rests may be moved by actuators, such as electrically powered actuators.

Referring again to FIGS. 3 and 4, X-frames 18*a*, 18*b* of lift mechanism 18 are formed by pivotally joined arms 50 and 52, and 54 and 56, respectively. Each arm 50, 52, 54, and 56 may include a telescoping arm 50*a*, 52*a*, 54*a*, and 56*a*, respectively. The telescoping arm sections of X-frames 18*a* may be pivotally mounted to base 16, with the telescoping arms 54*a*, 56*a* being pivotally mounted to frame 14. Therefore, in addition to folding about the respective pivot axes, the respective arms of the X-frames can be extended or contracted to thereby tilt deck 12, such as shown in FIGS. 2-4, and 7. In this manner, when a patient is supported on the deck 12, and transport apparatus 10 is in its stair chair configuration, such as shown in FIGS. 1-10, a patient may be tilted relative to the lift mechanism and therefore relative to the base at an angle that is more comfortable for patient, for example in a range of 0 (zero) degrees plus or minus about 40 degrees from horizontal. Further, lifting mechanism 18 may tilt deck 12 when in its cot configuration to tilt the deck into a Trendelenberg or reverse Trendelenberg configuration.

Figure 4:
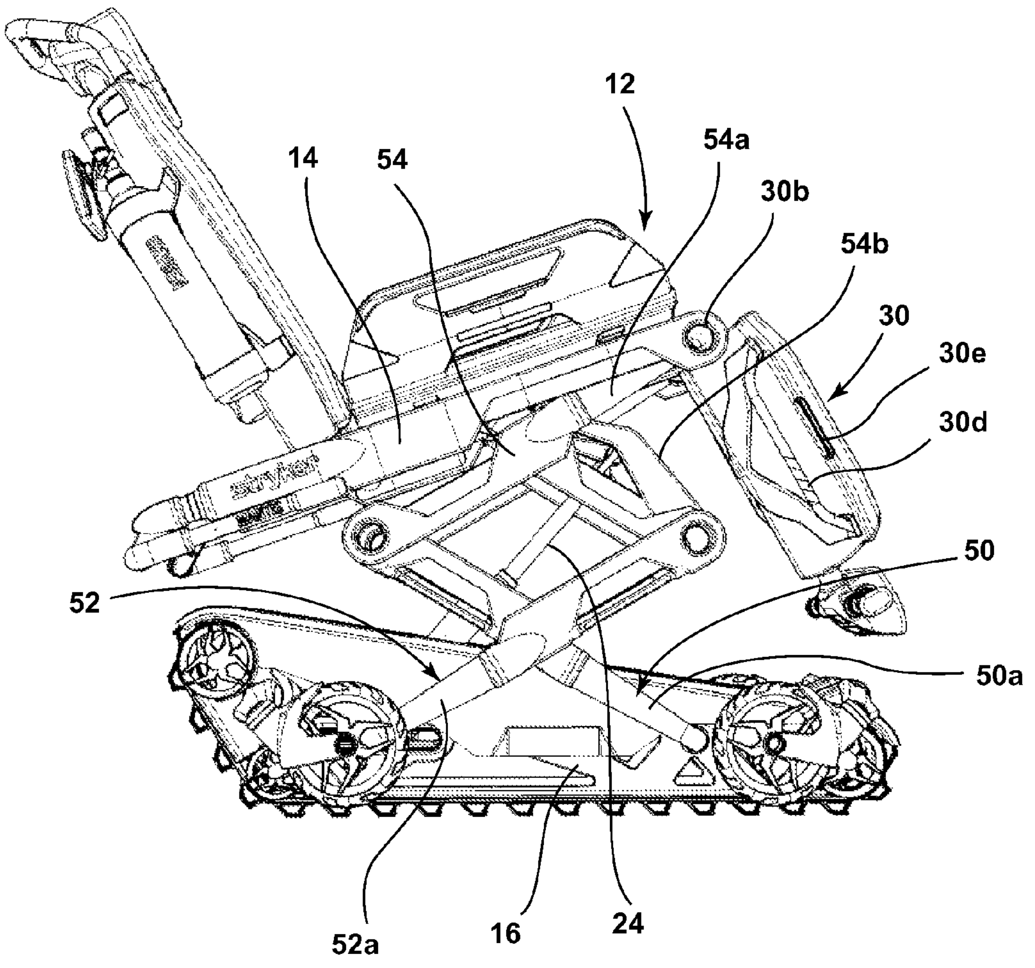
FIG. 4 is another side elevation view of the transport apparatus of FIG. 1.
Figure 9:
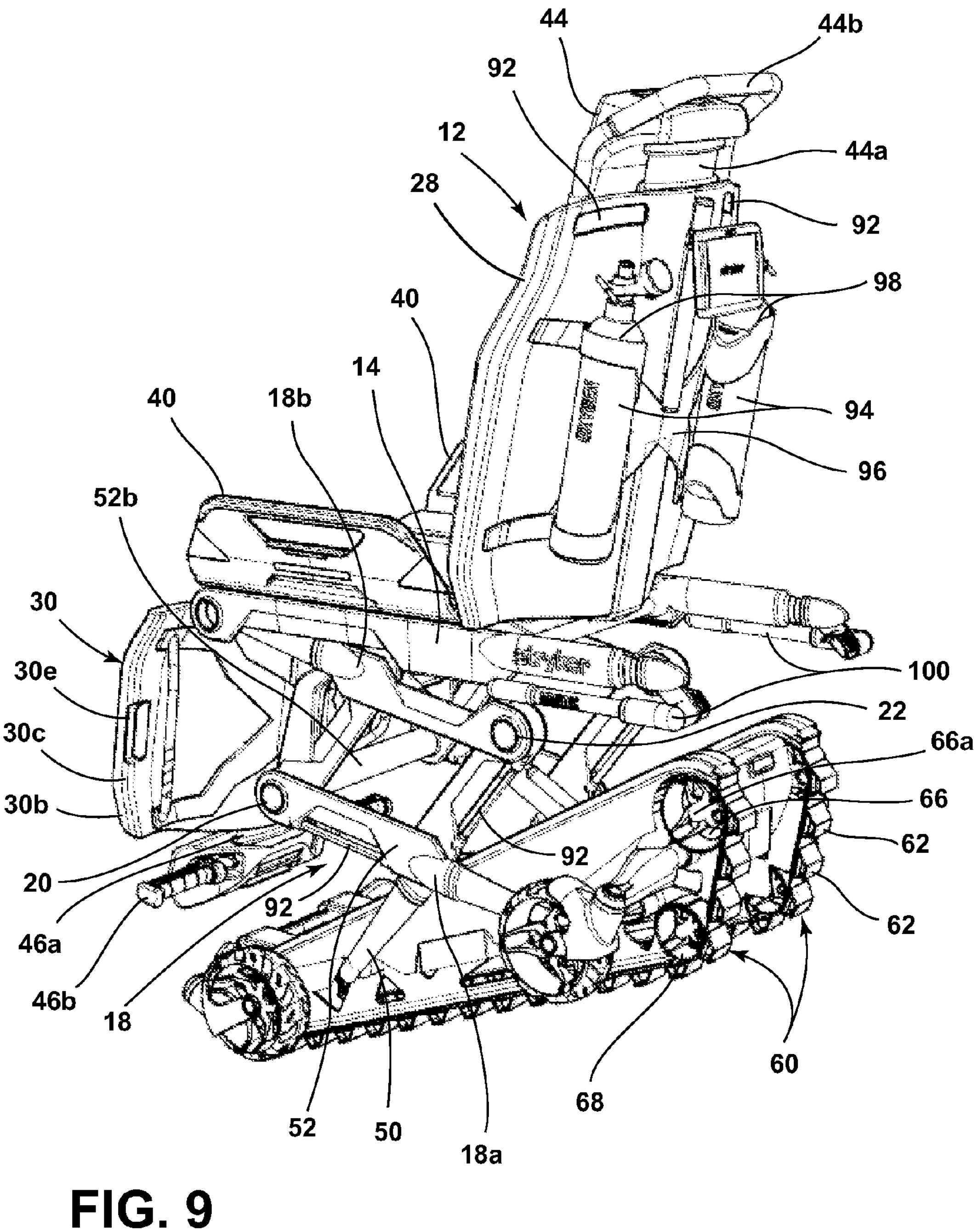
FIG. 9 is a rear perspective view of the transport apparatus of FIG. 1.

As best seen in FIGS. 1, 8 and 9, arms 50 may be joined together by a transverse member, such as a transverse rod 52*a*. Similar, arms 54 may be joined by transverse rod 25 (FIG. 10) by way of offsetting arms 54*b* (FIG. 4). With this configuration, the lift mechanism may have a compact configuration, which can provide a greater range of motion and further may allow the deck to be lowered to a low height of less than 14, less than 13" and as low as 12".

As previously noted, transport apparatus 10 may be configured as a chair, and more particularly as a stair chair. In the illustrated embodiments, base 16 includes a track assembly 60. Track assembly 60 may be formed from a pair of continuous loops of treaded belt to form a pair of moving tracks 62, which are mounted about wheels 64, 66, and 68 to form generally triangular shaped pathways for the belts. A suitable belt has an inner drive tread and an outer drive tread. Wheels 64, 66, and 68 may be mounted directly to base 16 or may be mounted to a separate frame, which can then be mounted to base 16, which allows the whole track assembly to be removable.

Figure 10:
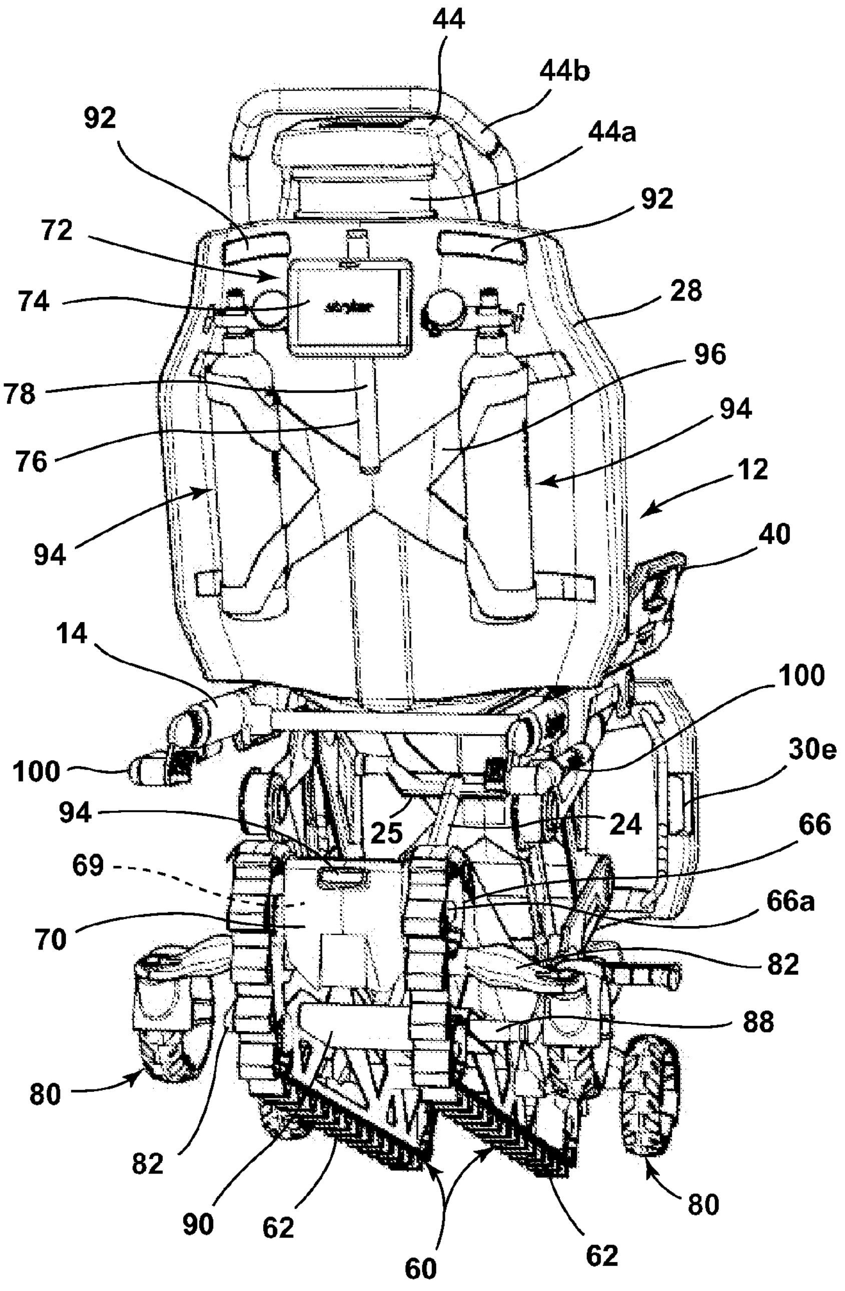
FIG. 10 is a rear perspective view of the transport apparatus of FIG. 1.

As noted above, track assembly 60 may be powered. For example, as best seen in FIGS. 9 and 10, wheel 66 may be mounted about a drive axle 66*a*, which is driven by a motor 69 housed in base 16. For example, motor 69 may be housed in housing 70, which may also include a power supply for driving the motor, such as a battery, including a rechargeable battery. Optionally, foot end wheels 64 of track assembly 60 may also be power driven, for example, by a motor positioned between wheels 64, which drives a drive shaft supporting wheel 64.

Actuator 24 and motor 69 (or motors) may be controlled by controls mounted to apparatus 10 including, for example, a wireless motor control provided for example by a user interface 72. In the illustrated embodiment user interface 72 comprises a touch screen 74. User interface 72 may be incorporated into apparatus 10, for example, at the head section, or may be removably mounted such as shown in FIG. 10, as well as to various hand holds or handles provided around support more fully described below. For example, head deck section 28 may support a mounting structure 76, such as a rail 78, which allows user interface 72 to be removably mounted to head section of deck 12. Further, when in the form of a rail, the position of the user interface may be adjusted. For example, a suitable mounting mechanism may comprise a clamp with an optional release mechanism to allow the position of the user interface to be adjusted. Therefore, an attendant standing behind the raised head section of apparatus 10 may operate motor 69 by simply touching touch screen 74, which may provide multiple functions by way of multiple touch screen areas, all controlled by a graphic user interface (GUI). For example, user interface 72 may have an application that generates designated touch screen areas that form a menu, with user input areas, and further which may generate displays or icons representative of the function being controlled. Further, user interface 72 may be configured as a monitor to display images or movies to show the patient or the caregiver. Optionally, user interface 72 may incorporate a camera, microphone and/or speaker. For example a suitable interface may comprise a tablet, such as an iPad available from Apple, with applications that provide these and other features.

In addition to controlling motor 69, user interface 72 may also control lighting provided about apparatus 10, described more fully below. Alternately, the lighting may be controlled by onboard circuitry and sensors, such as light sensors that detect the ambient lighting conditions and actuate the lights to provide better visibility of apparatus 10 (also as described below).

In some embodiments, the user interface may include a controller that forwards data to a location remote from the support, for example patient data and information, and optionally other data related to either the patient support or a device or other objects (e.g. medical devices, mattress, patients or caregivers wearing near field ID tags, or other items). Further, the controller may send data that indicates an association between the support and a device. The data may be forwarded wirelessly using a far field communications transceiver. For example, the recipient of the data may be a healthcare computer network, such as, but not limited to, an Ethernet. The controller may include a far field communications transceiver for example a WIFI device (IEEE 802.11) that forwards the data to the healthcare computer network. The data forwarded by the patient support to the healthcare network, in some instances, may include data indicative of the location of the patient support and/or the device. The controller may further be configured to determine an identity of the device by communicating with it through either near field or far field communication transceivers. A display of the interface 72 may display the identity of the device and/or information indicating the association between the device and the patient support. The user interface may include a keypad, one or more buttons, a touch screen, one or more switches, or the like, which is adapted to allow a user to select certain functions and also either accept a displayed association with the device or to override the displayed association.

In another embodiment, the controller may include a near field communication system that communicates in any of the manners, and with any of the devices, disclosed in commonly assigned U.S. patent application Ser. No. 13/802,992, filed Mar. 14, 2013 by applicants Michael Hayes et al, and entitled COMMUNICATION SYSTEMS FOR PATIENT SUPPORT APPARATUSES, which is which is incorporated by reference herein in its entirety and commonly owned by Stryker Corporation of Kalamazoo, Mich. Such a near field communications transceiver can be used for establishing associations between the patient support and a device or other objects (e.g. medical devices, mattress, patients or caregivers wearing near field ID tags, or other items). For example, in some embodiments, near field communications may be used as a proxy for determining associations amongst wirelessly communicating devices due to the limited physical range of the near field communications. In other words, if two devices are able to communicate with each other using near field communication, they must be located within a certain relatively close range, and given that close range, a determination can be made as to whether the devices are likely associated with each other or not. In still other embodiments, the far field communication is incorporated into the patient support, either alone or in combination with the near field communication, and used for determining associations and/or for communicating data at a rate higher than what is possible using near field communications.

Interface 72 may also be configured to communicate with other devices, such as any of the devices disclosed in commonly assigned U.S. patent application Ser. No. 13/570,934 filed Aug. 9, 2012, by applicants Michael Hayes et al. and entitled PATIENT SUPPORT APPARATUS WITH IN-ROOM DEVICE COMMUNICATION, the complete disclosure of which is hereby incorporated herein by reference and commonly owned by Stryker Corporation of Kalamazoo, Mich. For further details of user interface 72 reference is made to copending application Ser. No. 61/781,308, entitled CONFIGURABLE PATIENT SUPPORT, filed on even date herewith, which is incorporated by reference herein in its entirety and commonly owned by Stryker Corporation of Kalamazoo, Mich.

In addition, apparatus 10 may incorporate a computer (e.g. at interface 72) that acts as a thin client for at least one network service, thereby enabling upgrades, modifications, improvements, and customizations of the one or more functions performed by apparatus 10.

Apparatus 10 may also incorporate sensors to detect the orientation of the support and/condition or status of a patient or devices at the support. The network service may then also provide information, algorithms, data processing, and/or other features for apparatus 10 that relate to such features as:

monitoring patient activity, providing patient care assessments, implementing a patient care protocol, monitoring maintenance needs, and analyzing sensor data.

In still other embodiments, the patient support may be configured to act as a wireless hotspot for providing Internet access to one more mobile devices, including, but not limited to, other patient support apparatuses, smart phones, computer tablets, and medical devices. In this manner, information may be downloaded to the support from, for example, at a remote location, such as a hospital, or vice versa—information at the support can be uploaded to a hospital, such as an emergency room in advance of the patient arriving at the hospital. For further details of suitable communication, reference is made to co-pending patent application Ser. No. 61/790,823, filed on Mar. 15, 2013, entitled PATIENT SUPPORT APPARATUS WITH REMOTE COMMUNICATIONS. Other suitable communication systems are also described in co-pending patent application Ser. No. 61/791,117, filed on Mar. 15, 2013, entitled PATIENT SUPPORT APPARATUS WITH PATIENT INFORMATION SENSORS, both of which are incorporated by reference herein in their entireties and commonly owned by Stryker Corporation of Kalamazoo, Mich.

Referring to FIGS. 1-10, apparatus 10 also may incorporate a plurality of caster wheels 80 to allow apparatus 10 to be maneuvered independently of track assembly 60. For example, suitable caster wheels are available from Tente. Caster wheels 80 may be mounted by articulating arms 82, which allow the caster wheels to be moved from ground engaging positions to non-ground engaging positions where the bottom surface of the respective caster wheel is above the bottom surface of the tracks 62, such as shown in FIG. 3.

Figure 5:
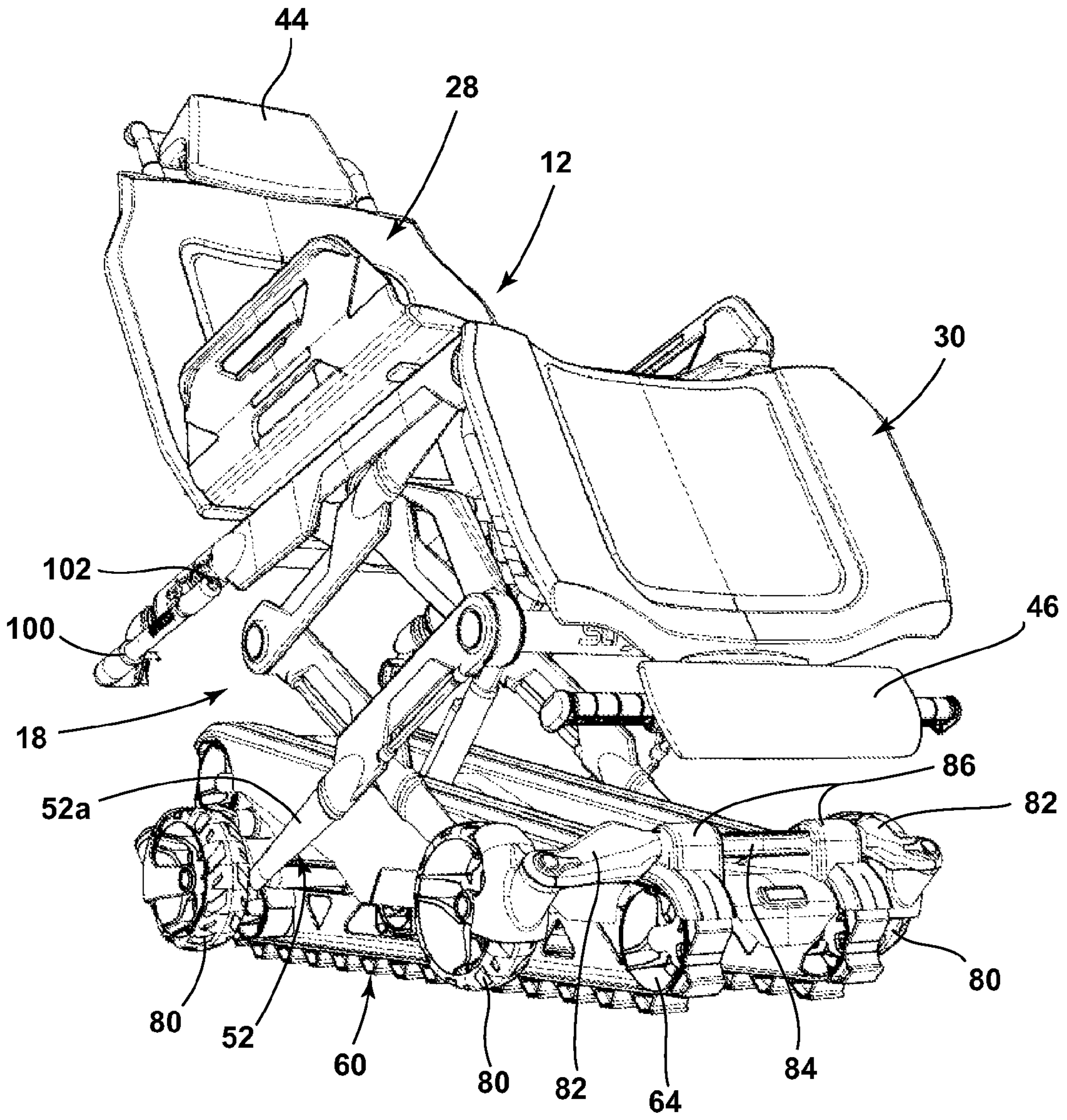
FIG. 5 is another perspective view of the transport apparatus of FIG. 1.
Figure 6:
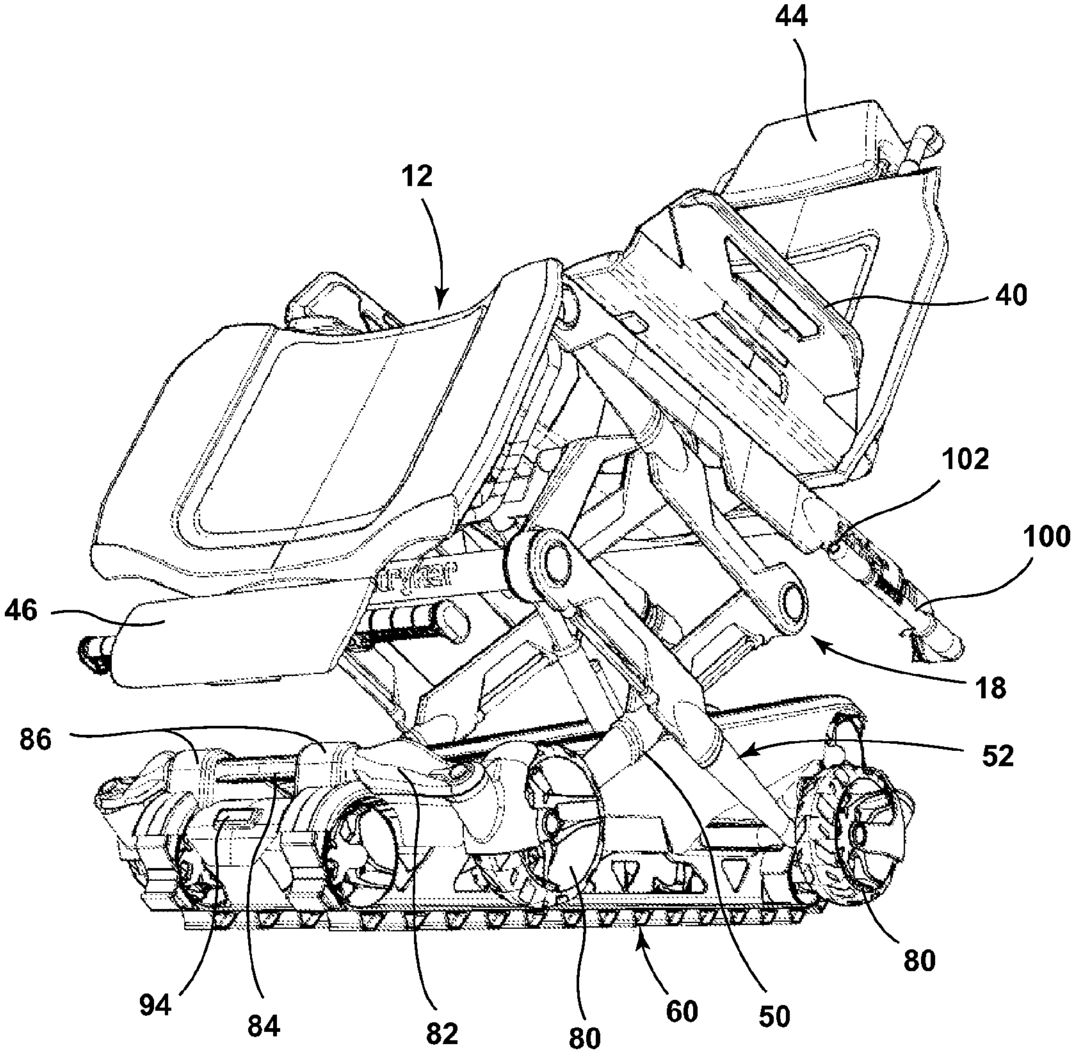
FIG. 6 is yet another perspective view of the transport apparatus of FIG. 1.
Figure 7:
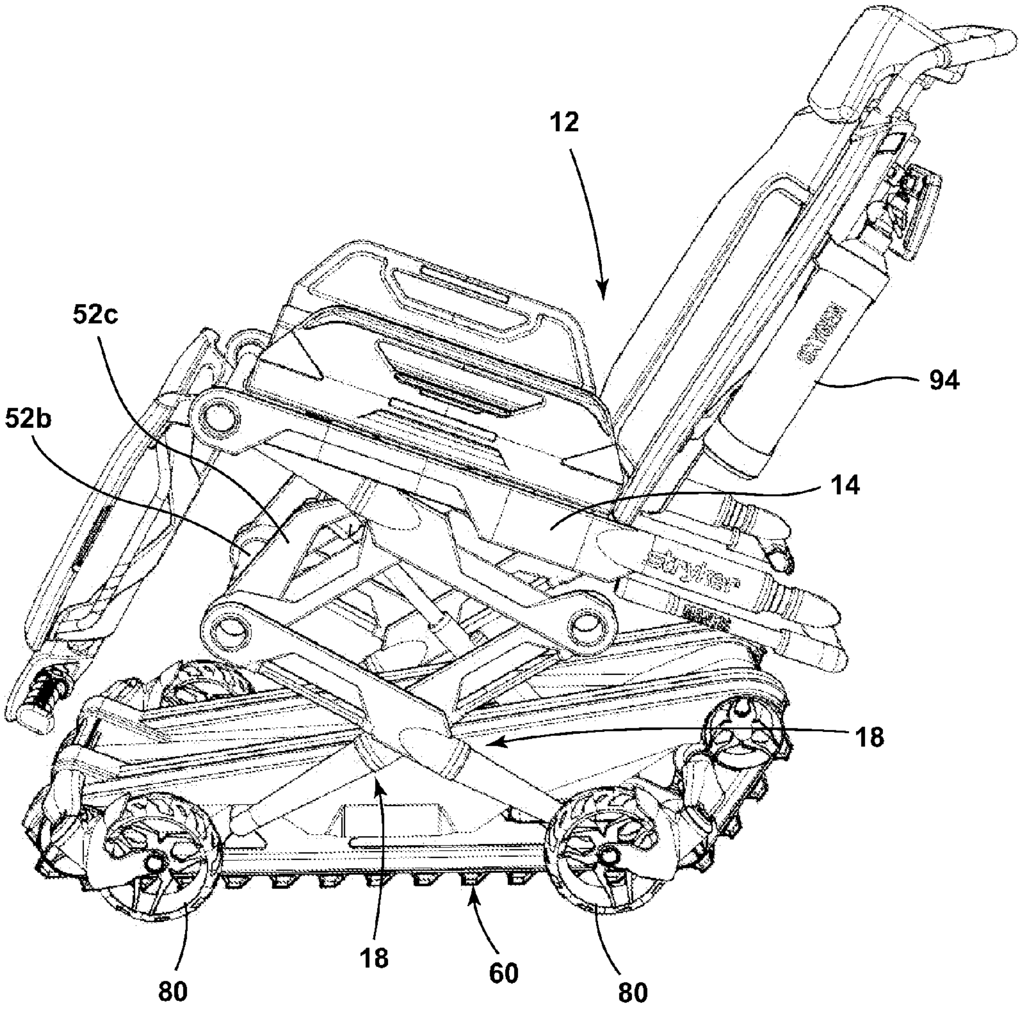
FIG. 7 is another side elevation view of the transport apparatus of FIG. 1.

As best seen in FIGS. 5 and 10, articulating arms 82 of the foot end caster wheels may be mounted to rotatable shafts 84 supported by supports 86, which optionally include a resistive mechanism which resists the movement of the shaft and hence respective caster wheels but allows the caster wheels to be manually moved only when sufficient force is applied to the casters. For example, foot end caster wheels 80 may be mounted to an axle 84, rotatable mounted in supports 86 by bushings and further with a torsional spring, which provides resistant to rotation of shaft over certain ranges of motion but little or no resistance over other ranges of motion to define two defined positions with high resistance, such as the ground engaging position and the non-ground engaging position. For an example of a suitable shaft and spring reference is made to co-pending U.S. patent application Ser. No. 13/783,699, entitled PATIENT SUPPORT, filed on Mar. 4, 2013, which is which is incorporated by reference herein in its entirety and commonly owned by Stryker Corporation of Kalamazoo, Mich.

As best seen in FIG. 10, head end caster wheels 80 may be also mounted to an axle 88, which may be supported in transverse support 90. Support 90 may also be configured to provide resistance to the rotation of shaft 88 and further, optionally, with high resistance positions defining the ground and non-grounding engaging positions of the head end caster wheels.

As noted above, apparatus 10 may incorporate a plurality of lights to provide various functions. For example, apparatus 10 may include lights to provide lighting when the support is used in a low ambient light condition, to provide increased visibility of apparatus 10, or simply to provide enhanced visibility for the emergency medical staff, for example, to indicate where the side rails are and further where the head section is so that the attendants can quickly locate and, when needed, maneuver sections of the support.

For example, referring to FIG. 1, the lighting may comprise light strips 92, for example LED light strips, mounted at side rails 40, in X-frame 18 for example in arms 50 and 52, as well as seat section 28, such as shown in FIG. 9. In this manner, the support and its several components are quickly visible to emergency medical personnel, even when in a low light condition. The support may include additional lighting, such as lighting strips 94 (FIG. 1 and FIG. 10), which may be provided to indicate the status of one or more components, such as the battery or batteries. For example, the light may indicate a fully charged battery status or a low charge battery status.

Referring again to FIGS. 9 and 10, head section 28 may be adapted to support a pair of oxygen bottles 94. For example, head section 28 of deck 12 may include a support 96 mounted to the framework of head section 28 at the back of the deck, which forms receptacles 98 for receiving respective oxygen bottles 94. The support may be removable and further may also support for rail 78 or may include rail 78.

Additional controls may be provided in handles 100, which are mounted to frame 14. For example, handles 100 may be pivotally mounted to frame 14 to allow handles 100 to be moved between operative positions where the handles may be pushed or pulled on to move transport apparatus 10 or a stored position, such as shown in FIGS. 8-10. For example, handles 100 may support one or more switches, such as shown in FIG. 5 which may be used to also control motor 69. In this manner, switches 102 may be configured to override the status of the motor control provided by user interface 72. Similarly, user interface 72 may be configured to override switches 102. In addition, switches 102 may optionally comprise wireless switches to allow further wireless control of apparatus 10. Handles 100 may also provide a mounting surface for user interface 72.

Referring now to FIGS. 13-16, as previously noted, deck 12 may be reconfigured such that seat section 26, head section 28, and foot section 30 lie in a generally common plane to thereby form a cot configuration for apparatus 10. Further, as noted the deck may be positioned in a generally horizontal orientation, such as shown in FIG. 13 or may be tilted in a Trendelenberg or reverse Trendelenberg configuration. This may be achieved by the tilting of deck sections by way of lift mechanism 18.

Figure 11:
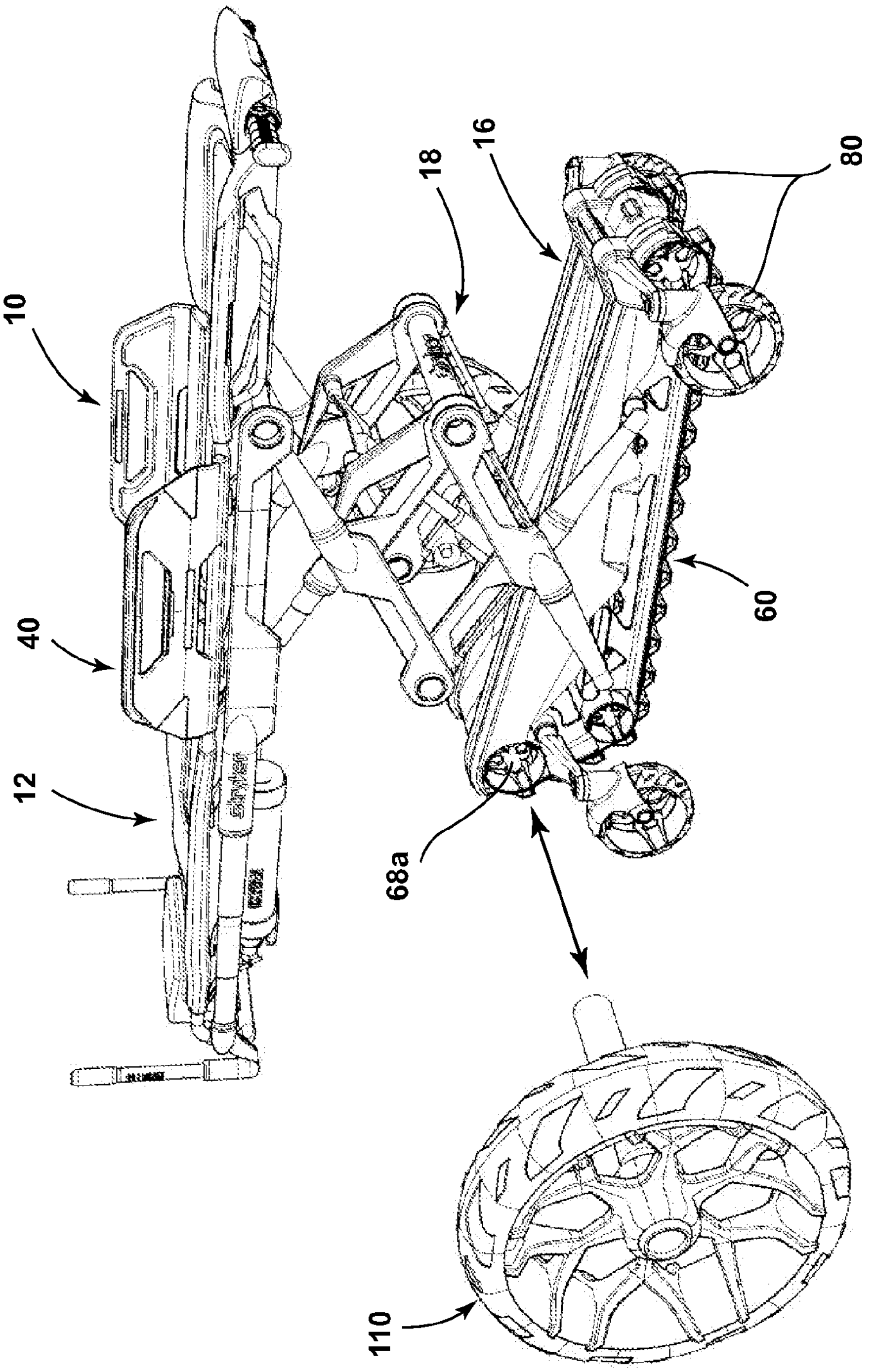
FIG. 11 is another perspective view of the transport apparatus of FIG. 1 shown in a cot configuration.
Figure 12:
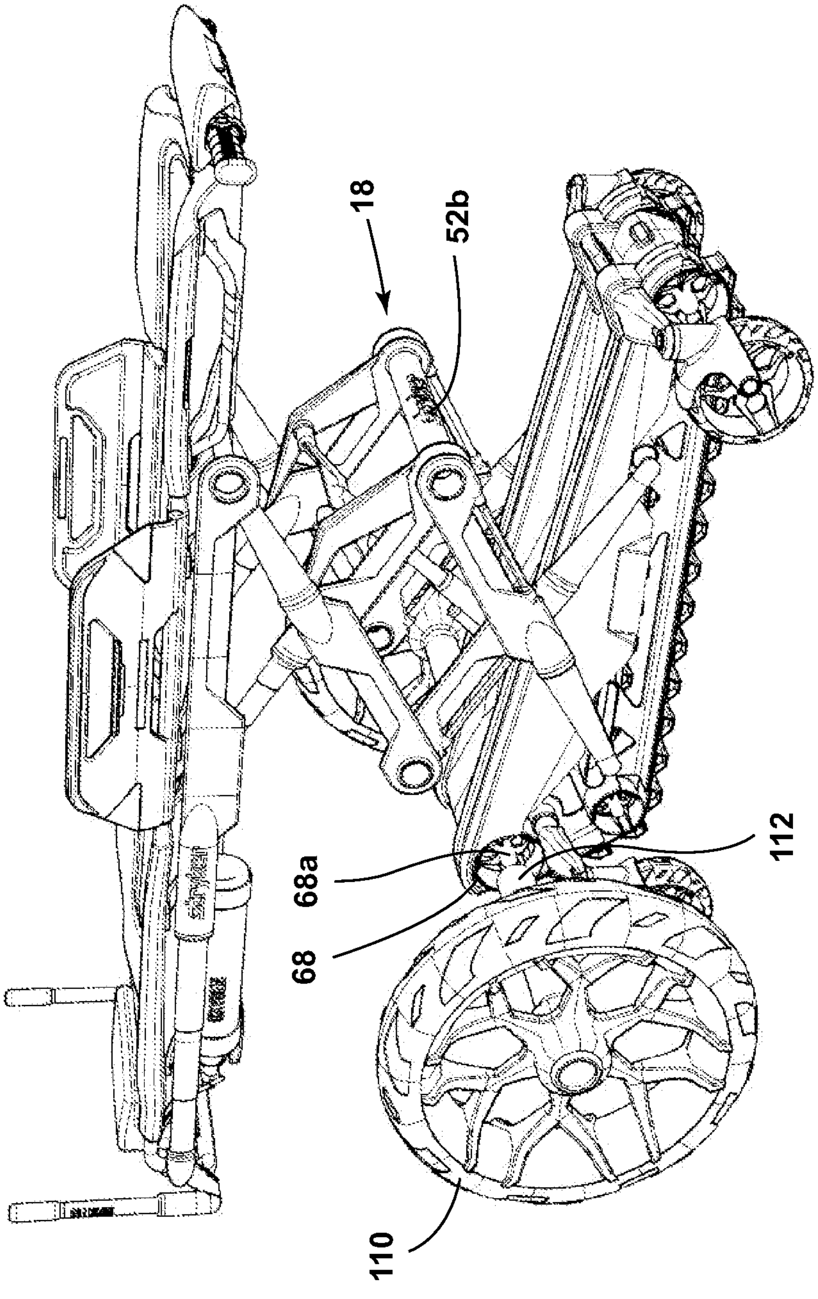
FIG. 12 is another perspective view of the transport apparatus in the cot configuration illustrating the addition of wheels to the transport apparatus.

To increase maneuverability of apparatus 10, apparatus 10 optionally includes auxiliary wheels 110, which may be mounted such as shown in FIGS. 11-12 to drive axle or drive socket 68*a* of wheels 68 by way of a stub shaft 112. In this particular configuration, handles 100 are particularly suitable for maneuvering apparatus 10.

Figure 16:
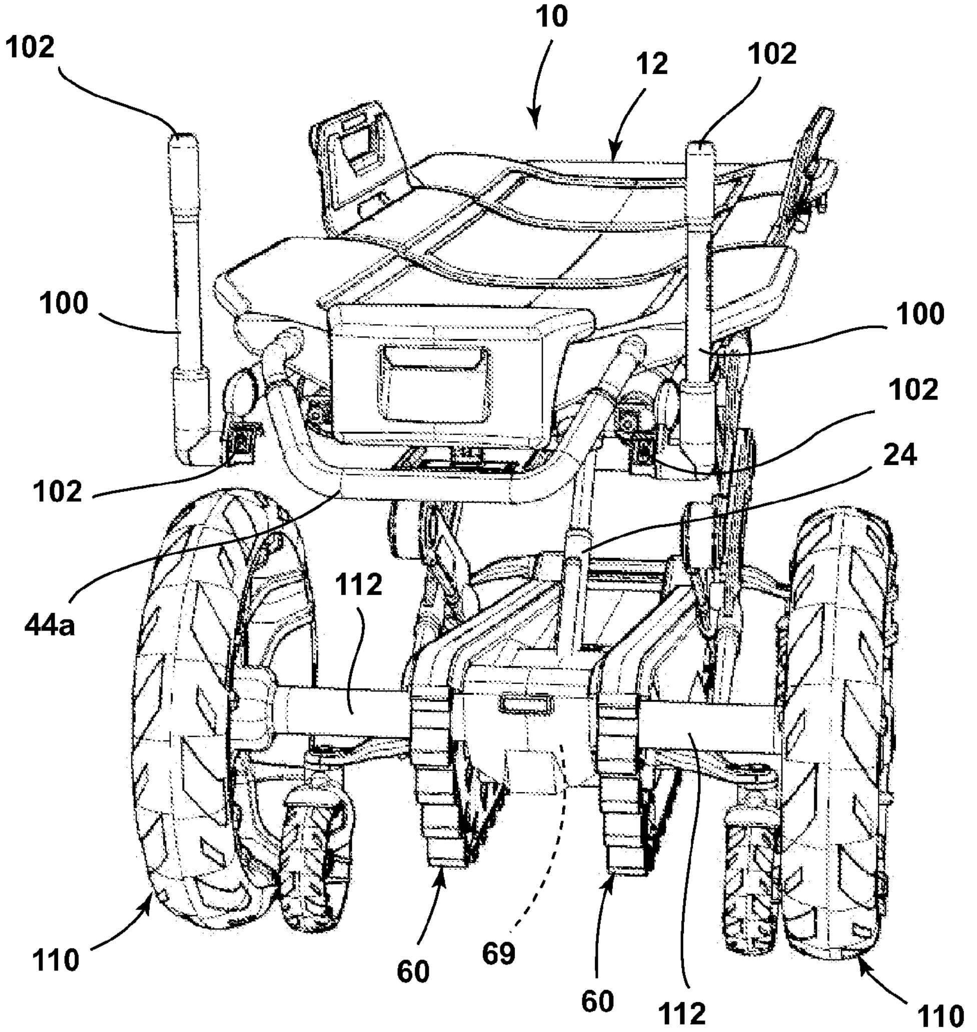
FIG. 16 is an end perspective elevation view of the transport apparatus in the cot configuration.

Referring to FIG. 16, when arms 100 are moved to their generally vertical orientation, such as shown in FIG. 16, switches 102 may be alternately or in addition provided at the base or elbows of handles 100. Alternately, additional switches 102 may be provided adjacent the bases of elbows of handles 100, which provide control of the respective motors, actuators and other devices at apparatus 10 in lieu of the user interface device, which may be generally inaccessible once the head section 28 is lowered generally to the cot configuration. However, it should be understood that the user interface may be removed from head section 28 and instead mounted to, for example, handle 100 or handle 44*a* to provide controls which are readily accessible to a person handling apparatus 10 even when support is a cot configuration.

As would be understood, the transport apparatus may include an articulatable deck to allow the transport apparatus to be configured between a chair configuration and cot configuration and further optionally includes a lift mechanism, which is configured to tilt the deck with the deck is in its cot configuration. The chair may be configured as stair chair with tracks or may have the tracks removed and used as a trackless chair. The lift mechanism may have a compact configuration, which can provide a great range of motion and further may allow the deck to be lowered to a low height of less than 14, less than 13" and as low as 12". Further, the lift mechanism allows the deck to tilt even when in its chair configuration to provide a more comfortable sitting arrangement for a person supported on the transport apparatus. In addition, with the dual X-frame configuration the foot section can be lowered into a chair position even when said X-frames are in a lowered position. For example, the X-frames as shown may be configured to remain in a footprint defined by the seat section when the X-frames are fully collapsed to their lower most position to provide a compact mechanism while still retaining a full range of motion.

Further, the transport apparatus may incorporate an auxiliary wheel, in addition to its casters, to offer greater maneuverability and stability and optionally to provide a powered transport apparatus.

Figure 17:
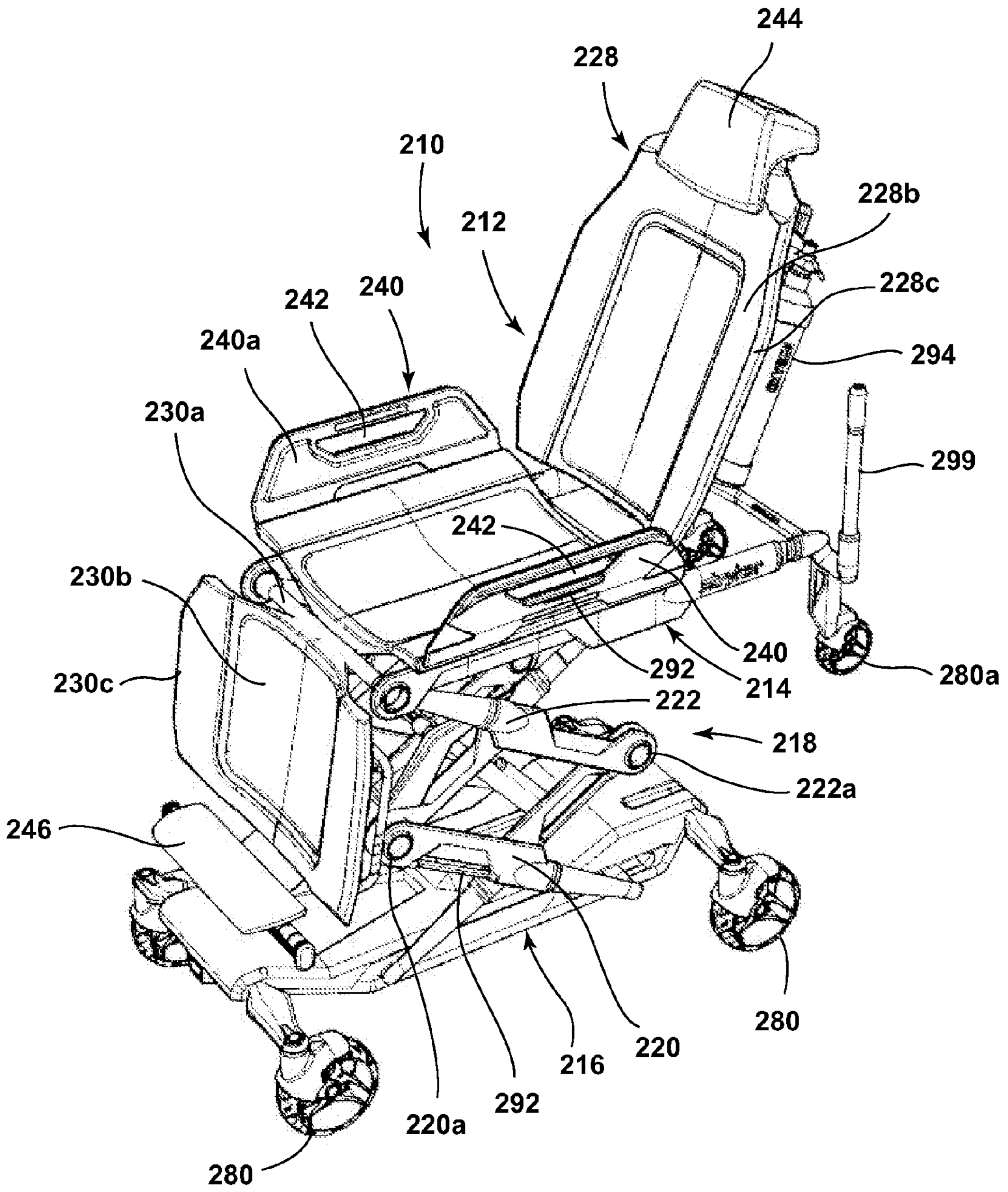
FIG. 17 is a perspective view of a transport apparatus of the present invention in the form of a cot shown reconfigured in a chair configuration.
Figure 17A:
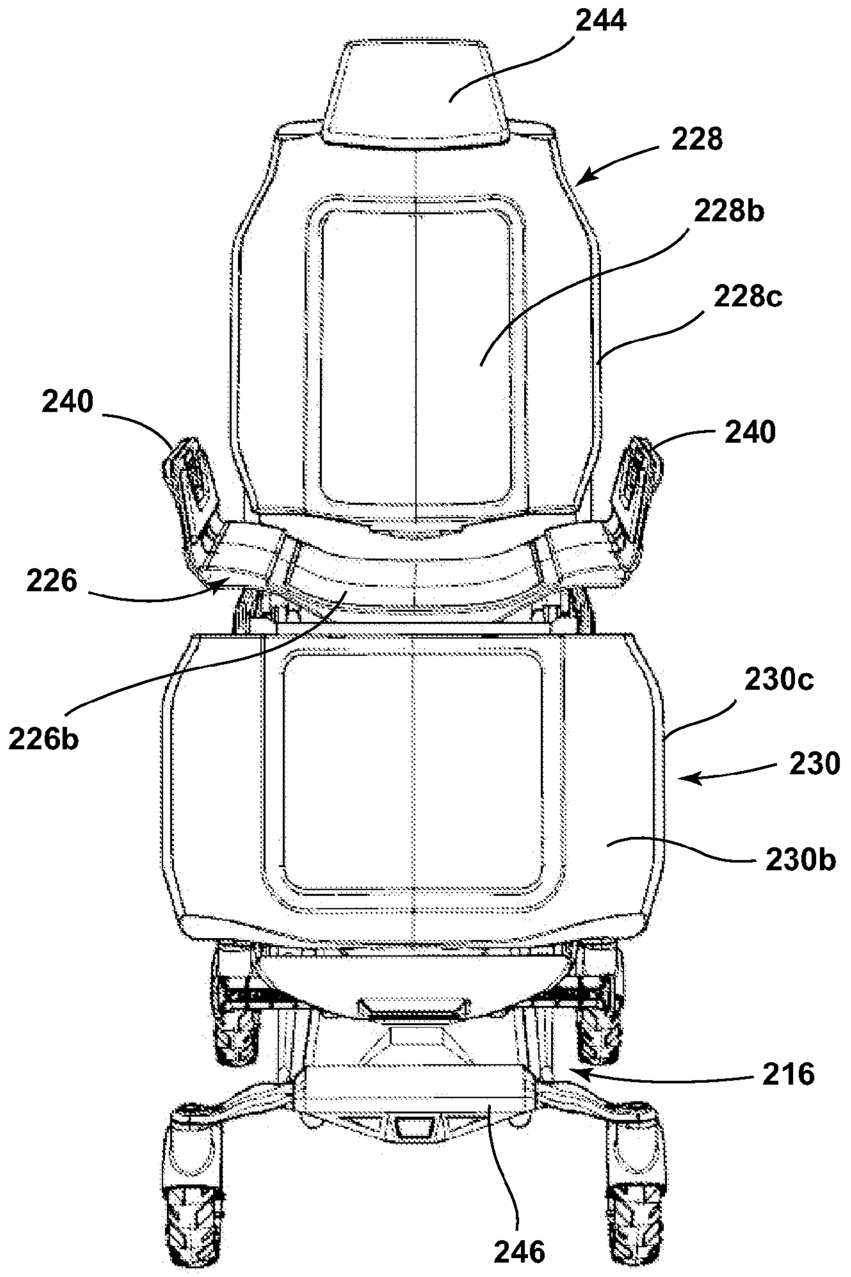
FIG. 17A is a front view of the transport apparatus of FIG. 17.
Figure 18:
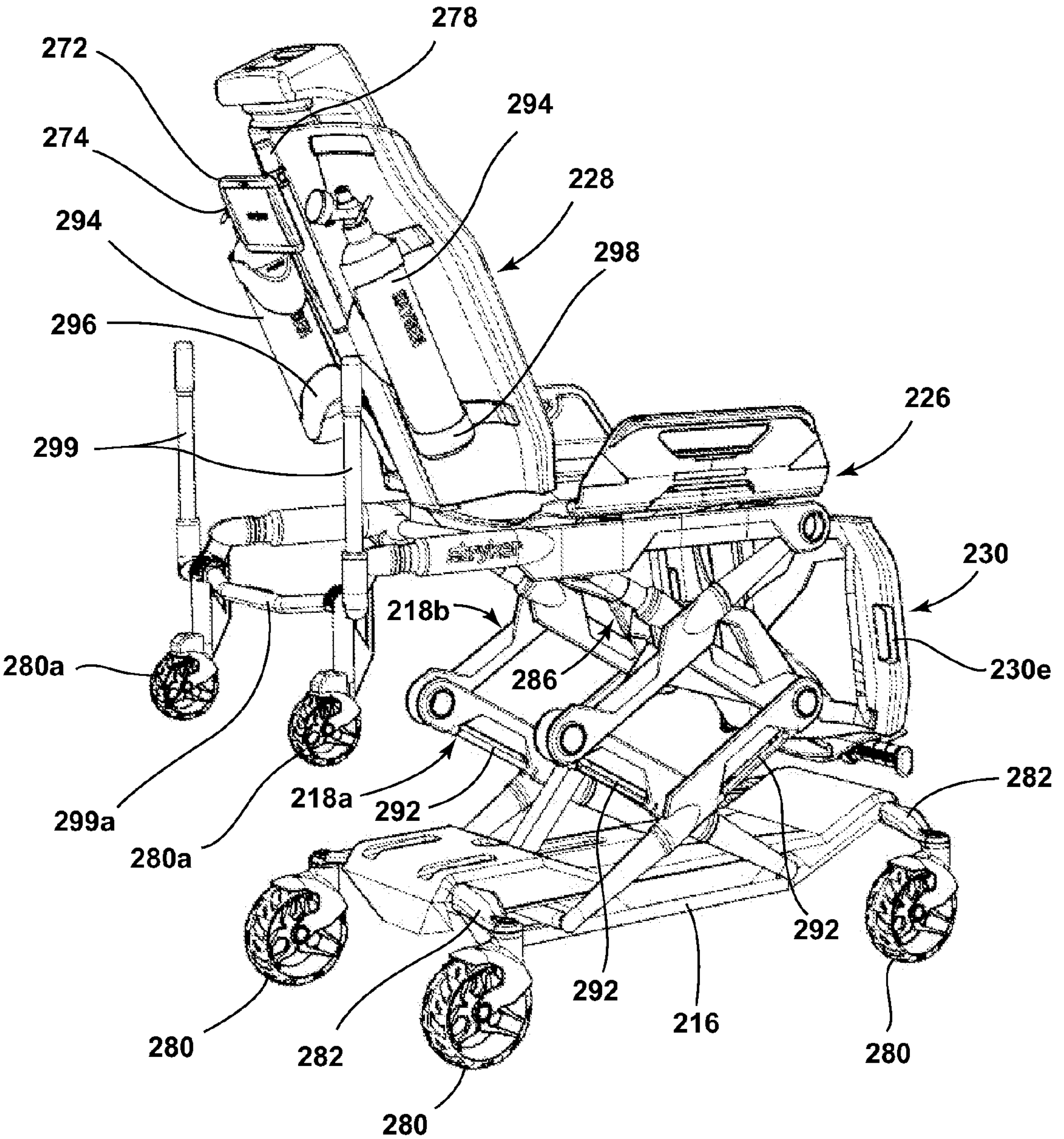
FIG. 18 is another perspective view of the transport apparatus of FIG. 17.
Figure 23:
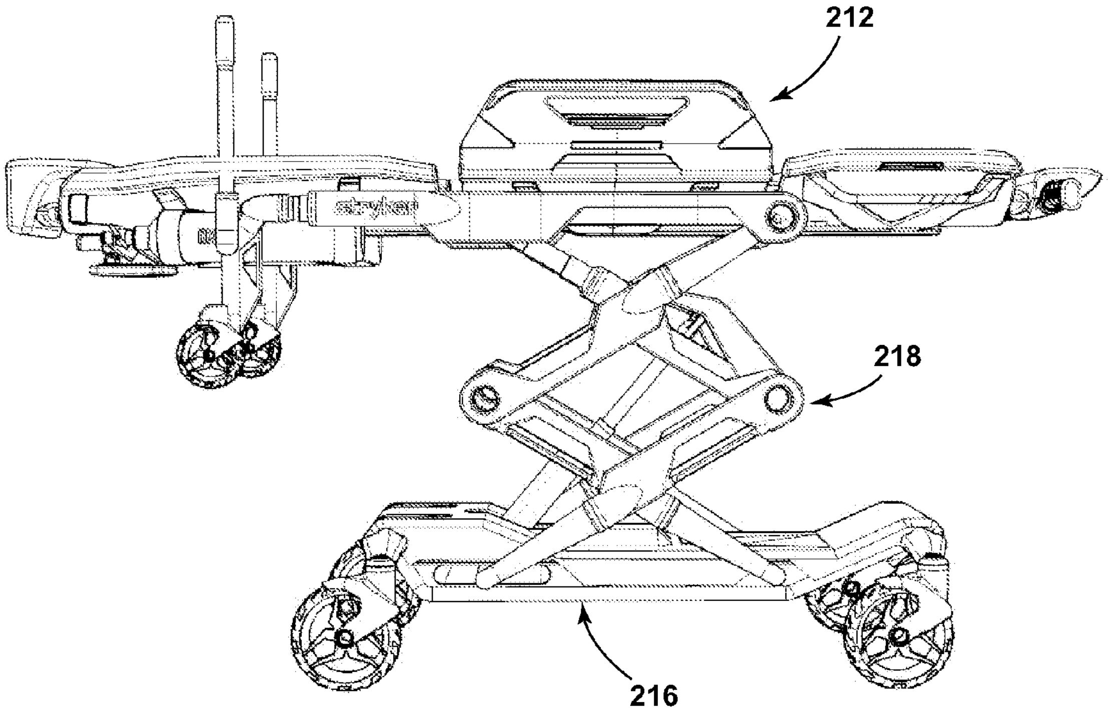
FIG. 23 is another side elevation view of the transport apparatus of FIG. 17 shown in a configuration for supporting a patient in a supine position.

Referring to FIG. 17, the numeral 210 generally designates another embodiment of a transport apparatus. As will be more fully described below, transport apparatus 210 may, similar to apparatus 10, include an articulatable deck to allow the transport apparatus to be configured between a chair configuration, such as shown in FIG. 17, and cot configuration, such as shown in FIG. 23. Further, the transport apparatus, similar to apparatus 10, optionally includes a lift mechanism which has a compact configuration that can provide a great range of motion. In addition, the lift mechanism may be configured to tilt the deck section to provide a more comfortable sitting arrangement for a person supported on the transport apparatus when the transport apparatus is a chair configuration.

In another aspect, the transport apparatus may incorporate a releasable litter deck so that the deck may be removed for use as or on another transport apparatus. For example, the litter deck may be transferred to another transport apparatus frame or removed for replacement with another litter deck to thereby customize the transport apparatus. Or the litter may be configured to be removed and then unfolded into a chair configuration, such as a stair chair configuration. In this manner, apparatus 210 may provide increased versatility.

Referring again to FIG. 17, transport apparatus includes a litter deck 212, which is supported on a frame 214 and a base 216, which supports the frame and the deck by way of a lift mechanism 218. In the illustrated embodiment, lift mechanism 218 comprises a double X-frame lift mechanism with a pair of lower X-frames 218*a* and a pair of upper X-frames 218*b*, which are joined at their respective upper and lower ends by pivot connections 220*a* and 222*a*. The lower ends of lower X-frame members 218*a* are pivotally joined to base 216 with one of the lower ends being slidably, pivotally mounted to the base and the other pinned to the base. Similarly, the upper X-frame members are pivotally mounted to frame 214 with one upper end being slidably pivotally mounted and the other end pinned, which is beneath the pinned ends of the upper X-frames. In this manner, when the X-frames are pivoted about to their respective central pivot axes 220 and 222, frame 214 and hence deck 212 will be lowered or raised relative to base

216, as would be understood by those skilled in the art. Further, the deck will shift in the direction of the head end of the base.

Figure 19:
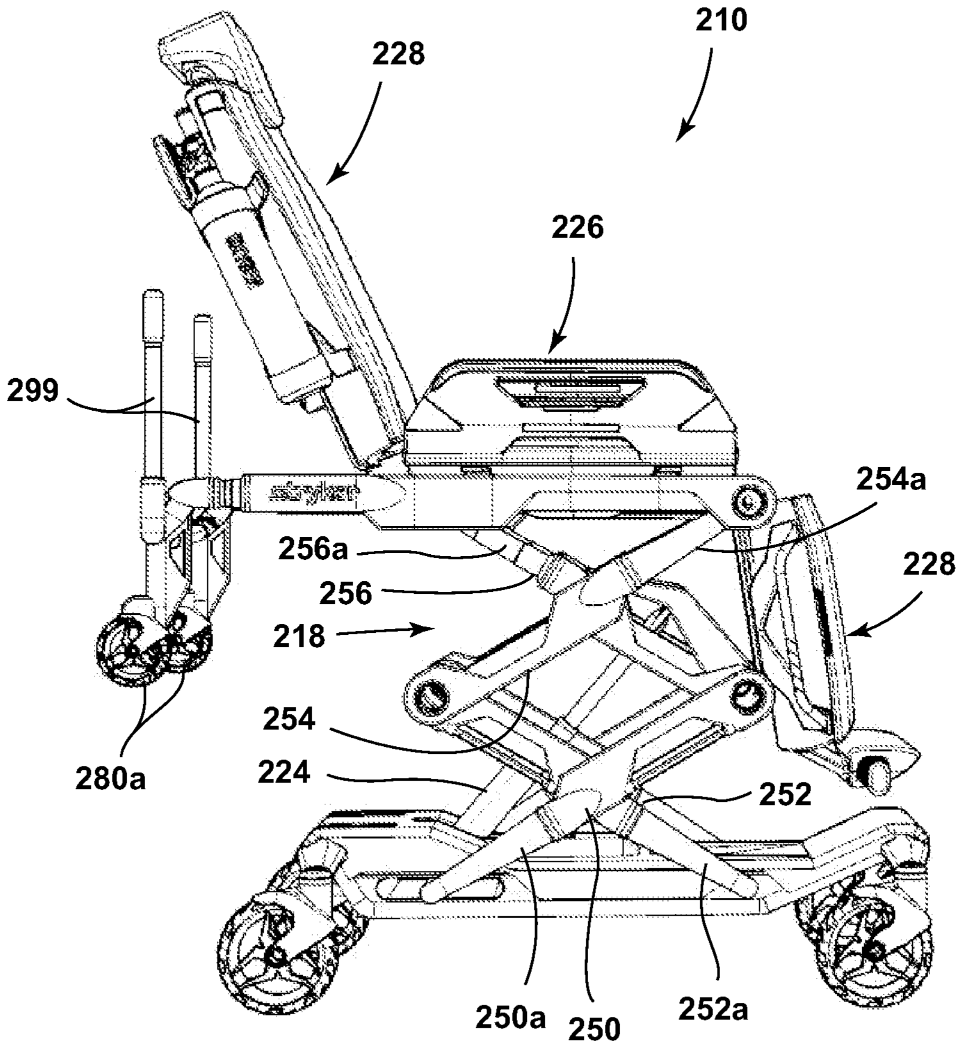
FIG. 19 is a side elevation view of the transport apparatus of FIG. 17.
Figure 21:
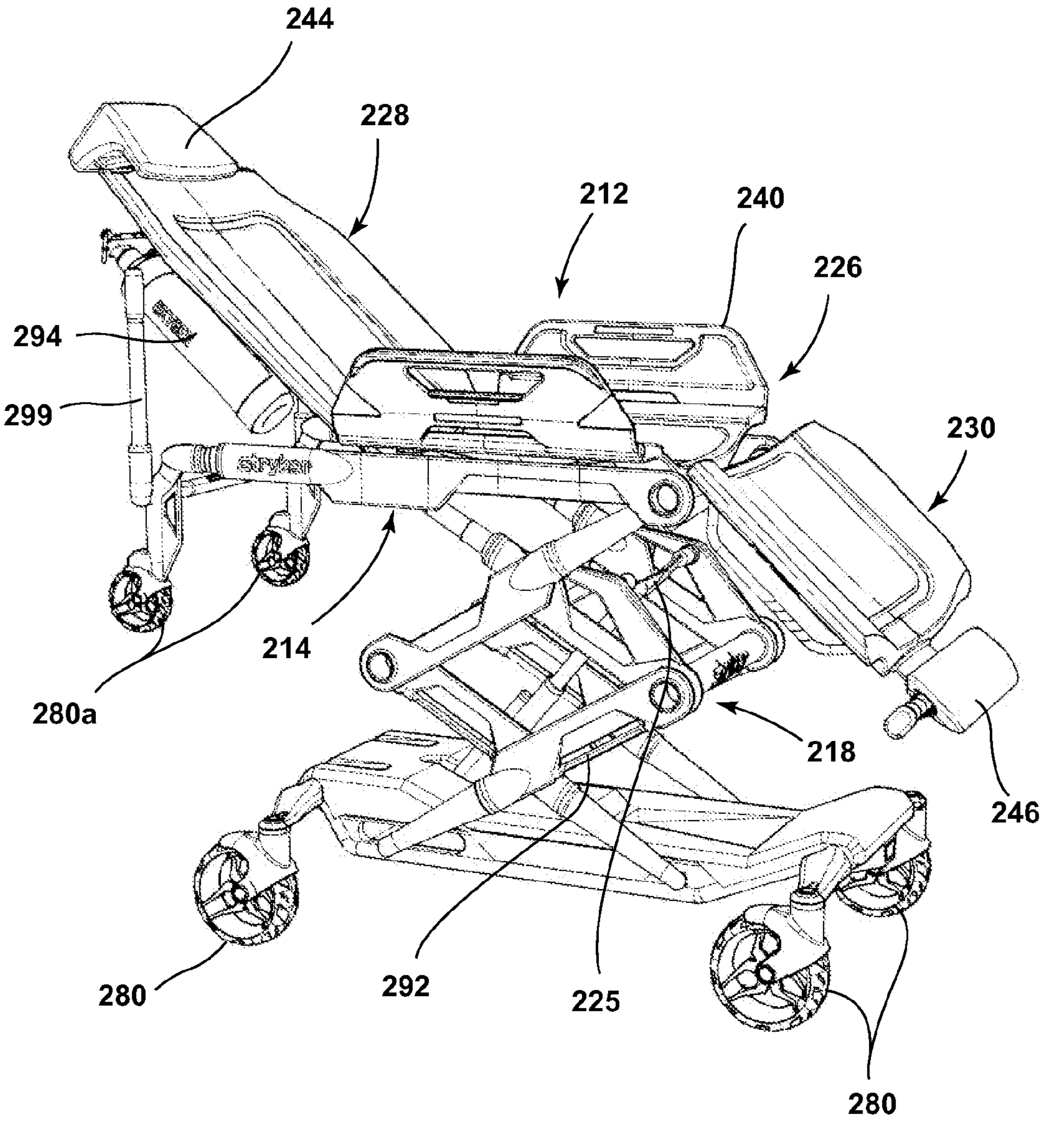
FIG. 21 is another perspective view of the transport apparatus of FIG. 17.
Figure 22:
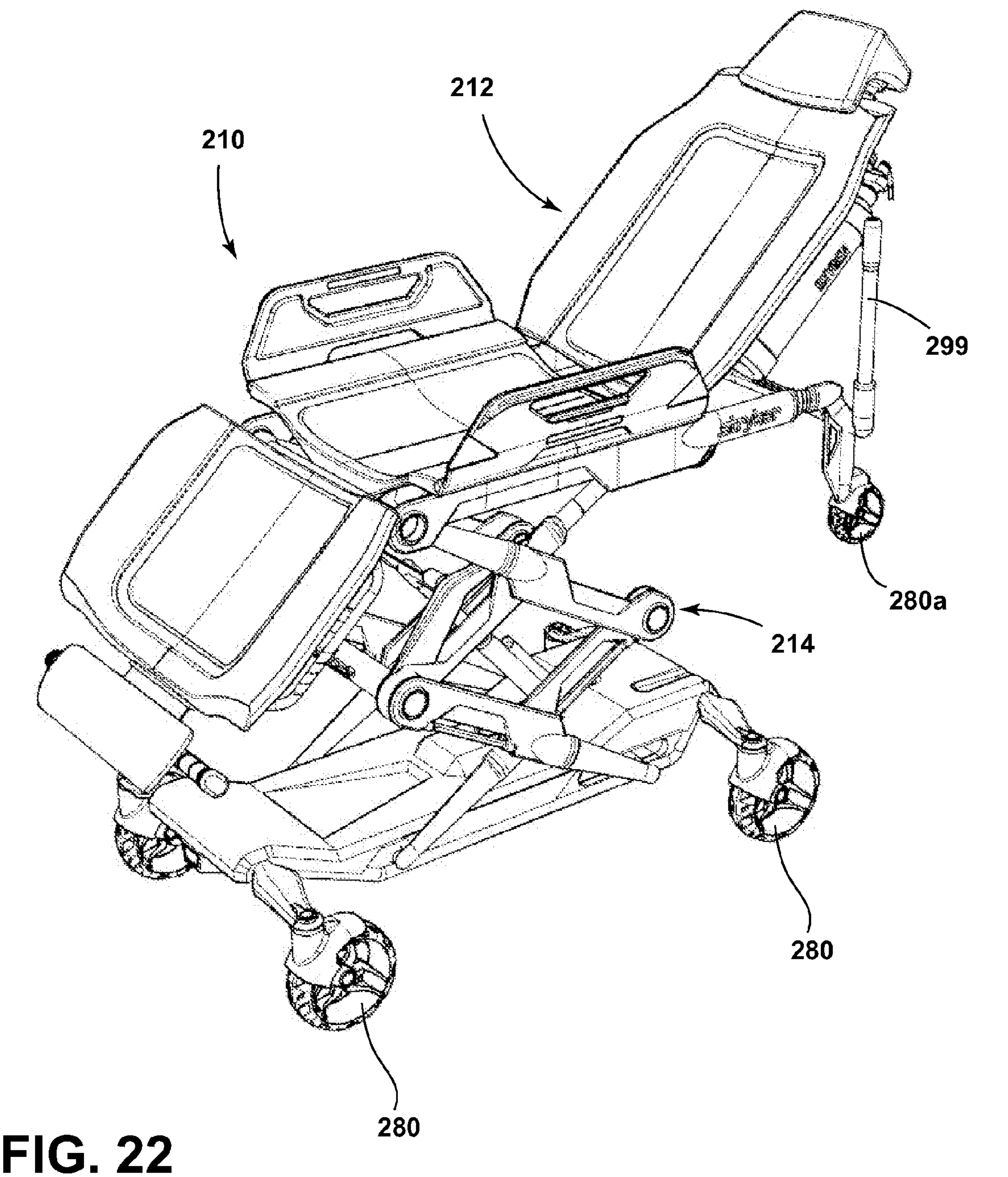
FIG. 22 is yet another perspective view of the transport apparatus of FIG. 17.

The unfolding and folding of the respective X-frames is provided by a driver 224, which is best illustrated in FIG. 19, for example, in the form of a cylinder, such as an electrically actuated cylinder, which is mounted on one end to base 216, for example, by way of a pivot connection, such as a bushing, and pivotally mounted by a bushing at its opposed end to a transverse rod 225 (FIG. 21), which is mounted between the arms of the upper X-frame members, as described below.

Figure 24:
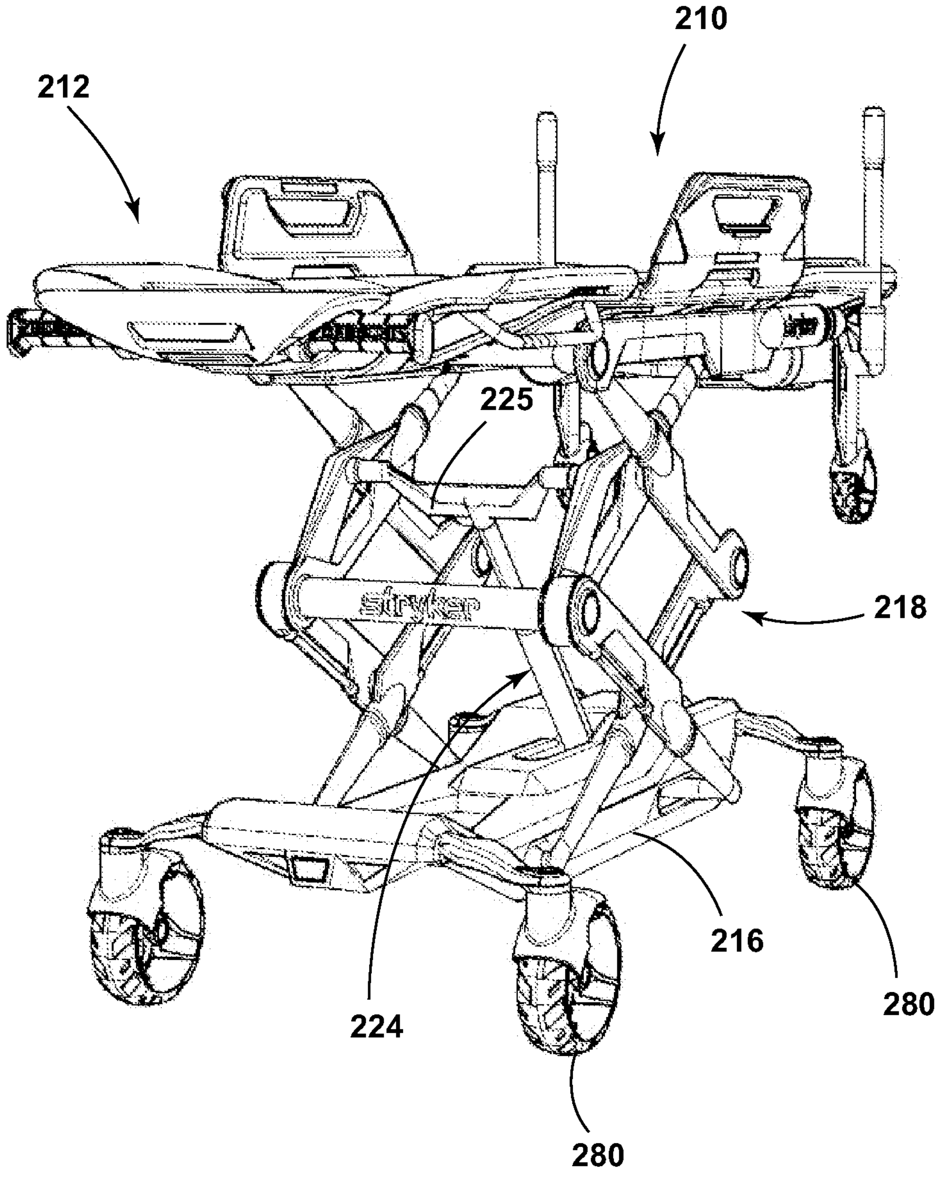
FIG. 24 is a perspective view of the transport apparatus in the configuration shown in FIG. 23.

Referring to FIG. 24, deck 212 includes a seat section 226 and a head section 228 and a foot section 230, which are each articulatable relative to the seat section 226 and independently articulatable relative to the seat section 226 and further with respect to lift mechanism 218. Each section may include a frame and a skin to support pads described below. Alternately, one or more of the seat section, head section, and foot section may comprise a perimeter frame and a pad supported by said frame, wherein the pad is exposed on both sides of the respective section. For example, the pad (or pads) may comprise a core cushioning member and a base supporting the cushioning member, with both the base and cushioning member enveloped in a cover, such as a liquid impermeable cover, such as vinyl. The base may be formed form a variety of materials that provide stiffness to the cushioning member. For example, the base may be solid or a mesh or a lattice and be formed from wood, metal, plastic, including plastic reinforced, for example with fibers or the like or a combination thereof. The base may also be formed from discrete members, such as strips or batons.

Figure 25:
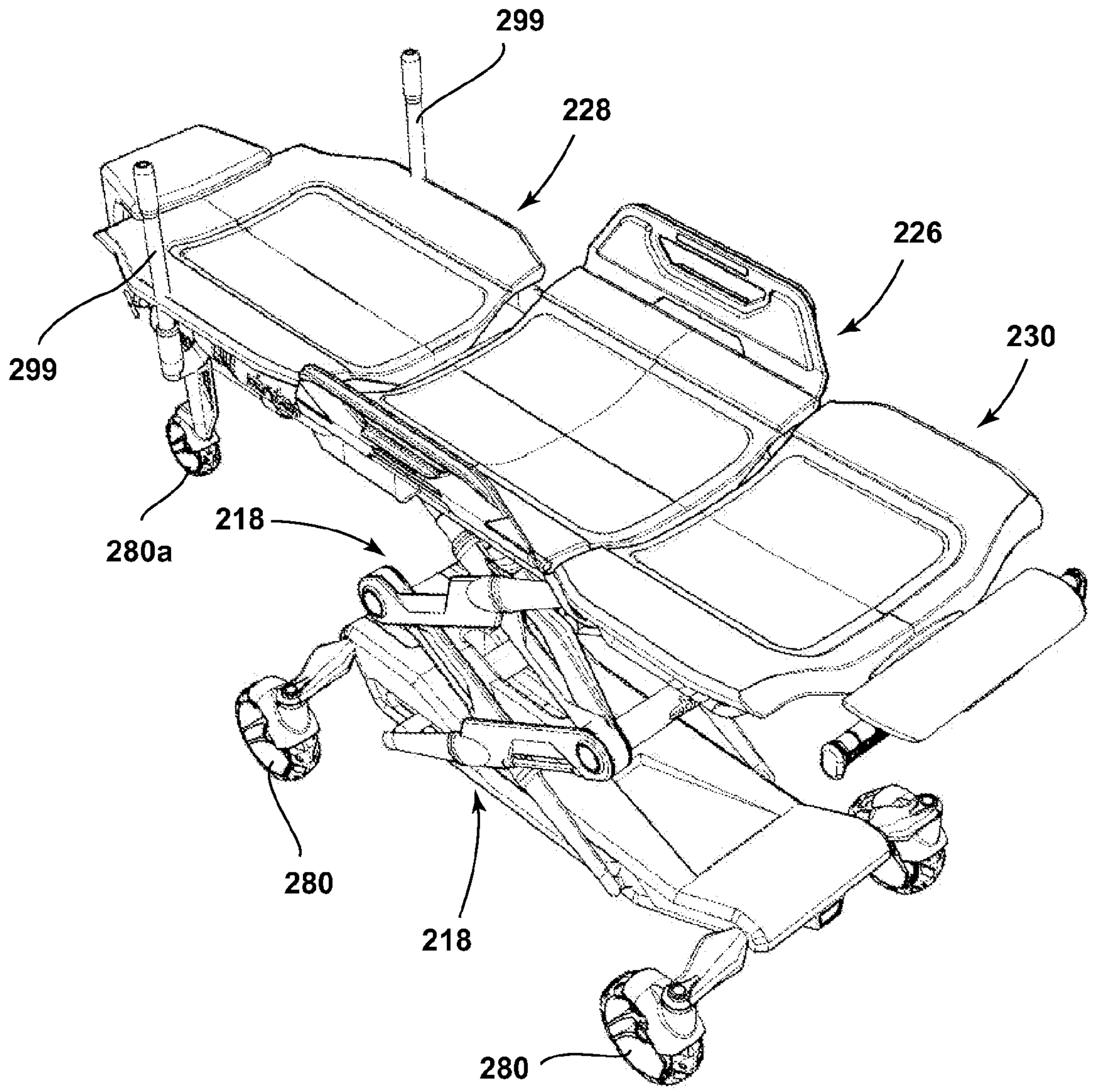
FIG. 25 is a top perspective view of the transport apparatus in the configuration shown in FIG. 23.

Each respective section of the deck may include a pad to thereby form a sectioned support surface for a patient. The respective pads are sized and configured (and gatched) such that the deck sections may be moved between the chair configuration as shown in FIGS. 17-22, and further the cot configuration such as shown in FIGS. 23-25 without running interference with the adjacent pad. Additionally, the pad sections 228*b* and 230*b* may include laterally extending lips 228*c* and 230*c*, respectively, which optionally extend beyond the supporting framework of the deck to reduce the gap and at least partially fill the space between the deck and adjacent support surface to facilitate a patient transfer from the cot to the adjacent support surface.

Seat section 226 optionally includes side rails 240 that are pivotally mounted about the opposed sides of seat section 226 to frame 214. Side rails 240 may each include a hand hold 242 and further may be provided with a pad 240*a* to provide cushioned lateral support to a person supported on apparatus 210.

Side rails 240 are mounted in a generally vertical orientation relative to seat section 226 and may further be released from their generally vertical orientation to an angle relative to the support surface to increase the width of the deck at least of the seat section of the deck. For example, side rails 240 may be configured to be tilted in a range from a generally vertical orientation, such as about 80-90 degrees relative to the patient deck at seat section 226 to an angle in a range from about 30-50 degrees relative to the seat section, and optionally no more than 45 degrees to avoid creating any instability issues.

In addition to foot section 230 and head section 228, deck 212 may also incorporate extendible head and foot rests 244, 246 which may be mounted on telescoping tubes to thereby extend the length of the deck to accommodate taller patients. Telescoping tubes 244*a* and 246*a* may be moved manually, for example, and further may provide resistance to movement of the respective head rest and foot rest (and provide infinite positioning between a fully extended position and retracted position) or may include detent mechanisms to provide defined positions for the respective rests. Alternately, the rests may be moved by actuators, such as electrically powered actuators.

Figure 19A:
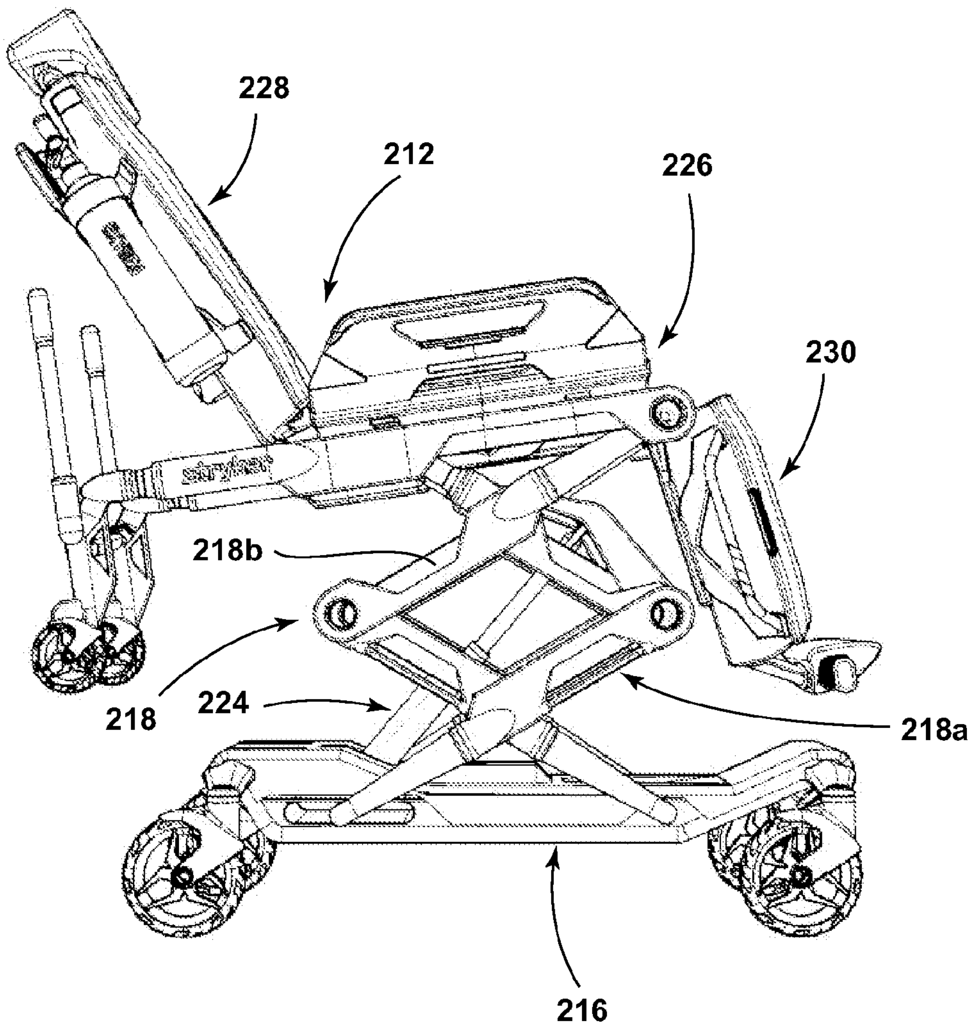
FIG. 19A is a side elevation similar to FIG. 19 showing the deck tilting.
Figure 19B:
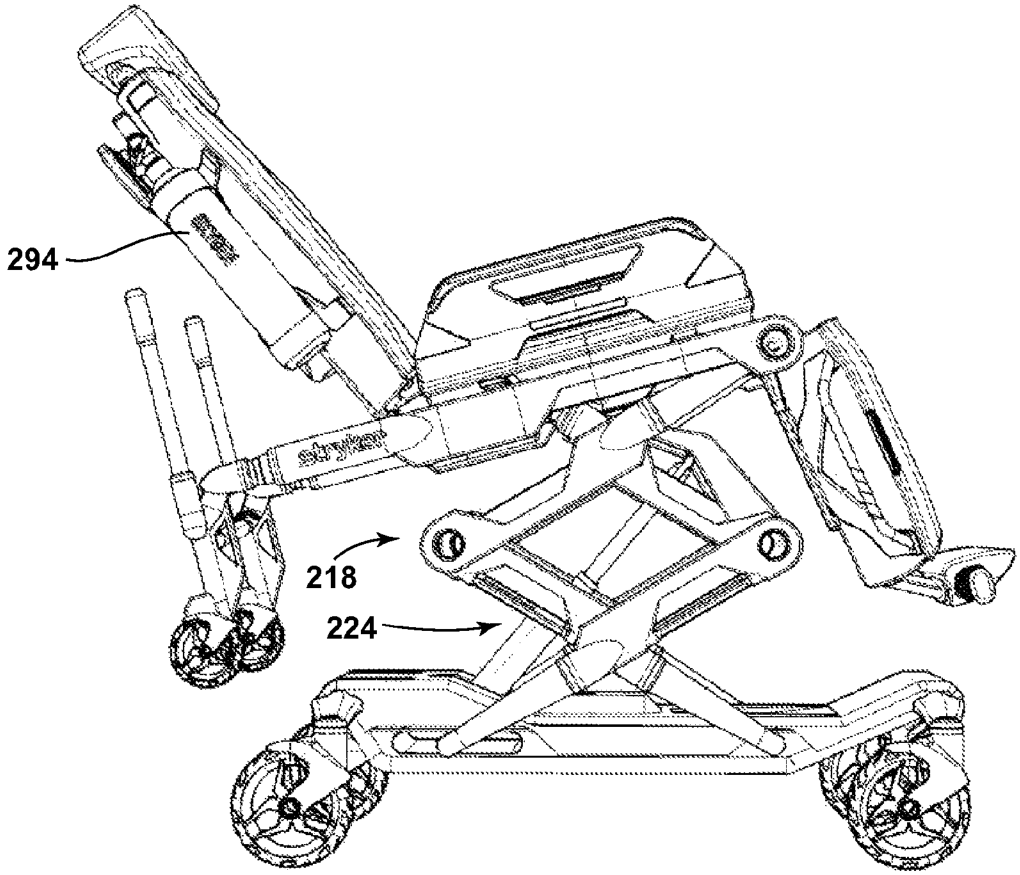
FIG. 19B is a side elevation similar to FIG. 19 showing the deck tilting to an even greater angle.

Referring again to FIGS. 19 and 19A, X-frames 218*a*, 218*b* of lift mechanism 218 are formed by pivotally joined arms 250 and 252, and 254 and 256, respectively. Each arm 250, 252, 254, and 256 may include a telescoping arm 250*a*, 252*a*, 254*a*, and 256*a*, respectively. The telescoping arm sections of X-frames 218*a* may be pivotally mounted to base 216, with the telescoping arms 254*a*, 256*a* being pivotally mounted to frame 214. Therefore, in addition to folding about the respective pivot axes, the respective arms of the X-frames can be extended or contracted to thereby tilt deck 212 such as shown in FIGS. 19A and 19B. In this manner, when a patient is supported on the deck 212, and transport apparatus 210 is in its stair chair configuration, such as shown in FIGS. 17-26, a patient may be tilted relative to the lift mechanism and therefore relative to the base at an angle that is more comfortable for patient, for example in a range of 0 (zero) degrees to plus or minus about 40 degrees from horizontal. Further, lift mechanism 218 may tilt deck 212 when in its cot configuration to tilt the deck into a Trendelenberg or reverse Trendelenberg configuration.

Figure 20:
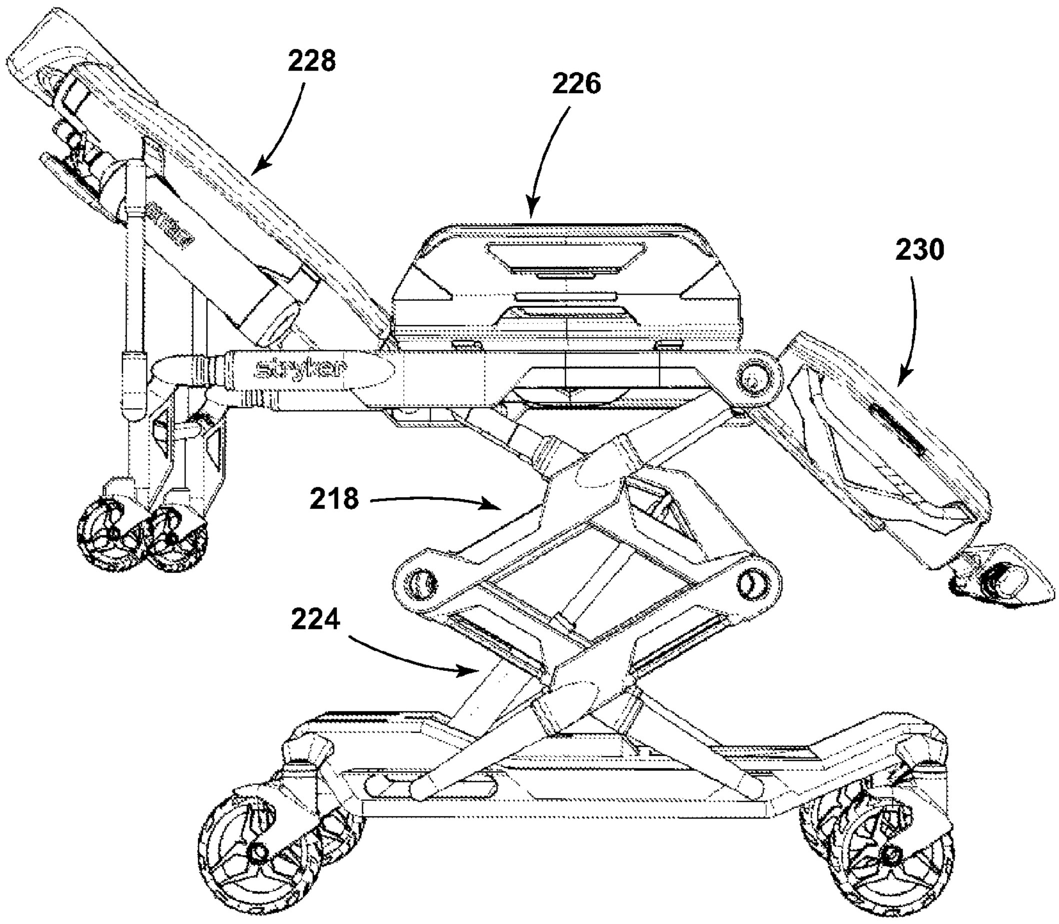
FIG. 20 is another side elevation view of the transport apparatus of FIG. 17.

As best seen in FIGS. 17, 24 and 25, arms 250 may be joined together by a transverse member, such as a transverse rod 252*a*. Similar, arms 254 may be joined by transverse rod 225 (FIG. 26) by way of offsetting arms 254*b* (FIG. 20). With this configuration, the lift mechanism may have a compact configuration, which can provide a greater range of motion and further may allow the deck to be lowered to a low height of less than 14", less than 13" and as low as 12".

Actuator 224 may be controlled by controls mounted to apparatus 210 including, for example, a wireless motor control provided for example by a user interface 272, mounted for example to a rail 278 provided on the back of head section 228. In the illustrated embodiment user interface 272 comprises a touch screen 274.

Referring to FIGS. 17-26, apparatus 210 may incorporate a plurality of caster wheels 280. For example, suitable caster wheels are available from Tente. In addition, caster wheels 280 may be mounted to axles rotatably mounted in base 216 by bushings and further with springs, such as torsional springs, which may provide a more cushioned ride for the patient. For an example of a suitable shaft and spring reference is made to co-pending U.S. patent application Ser. No. 13/783,699, entitled PATIENT SUPPORT, filed on Mar. 4, 2013, which is which is incorporated by reference herein in its entirety and commonly owned by Stryker Corporation of Kalamazoo, Mich.

In addition, apparatus 210 may incorporate its plurality of lights, such as light strips 292 similar to light strips 92 described above, to provide various functions. As noted, one or more lights may provide an indication of a status of a component of the transport apparatus or of a component supported or mounted to apparatus 210. For example, the lights may be used to indicate that the apparatus is in a transport height or a loading height configuration, for example, using sensors that detect the position of the actuators or the lift mechanism and which are in communication with the on-board controller, which controls the light or lights. Lights also may be used to indicate the status of the apparatus. For example, the apparatuses described herein may incorporate an impact detector or indicator that provides an indication that the apparatus was subject to a damaging impact abuse, such as described in copending U.S. Pat. application entitled ENERGY ABSORBING FASTENING SYSTEM, Ser. No. 13/712,303, filed Dec. 12, 2012, which is incorporated by reference herein in its entirety. As described, the indicator may located between the deck and the deck support frame comprise a strain gauge, such as a load cell, a piezoelectric crystal, or an accelerometer in combination with a scale to indicate the level of acceleration all of which can generate signals that can be processed by the controller mounted on the apparatus, which then generates an indicia, visual or audible, to indicated either the level of impact or that a certain magnitude had been exceeded. This indicia, for example, may comprise one or more of the lights referenced above being illuminated or illuminated with a specified color.

Referring again to FIGS. 25 and 26, head section 228 may similarly include a support 296 mounted to the framework of head section 228 at the back of the deck, which forms receptacles 298 for receiving respective oxygen bottles 294 and also may include controls provided, for example, in handles 299, which may be mounted to frame 214. In the illustrated embodiment, handles 299 comprised fixed tubes located and mounted at the head end of frame 214 and further may be commonly mounted to a transverse support 299*a*, which may be configured as a handle and a mounting structure for head end caster wheels 280*a*. Head end casters wheels 280*a* are supported from frame 214 to support the head end of support when apparatus 210 is in a folded configuration when deck is lowered and, for example, when apparatus 210 is being loaded for example into an emergency vehicle, such as into the back of an ambulance.

Figure 29:
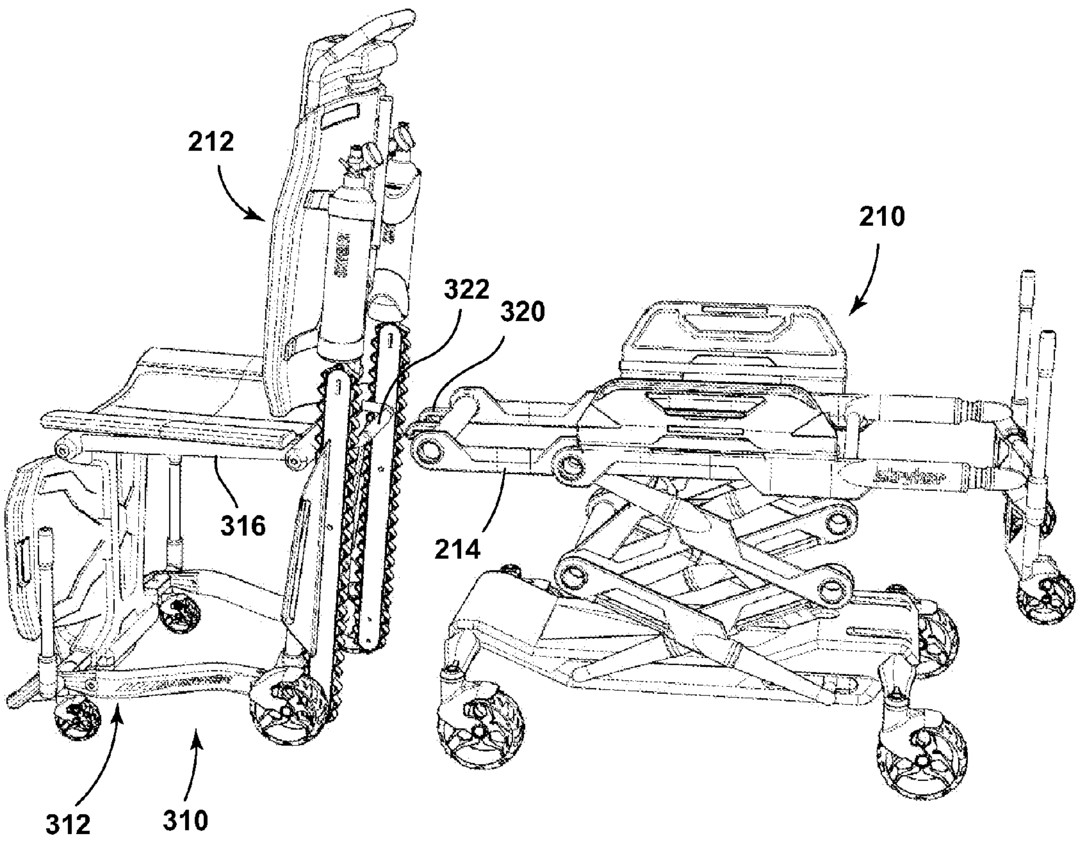
FIG. 29 is a similar view of FIG. 27 with the stair chair moved further away to show the back of the stair chair engagement structure.

Referring now to FIGS. 23-25, as previously noted, deck 212 may be reconfigured such that seat section 226, head section 228, and foot section 230 lie in a generally common plane to thereby form a support surface in a cot configuration for apparatus 210. Further, as noted the deck may be positioned in a generally horizontal orientation, such as shown in FIG. 29 or may be tilted in a Trendelenberg or reverse Trendelenberg configuration. This may be achieved by the tilting of deck sections by way of lift mechanism 218. As would be understood from the description, the lift mechanism, allows the deck to tilt even when in its chair configuration to provide a more comfortable sitting arrangement for a person supported on the transport apparatus. In addition, with the dual X-frame configuration the foot section can be lowered into a chair position even when said X-frames are in a lowered position. For example, the X-frames as shown may be configured to remain in a footprint defined by the seat section when the X-frames are fully collapsed to their lowest position with clearance for articulated foot section to be moved to a seated to provide a compact mechanism while still retaining a full range of motion.

Figure 26:
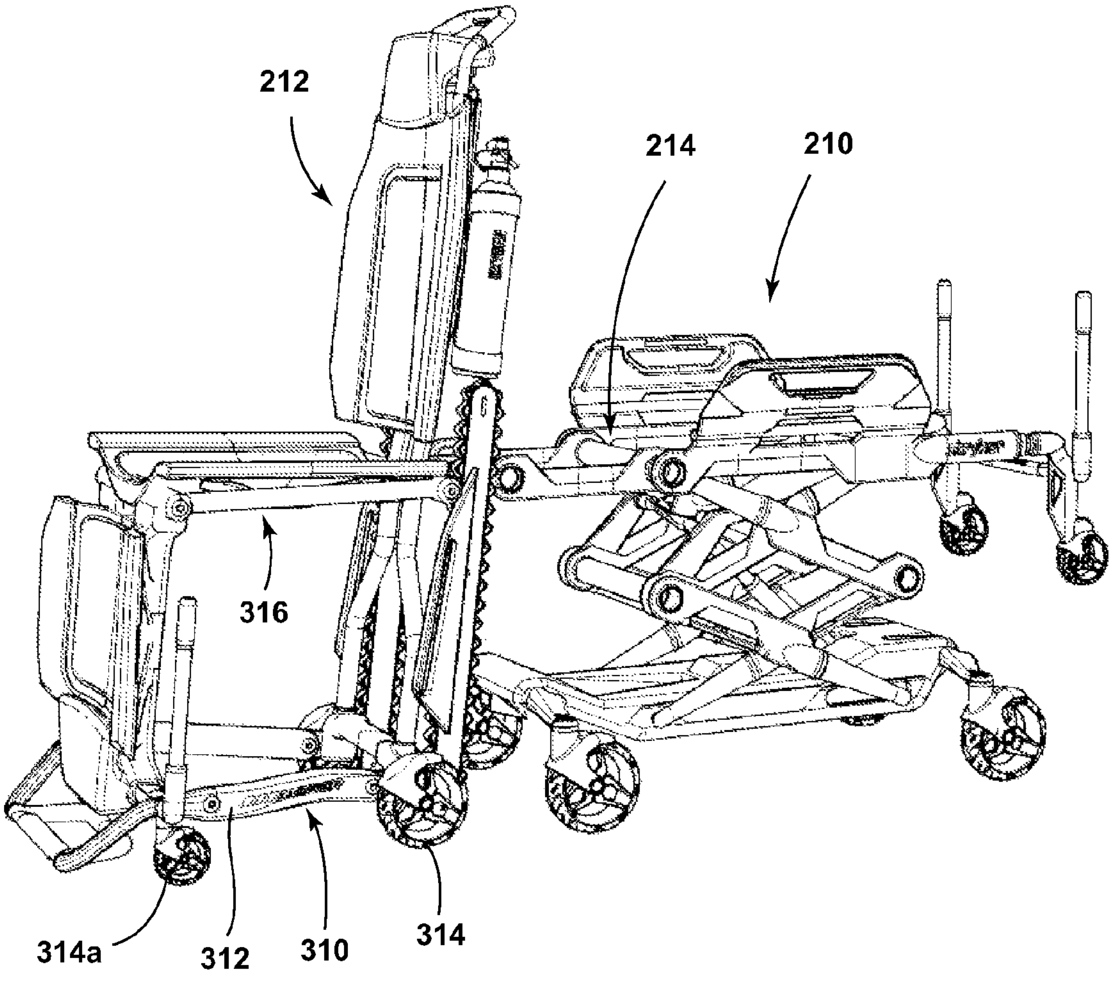
FIG. 26 is another perspective view of the transport apparatus in the configuration shown in FIG. 23 with the litter deck removed and transferred to a stair chair frame in a chair configuration to form a transport apparatus system.

Referring to FIG. 26, the numeral 310 generally designates a stair chair frame with a base 312, which supports a plurality of rear and forward casters 314, 314*a* and further which supports seat frame 316 on which the litter deck 212 which, after being decoupled from frame 214 of support apparatus 210, can be coupled to thereby transfer the litter deck from apparatus 210 to stair chair frame 310 and thereby form a chair transport apparatus 350 in the form of a stair chair transport apparatus. In this manner, apparatus 210 and apparatus 350 form a transport system 200 to provide increased versatility.

Figure 27:
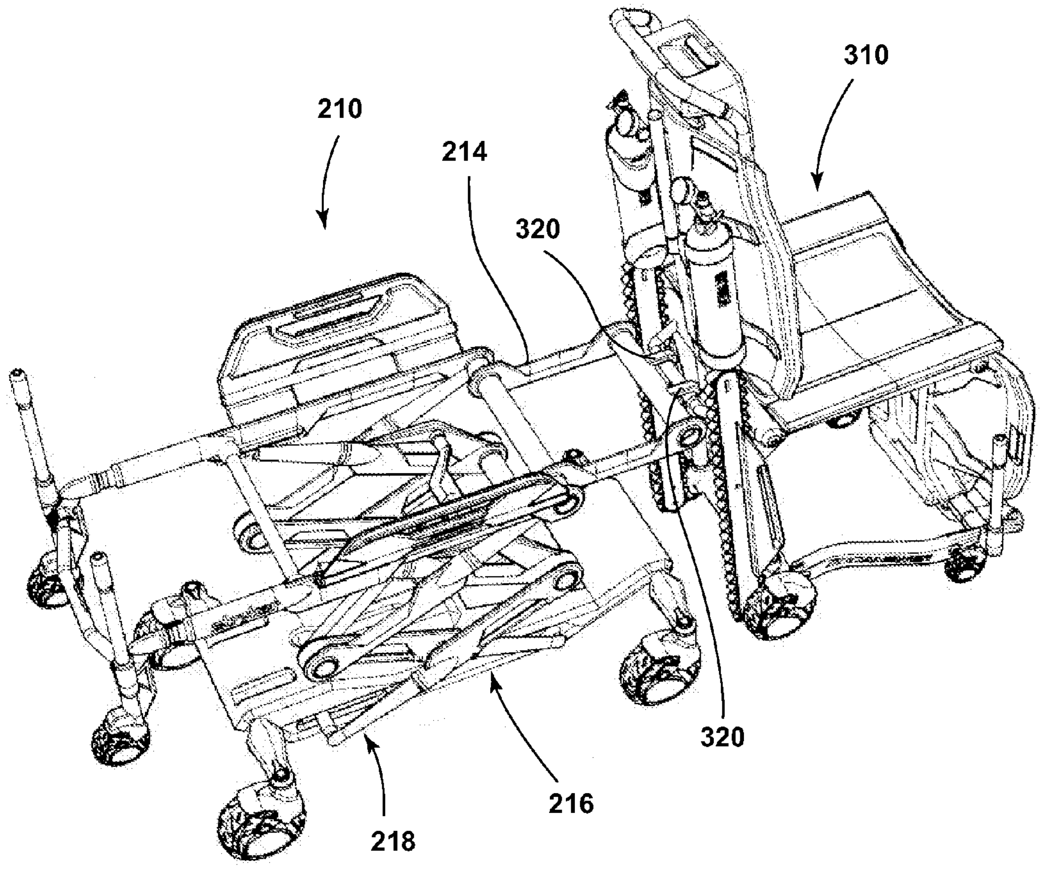
FIG. 27 is another perspective view of the transport apparatus in the configuration shown in FIG. 26.

For example, the transport apparatus 210 may be positioned in its cot configuration such as shown in FIG. 26 and FIG. 25, and placed adjacent to the frame of stair chair frame 310, such as shown in FIG. 26, for example, at the foot end of frame 214. Optionally, as best seen in FIGS. 27 and 29, transport apparatus 210 includes a pair of projecting engagement structures 320, for example, hooks for engaging a rearwardly extending transverse bar 322 mounted to the back of frame 316 of stair chair frame 310. When engaged with bar 322, engagement structures 320 thereby couple the stair chair 310 to transport apparatus 210. Optionally, once coupled and docked, the respective sections of litter deck 212 may be released from engagement with frame 214 of transport apparatus 210 and thereafter moved either as an assembly or individually and then mounted to the respective portions of frame 316 of stair chair frame 310.

Alternately, frame 310 of stair chair apparatus 350 may be tilted so that the deck sections support may be transferred over from apparatus 210 to stair chair frame 310 as an assembly in a sliding or rolling fashion, by way of bearings or bearing surfaces (provided on the respective frames) or the like so that deck 212 may be simply passed over the foot end of frame 214 and onto the head end of frame 310. Once properly positioned, deck 212 may then be coupled to the respective sections of the frame. Suitable reliable mounting mechanisms may include spring loaded or over center clamps.

Another method may include removing the tracks of stair chair frame 310 first, to provide a less obstructed path between frames 214 and 310. With their removal, the chair frame may need not be tilted and instead simply coupled to the end of frame 214 by hooks 298 again so that the deck sections may be transferred over from apparatus 210 to stair chair frame 310 as an assembly.

Figure 30:
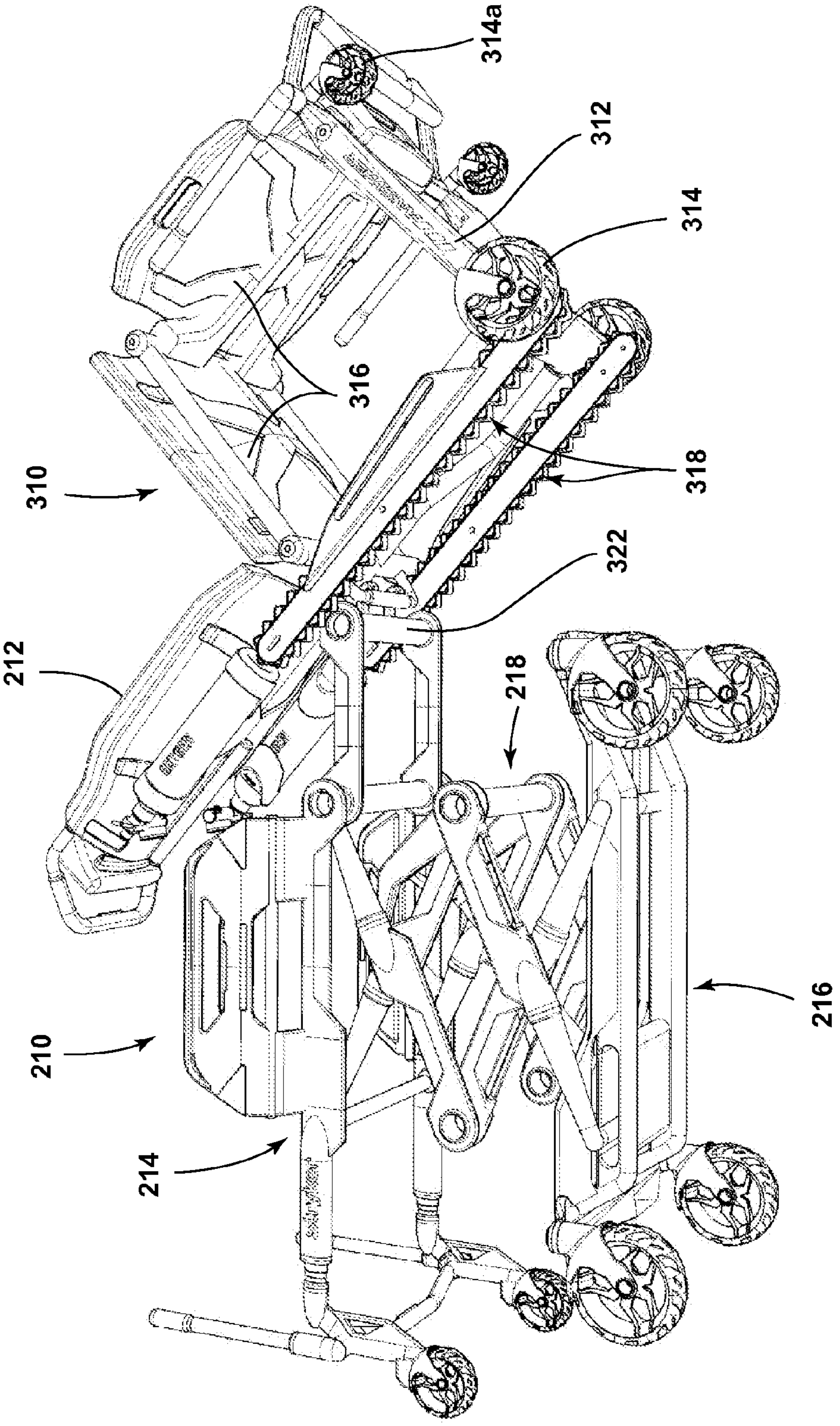
FIG. 30 is a perspective view of another embodiment of the stair chair that mounts onto the base of a cot to form a transport apparatus system.
Figure 31:
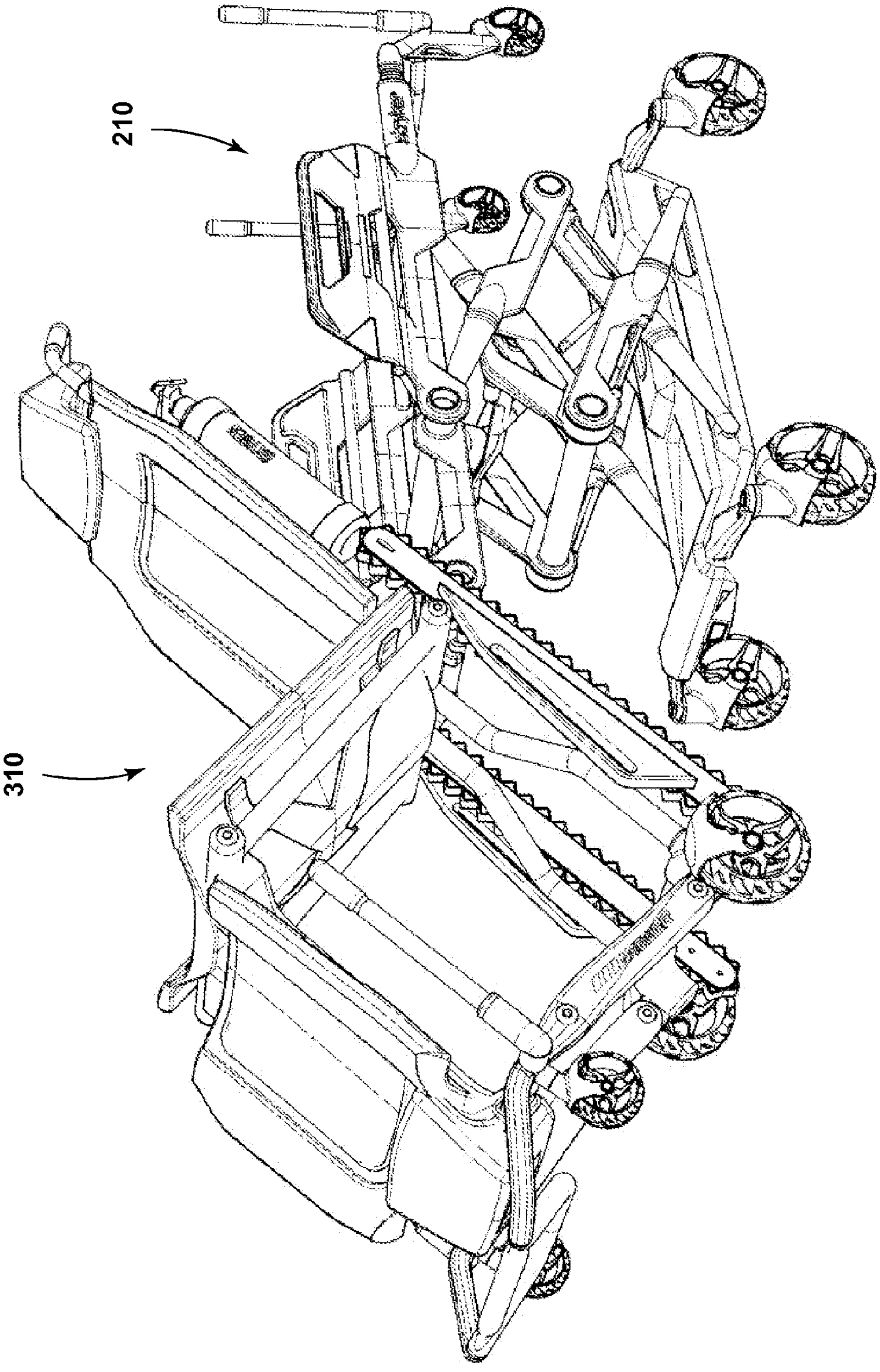
FIG. 31 is another perspective view of the transport apparatus system of FIG. 30.
Figure 32:
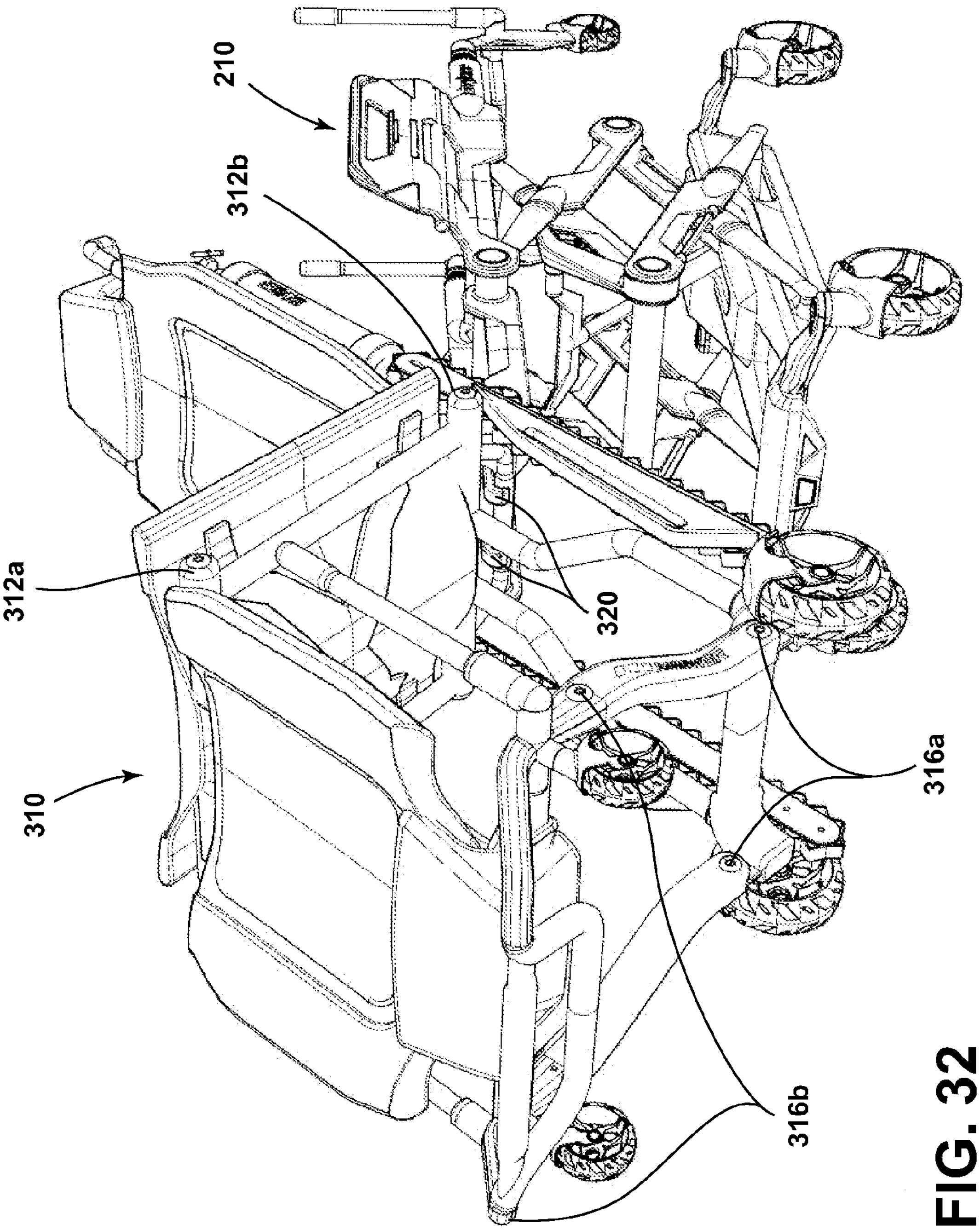
FIG. 32 is another enlarged perspective view of the transport apparatus system of FIG. 30.
Figure 33:
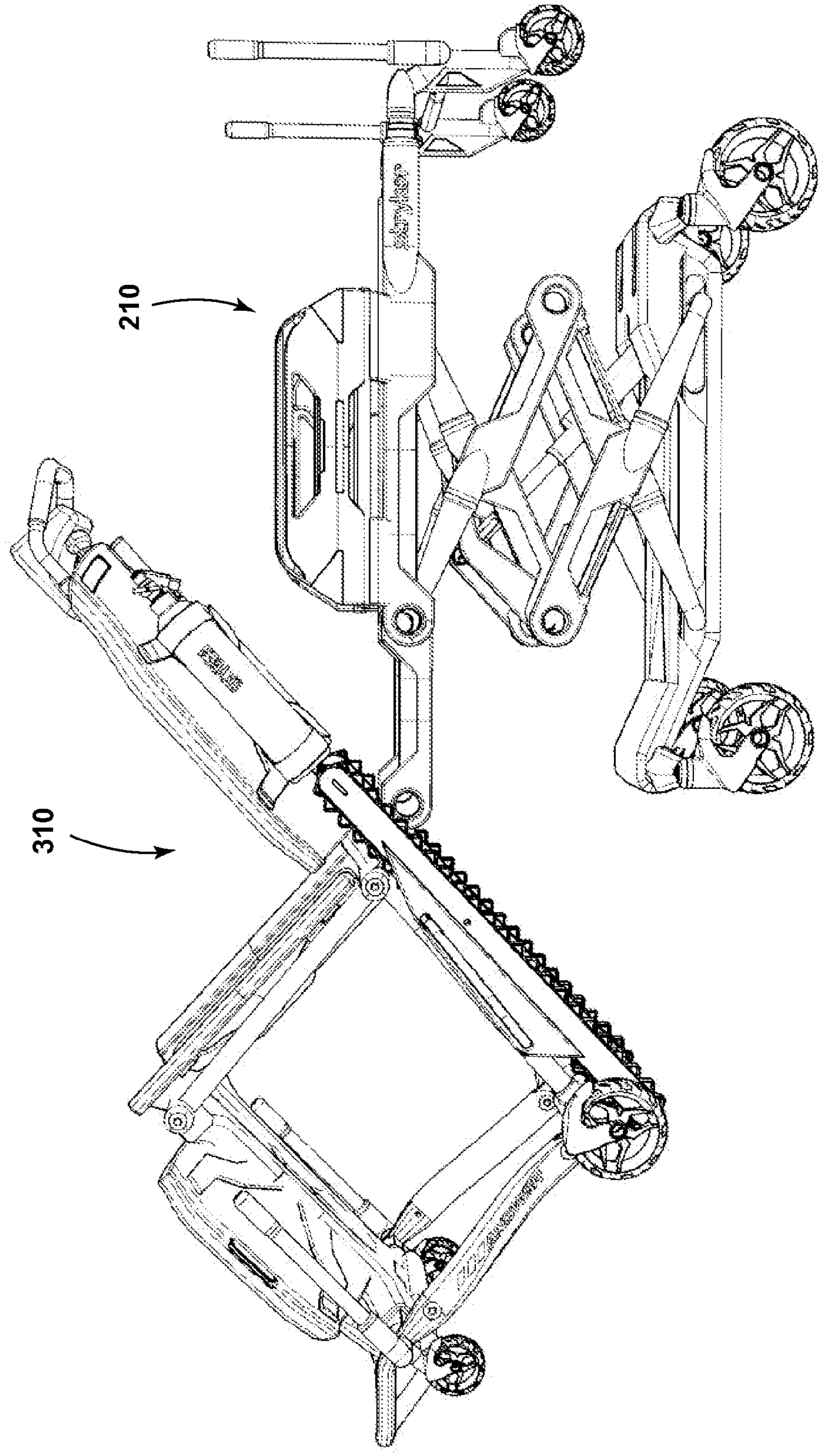
FIG. 33 is a side elevation view of the transport apparatus system of FIG. 30.
Figure 34:
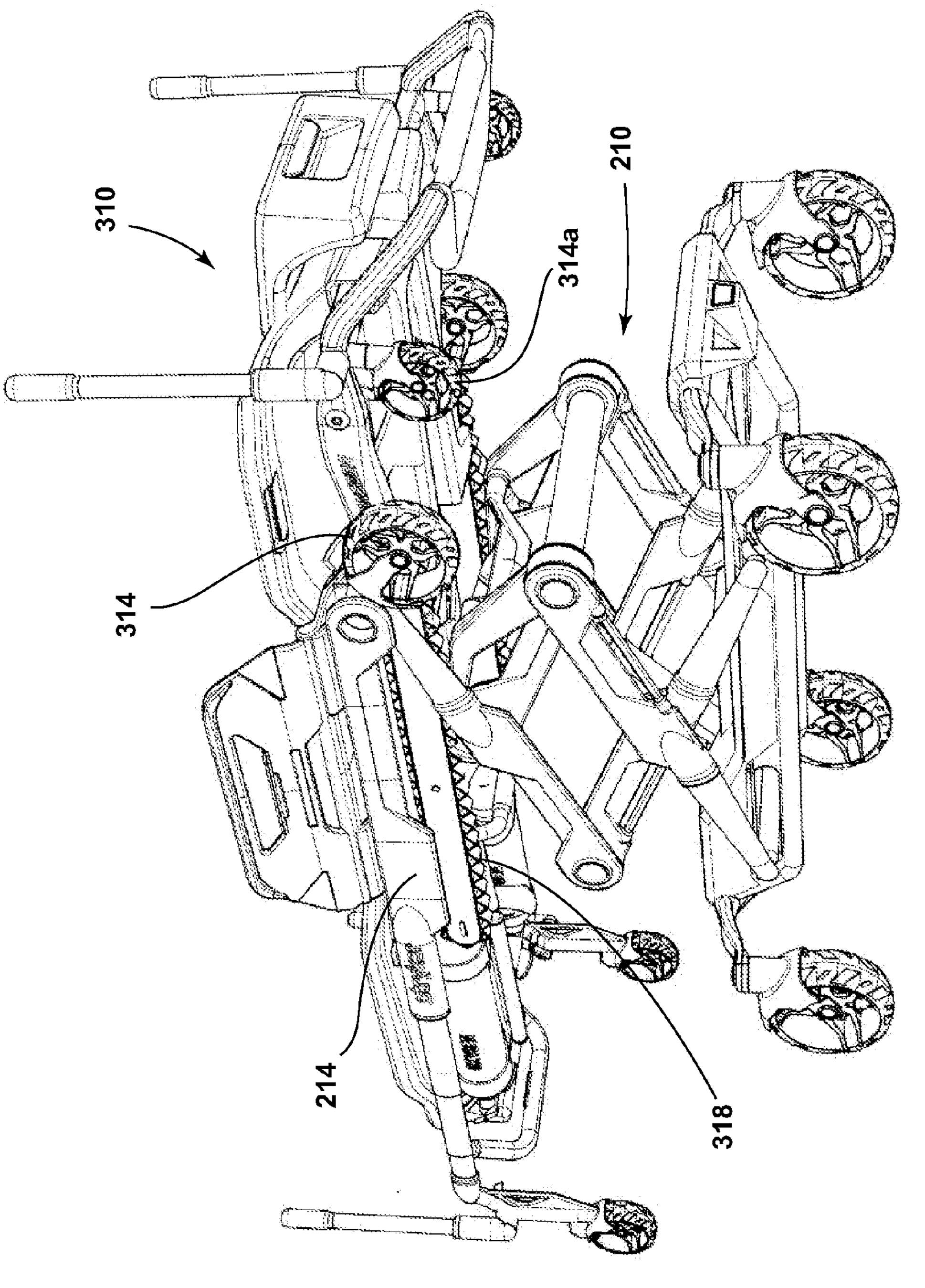
FIG. 34 is a bottom perspective view of the transport apparatus system of FIG. 30 showing the deck in a cot configuration.
Figure 35:
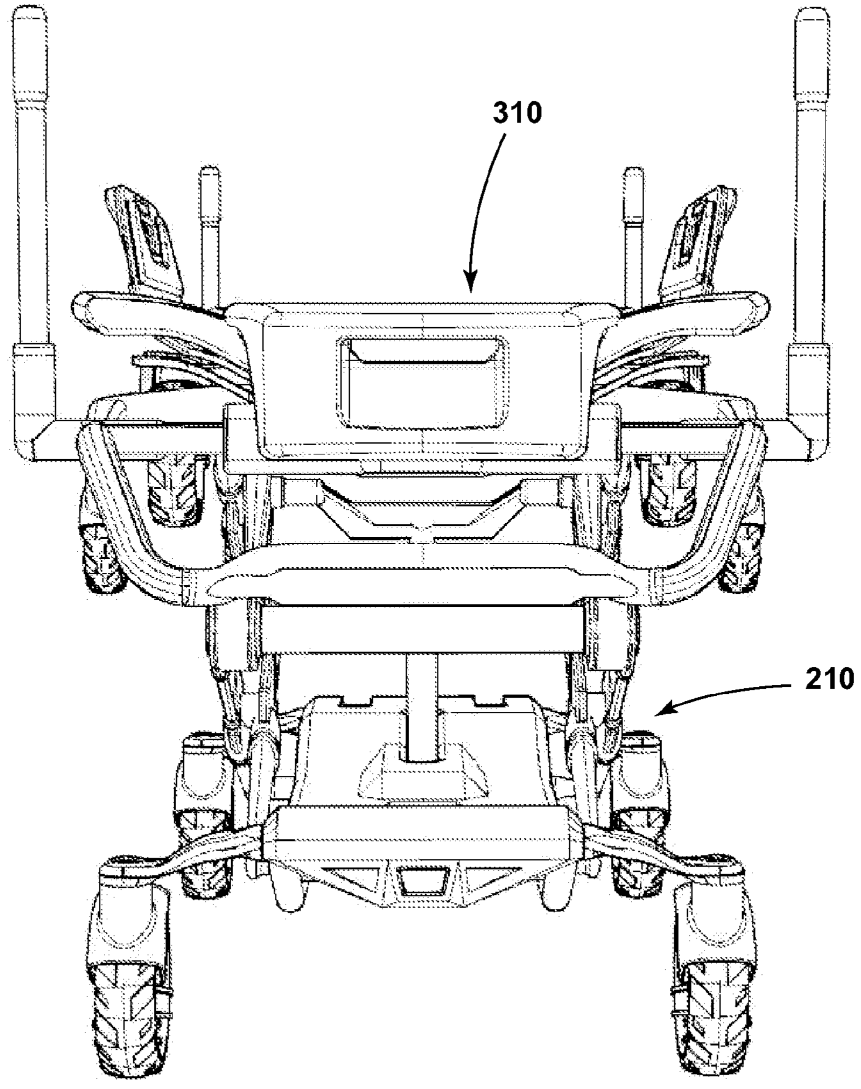
FIG. 35 is a front elevation of the transport apparatus system of FIG. 30.
Figure 36:
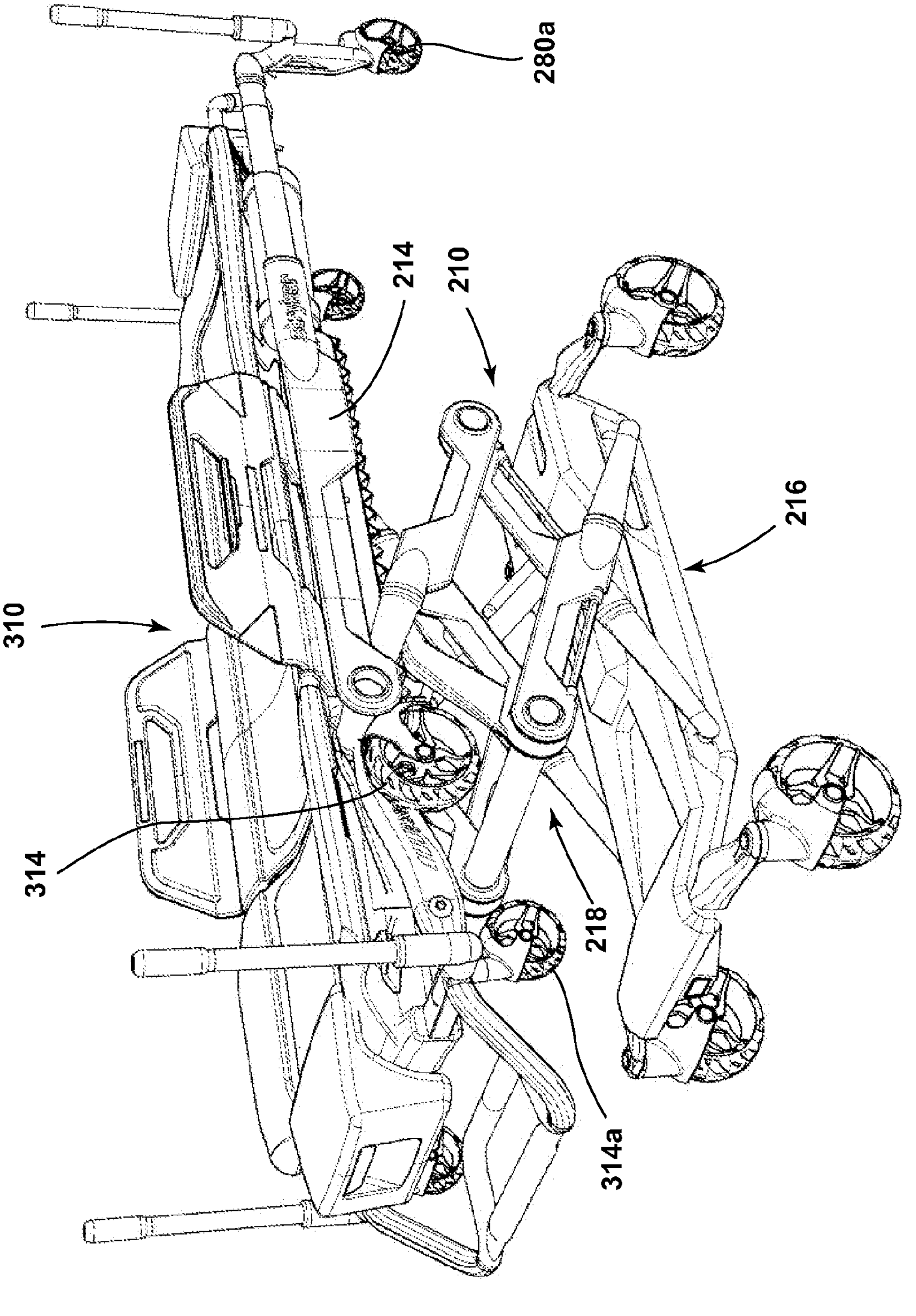
FIG. 36 is a side perspective view of the transport apparatus system of FIG. 30.
Figure 37:
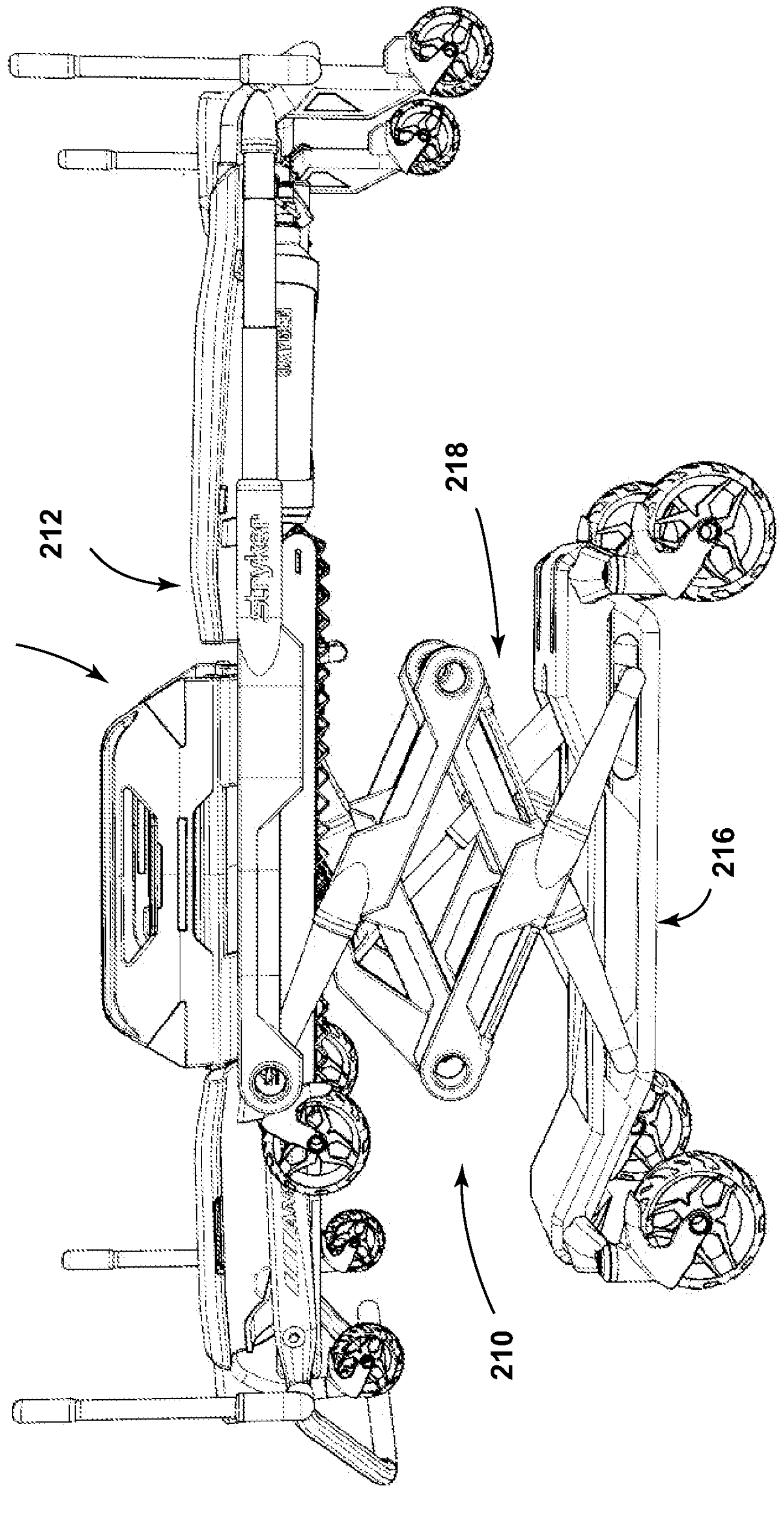
FIG. 37 is another side view of the transport apparatus system of FIG. 30.

In yet another form, as best understood from FIGS. 30-39, apparatus 350 may be moved onto base 214 of apparatus 210 and reconfigured into a collapsed state to form the litter deck for apparatus 210. Referring to FIG. 30, when hooks 320 are engaged with transverse bar 322, mounted to the back of stair chair frame 310, stair chair frame 310 may be lifted and pivoted (FIG. 30-33). Once apparatus 350 is sufficiently tilted over frame 214, the stair chair frame 310 and deck may be collapsed by folding frame 310 about its releasable hinged connections 316*a* and 316*b*. In its collapsed state as shown in FIG. 34, the sections of deck 212 can pivot about its hinged connections 312*a*, and 312*b*, can lay in a generally horizontal configuration along with frame 310 and tracks 318.

Figure 28:
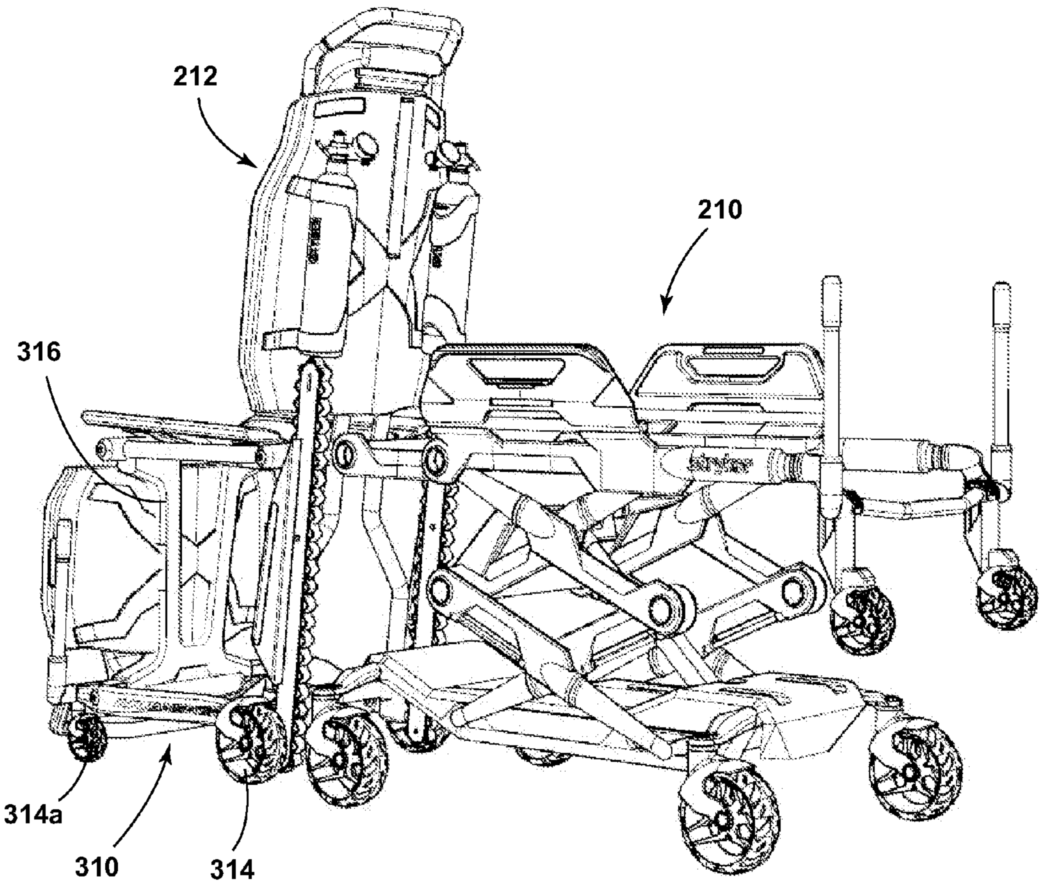
FIG. 28 is another perspective view of the transport apparatus in the configuration shown in FIG. 26.

Further the tracks may facilitate the transfer of stair chair apparatus 350 onto apparatus 210 and/or removal of apparatus 350 from transport apparatus 210. After the apparatus 350 is then transferred off frame 214 of transport apparatus 210, it may then be reconfigured in a stair chair configuration such as shown in FIGS. 27-29.

Figure 38:
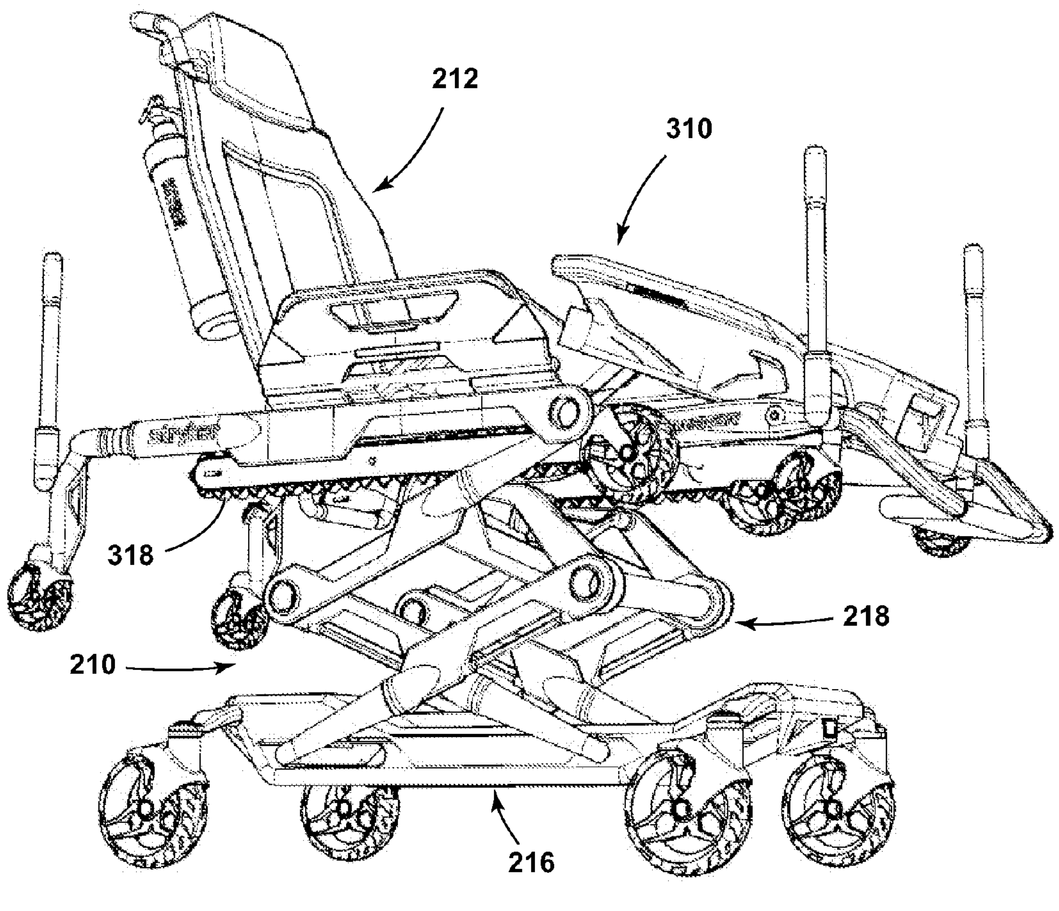
FIG. 38 is another perspective view of the transport apparatus system of FIG. 30 showing the deck in a chair configuration.
Figure 39:
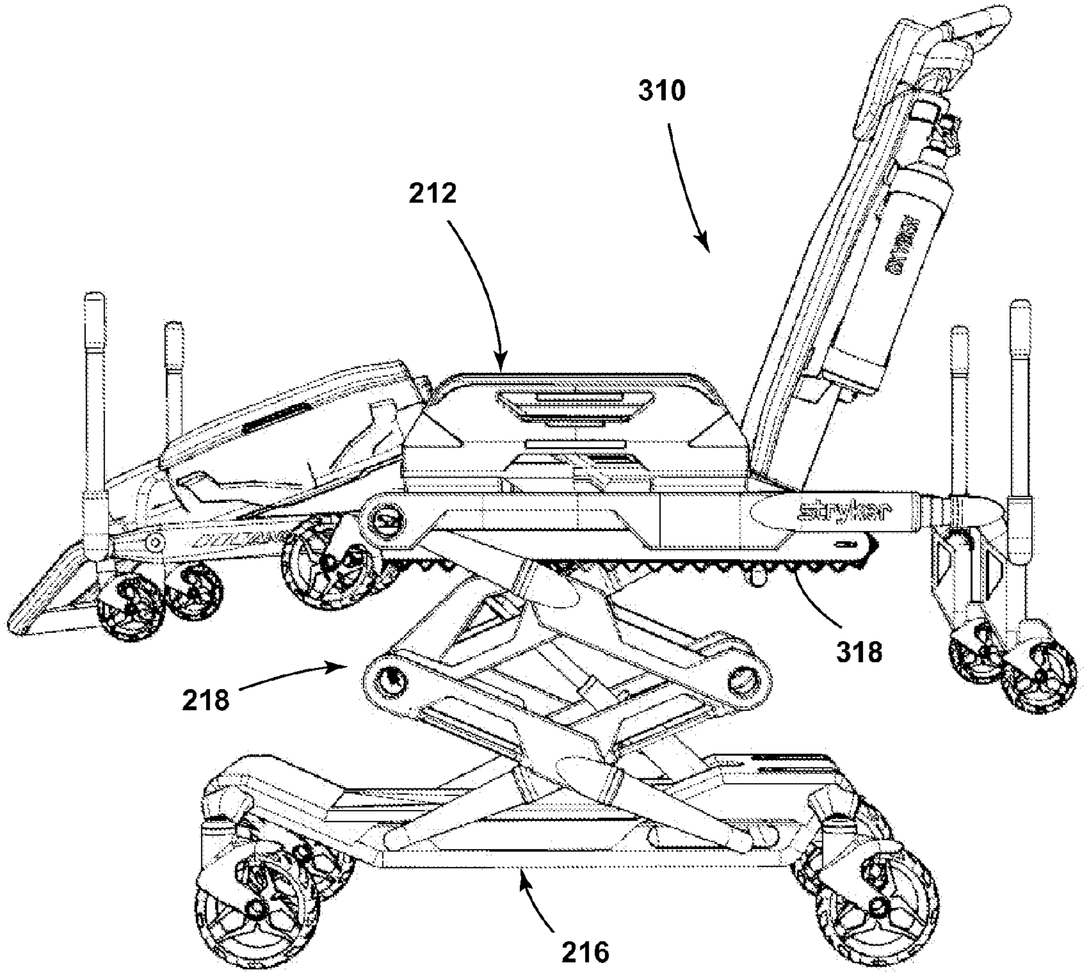
FIG. 39 is another side elevation view of the transport apparatus system of FIG. 30 shown in a configuration for supporting a patient in a seated position.

As will be more fully described below, to facilitate the transfer of a deck section or apparatus 350 onto apparatus 210 either the deck section or respective frames may incorporate rollers, bearings, segmented channels, or a carriage onto which the tracks of the stair chair can be guided. Once mounted to the cot base, the deck may be positioned in a cot configuration as shown in FIGS. 34-37, or in a seated configuration such as shown in FIGS. 38 and 39.

To facilitate the transfer of apparatus 350 onto and off cot base 214, apparatus 350 may include hand holds, in the form of tubular handles at each of its head end and foot end. Further, to increase the length of the deck, deck 212 of apparatus 350 (similar to the previous embodiment) may include extendible foot and head rests. For details of how they could be mounted, reference is made to the description above.

In this manner, a single deck may be used both on a cot base and/or on a stair chair base. Furthermore, when the deck is moved as an assembly, with or with the entire stair chair structure, a person supported on the deck may also be transferred.

As described above, a transport apparatus system may be provided that offers different modes of transportation of a person, including transportation of a person in a supine position, such as on a cot, or in a seated position, such as on a transport chair by simply transferring the support surface from one apparatus to the other apparatus. Or as described, one apparatus may be mounted on a second apparatus and then reconfigured to form the support surface of the second apparatus. Further examples of how this can be achieved are illustrated in FIGS. 40 through 55.

Figure 40:
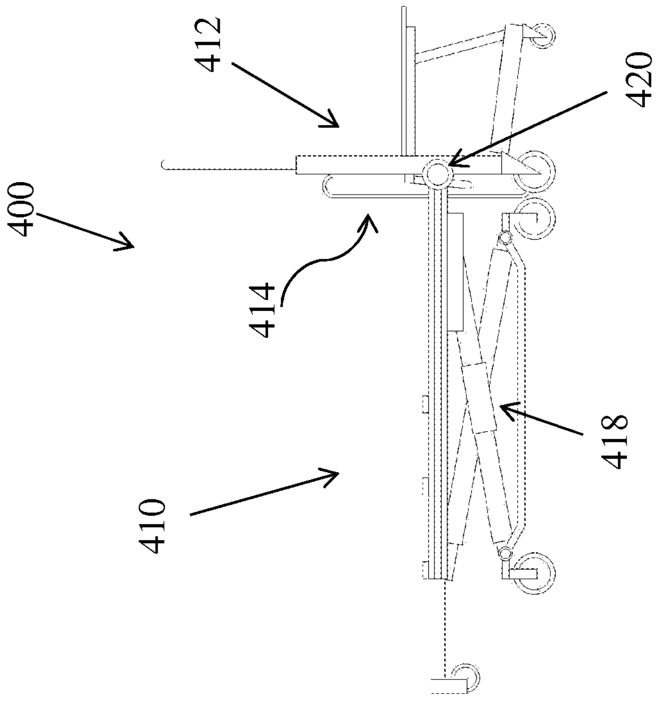
FIG. 40 is a side elevation view of a transport apparatus system.

Referring to FIG. 40, the numeral 400 designates a transport apparatus system which includes at least a first transport apparatus 410 and a second transport apparatus 412. In the illustrated embodiment, apparatus 410 comprises a cot, while apparatus 412 comprises a stair chair apparatus with a track assembly 414, including, for example, a driven track assembly. Although shown with a single X-frame lift mechanism 418, it should be understood that cot 410 may be configured with a double X-frame lift mechanism, such as described above in reference to apparatuses 10 and 210.

Figure 41:
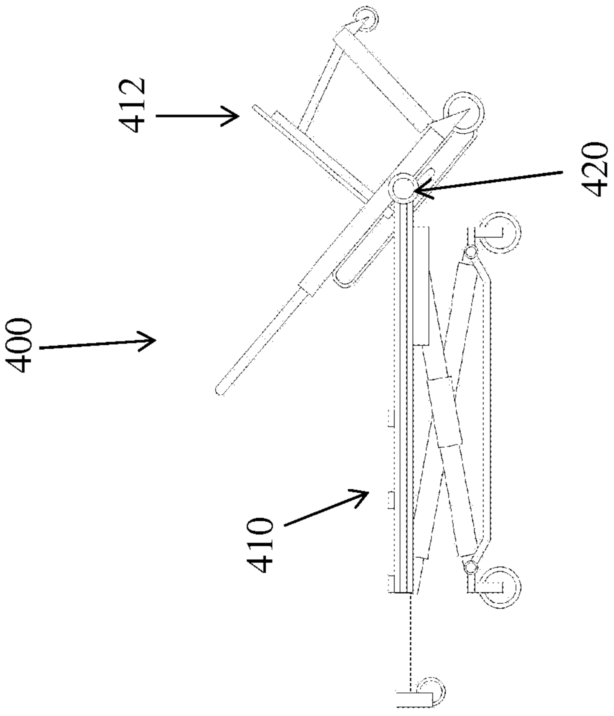
FIG. 41 is another side elevation view of the transport apparatus system of FIG. 40 showing the loading of the transport chair apparatus onto the cot apparatus.

As best understood from FIGS. 40 and 41, a fixed or stationary pivot joint 420 is formed between apparatus 412 and 410 to facilitate loading of apparatus 412 onto apparatus 410. For example, pivot joint 420 may be formed by hooks mounted to the frame of apparatus 410 which engage a corresponding bar mounted to the back of apparatus 412, such as described above in reference to FIG. 29. Alternately, the pivot joint may be formed by one or more sliding or pivoting or retractable rods formed or mounted on one apparatus that extend into corresponding receptacles, such as bushings, formed on or mounted to the other apparatus. The receptacles may also be movably mounted between an operative position and stowed position. In this manner, the components forming the joint may be retractable and stowable in either or both apparatuses. Further, the rods or bushings may be biased, for example, by a spring, in their stowed positions. Similar to the connection illustrated in FIG. 29, pivot joint 420 may be located inwardly of the respective tracks of the track assembly. Alternately, pivot joint 420 may straddle the track assembly.

Optionally pivot joint 420 provides a stationary pivotal coupling between the respective apparatuses over a defined range of motion of apparatus 412 but may be configured to release the coupling once apparatus 412, for example, has been mounted to apparatus 410 and tilted and loaded sufficiently, for example, so that at least most of its weight, or at least the center of gravity of apparatus 412, will be over apparatus 410.

Figure 43:
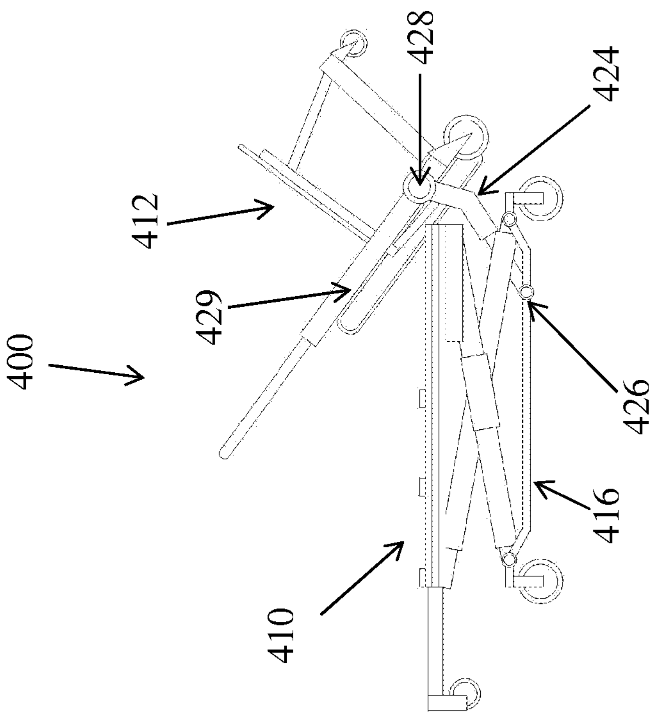
FIG. 43 is a side elevation view of the transport apparatus system of FIG. 42 showing the loading of the transport chair apparatus onto the cot apparatus.
Figure 42:
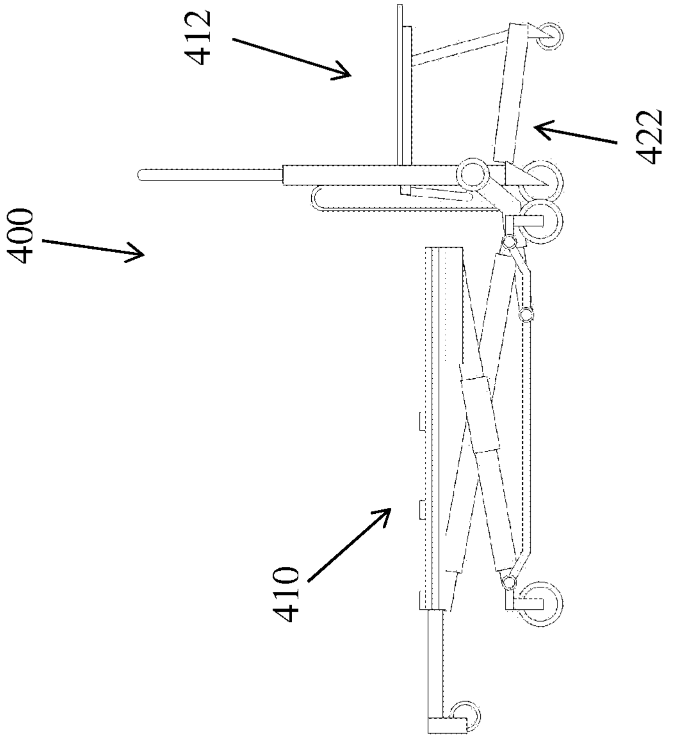
FIG. 42 is a side elevation view of another embodiment of a transport apparatus system.

Referring to FIGS. 42 and 43, apparatuses 410 and 412 may be joined by a moving pivot joint 422. In the illustrated embodiment, moving pivot joint 422 is formed by a linkage 424, which is pivotally mounted on one end 426 to apparatus 410, for example, to base 416 and pivotally mounted at its opposed end to apparatus 412, for example to frame 429. In this manner as apparatus 412 is raised, linkage 424 will pivot about end 426 to allow apparatus 412 to then be placed on top of apparatus 410. Further, the linkage may incorporate a force producing device, such as a spring or cylinder, to assist by reducing the force needed to move apparatus.

Figure 45:
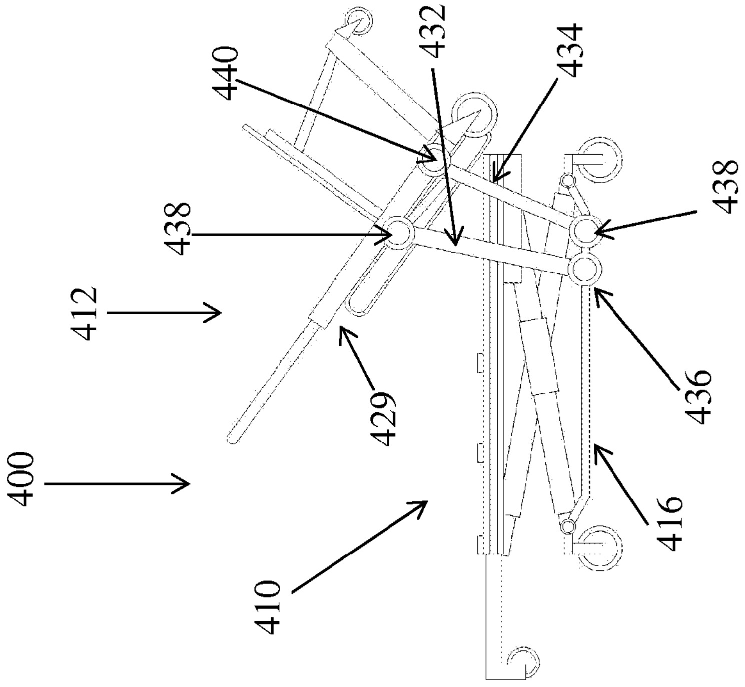
FIG. 45 is a side elevation view of the transport apparatus system of FIG. 44 showing the loading of the transport chair apparatus onto the cot apparatus.
Figure 44:
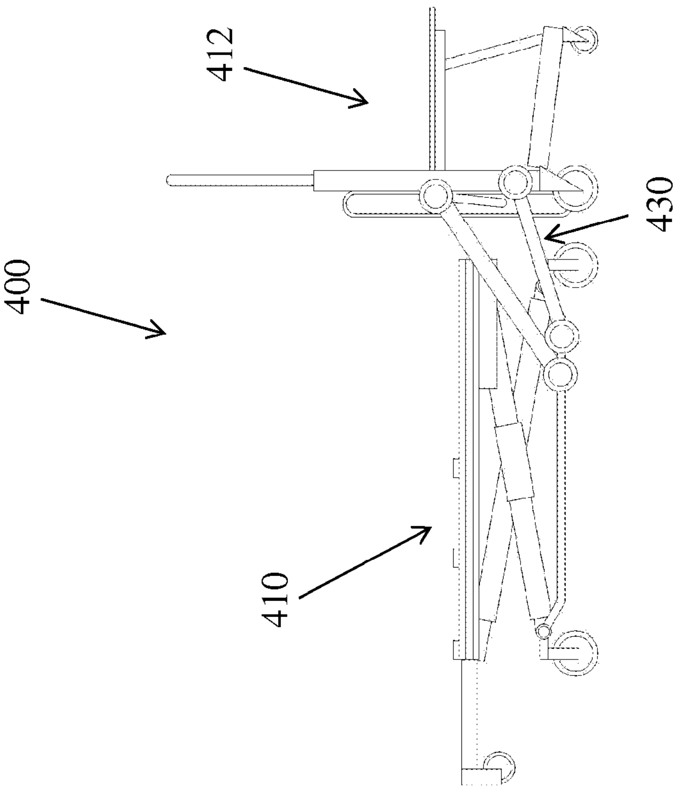
FIG. 44 is a side elevation view of another embodiment of a transport apparatus system.
Figure 47:
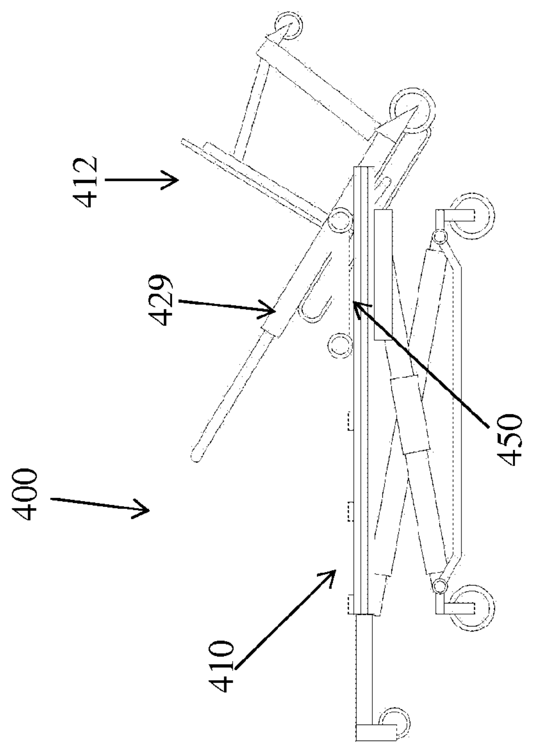
FIG. 47 is a side elevation view of the transport apparatus system of FIG. 46 showing the loading of the transport chair apparatus onto the cot apparatus.
Figure 46:
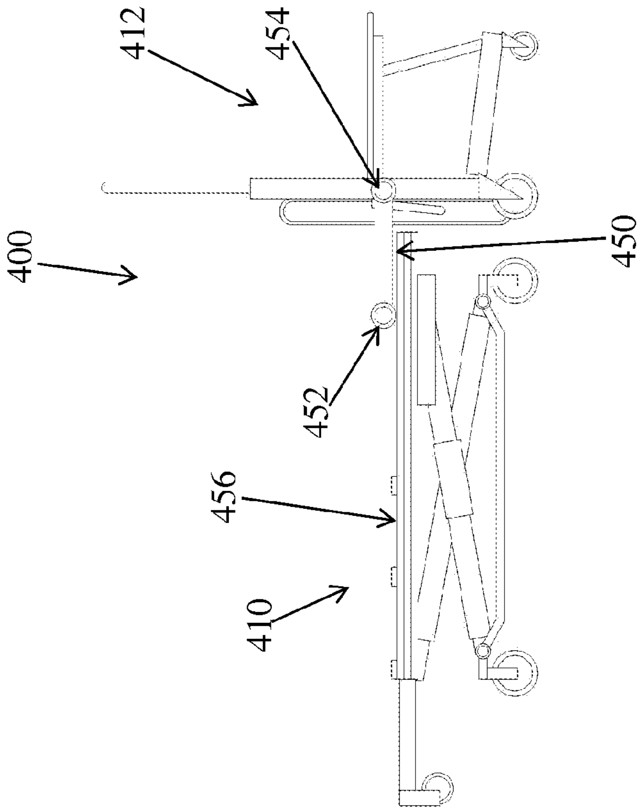
FIG. 46 is a side elevation view of another embodiment of a transport apparatus system.

Referring to FIGS. 44 and 45, apparatuses 410 and 412 may be joined by a four-bar linkage assembly 430. Four-bar linkage assembly 430 includes two linkages 432 and 434, each with a first end 436, 438 pivotally mounted to apparatus 410, for example, to base 416, and opposed second ends 438 and 440, which are pivotally mounted to apparatus 410, for example to frame 429. Further, one or both linkages may incorporate a force producing device, such as a spring or gas cylinder or an electric linear actuator, to assist by reducing the force needed to move apparatus 412 or to move apparatus 412.

Referring to FIGS. 44 and 45, alternately apparatuses 410 and 412 may be coupled by a translating frame 450. Frame 450 can be used to facilitate the loading of apparatus 412 onto apparatus 410 by simply providing a guide for apparatus 412. Further, frame 450 may be powered to at least reduce some of the force required to load of apparatus 412 onto apparatus 410. Frame 450 may be movably coupled on one end 452 to frame 456 of apparatus 410 and pivotally mounted at its opposed end 454 to apparatus 412, for example to frame 429 of apparatus 410. Optionally, end 452 of frame 450 may be slidingly mounted to frame 456 and, for example, received in a pair of spaced apart channels supported or mounted to the frame 456. Frame 450 may also be coupled to a force producing device, such as a spring or gas cylinder or an electric linear actuator, for example, which is mounted in frame 456 which when, for example, contracted pulls on frame 456 assists in moving apparatus 412 or moves apparatus 412 along apparatus 410. Alternately, the force producing device may be arranged to selectively push frame 450 along frame 456.

Figure 49:
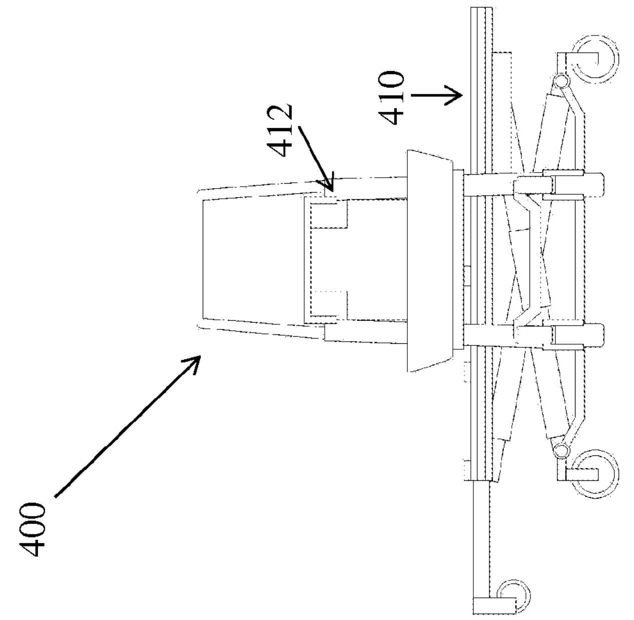
FIG. 49 is another side elevation view of the transport apparatus system of FIG. 48 showing the loading of the transport chair apparatus onto the cot apparatus.
Figure 48:
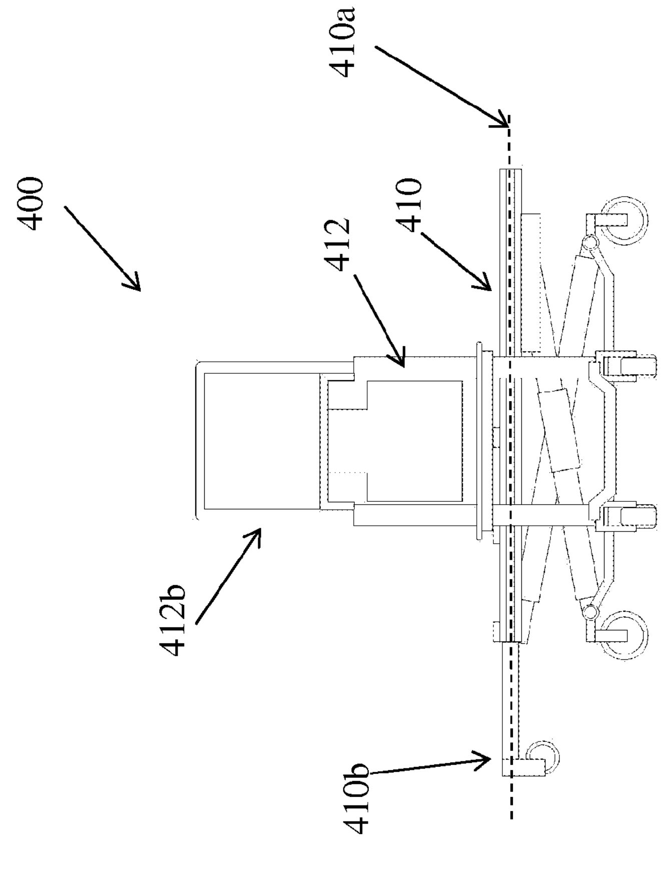
FIG. 48 is a side elevation view of another embodiment of a transport apparatus system.
Figure 51:
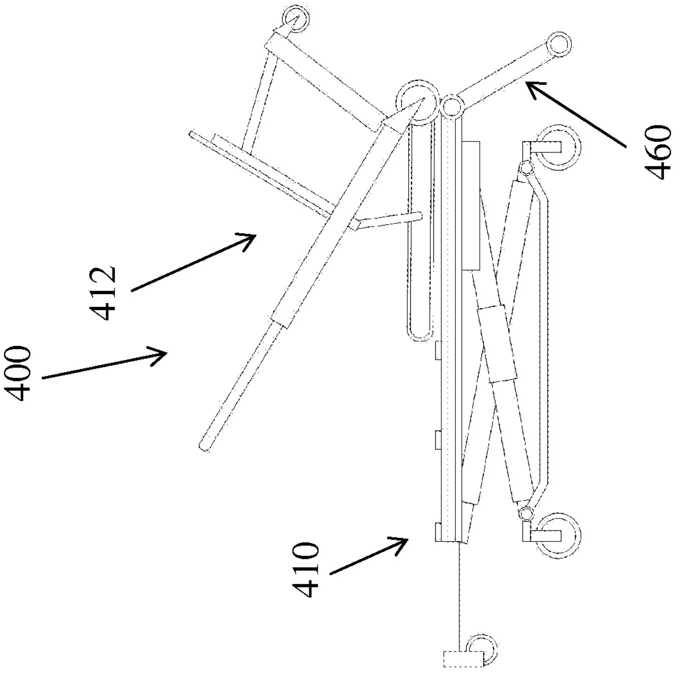
FIG. 51 is a side elevation view of the transport apparatus system of FIG. 50 showing the loading of the transport chair apparatus onto the cot apparatus.

While each of the pivot joints or linkages are illustrated at, for example, the foot end of apparatus, it should be understood that they may be located at a side of the apparatus instead. Referring to FIGS. 48 and 49, when located at the side, apparatus 412 can be initially loaded so that apparatus 412 will be raised so that it is essentially pit is perpendicular to the longitudinal axis 410*a* of apparatus 410 (see FIG. 49) but thereafter will require turning so that the head end 412*b* of the apparatus 412 will be aligned with the head end 410*b* of apparatus 410. Turning can be achieved manually or may be assisted. For example, the pivot joint or linkages may be configured to allow or assist in initially raising apparatus 412 but thereafter will pivot or articulate to allow turning of apparatus 412 so that the head end 412*b* of the apparatus 412 will be aligned with the head end 410*b* of apparatus 410.

Figure 50:
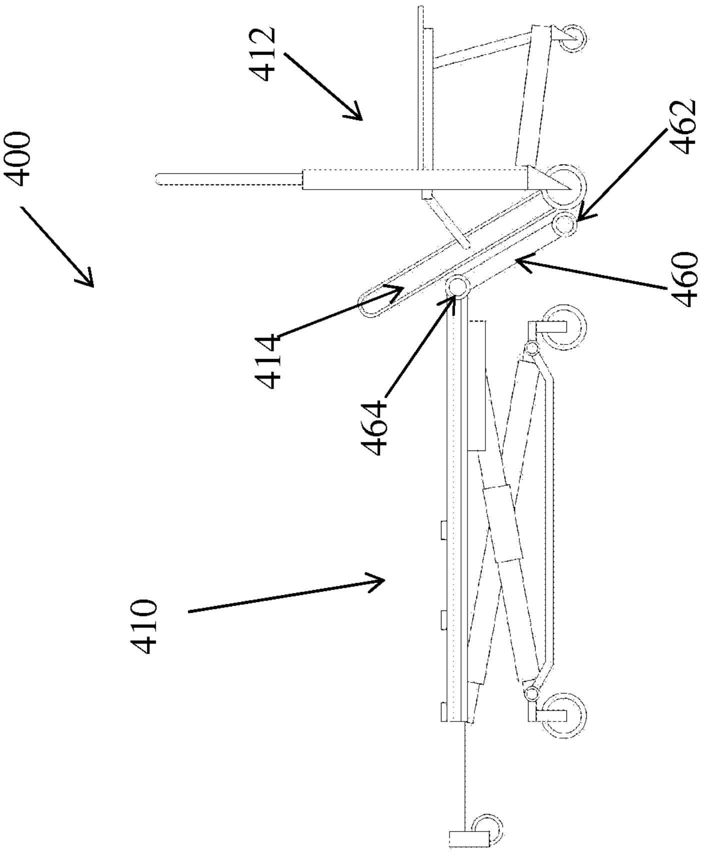
FIG. 50 is a side elevation view of another embodiment of a transport apparatus system.
Figure 53:
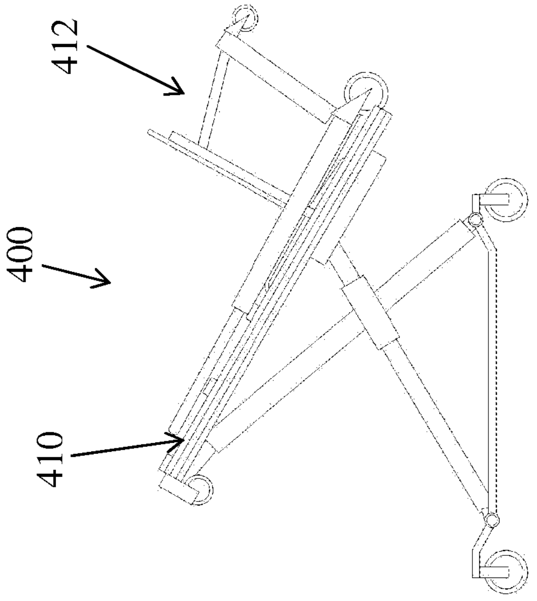
FIG. 53 is a side elevation view of the transport apparatus system of FIG. 52 showing the loading of the transport chair apparatus onto the cot apparatus.
Figure 52:
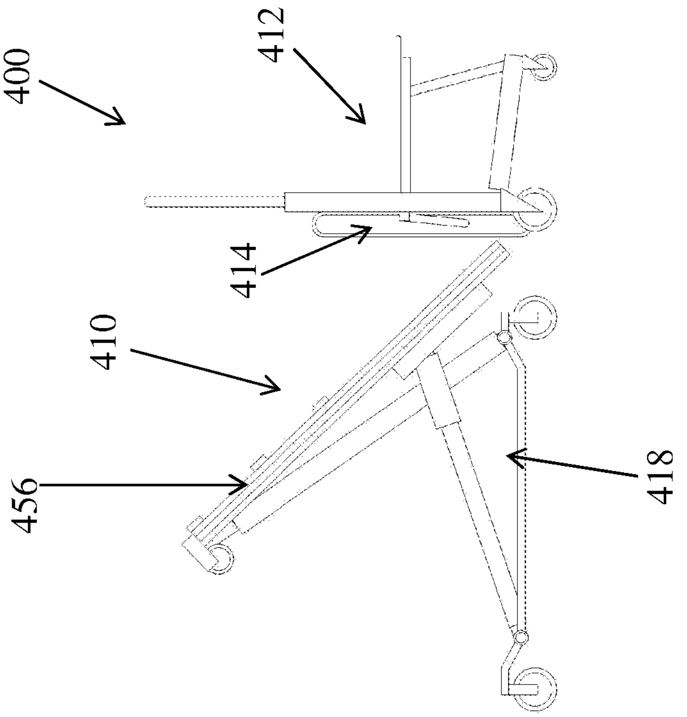
FIG. 52 is a side elevation view of another embodiment of a transport apparatus system.

Referring to FIGS. 50 and 52, apparatuses 410 and 412 may be configured to allow apparatus 412 to be driven onto apparatus 410. For example, apparatus 410 may include a ramp 460, with one end 462 extended for engaging the ground and its opposed end pivotally mounted to apparatus 410 for example at the foot end of frame 456. In this manner ramp 460 may be deployed to load apparatus 412 onto apparatus 410 and then moved to stowed position, for example, either underneath the deck support frame or on top of the deck support frame. Alternately, ramp 460 may be slidably mounted via its pivot connection in a receptacle or sleeve formed in frame 456 so that it can slide into frame 456 for storage. In this manner, track 414 (whether a driven track or not) may be used to facilitate loading of apparatus 412 onto apparatus 410. Alternately, as shown in FIGS. 52 and 53, instead of a ramp, apparatus 410 may be tilted using lift mechanism 418 so that apparatus 412 may be driven onto frame 456 of apparatus 410 using track 414.

Figure 55:
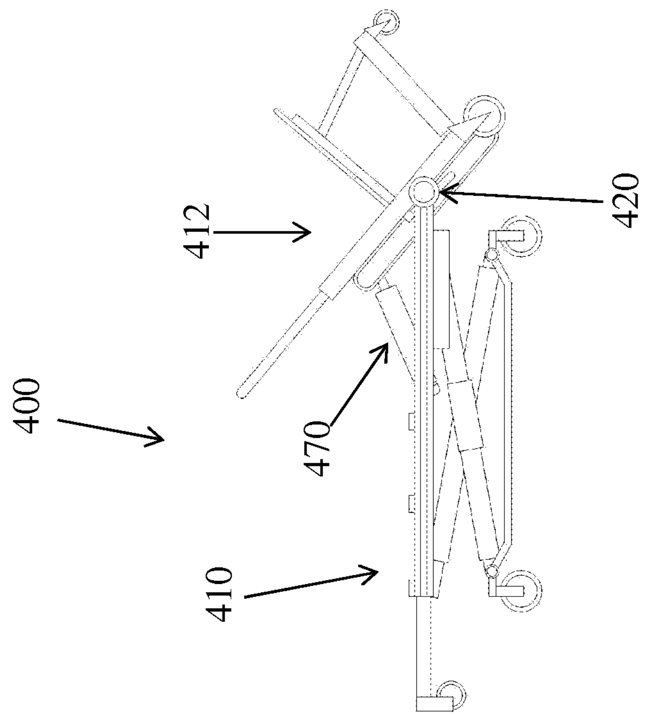
FIG. 55 is a side elevation view of the transport apparatus system of FIG. 54 showing the loading of the transport chair apparatus onto the cot apparatus.
Figure 54:
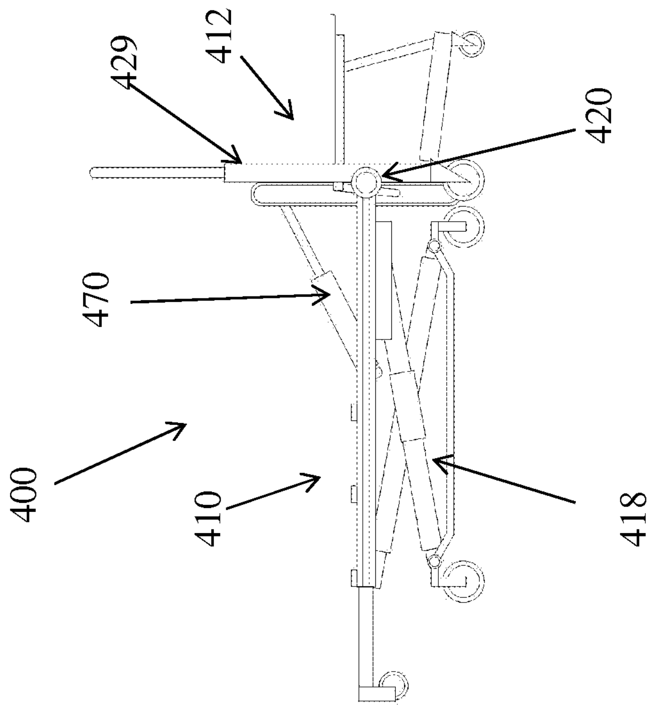
FIG. 54 is a side elevation view of another embodiment of a transport apparatus system.

As noted above, several of the pivot assemblies or linkage assemblies may be powered. Referring to FIGS. 54 and 55, apparatus 410 may include a deployable force producing device 470, such as a gas cylinder or a linear actuator, to reduce the force needed to move apparatus 412. In the illustrated embodiment, force producing device 470 comprises a linear actuator that is pivotally mounted on one end, for example to frame 456 of apparatus 410, and pivotally mounted at its opposed end to apparatus 412, for example at frame 429. In this manner, apparatus 412 may be pivoted about pivot joint 420 by force producing device 470 over at least a specified range of motion where thereafter the force producing device 470 can be disconnected from apparatus 412 to return it to its stowed position, for example within frame 456. Optionally, force producing device 470 may comprise one of the lift actuators for lift mechanism 418. For example, force producing device 470 may be disconnected from its operative position within the lift mechanism for use in moving apparatus 412 and then returned to its operative position once apparatus 412 is sufficiently loaded onto apparatus 410. For example the term “sufficiently loaded” may include where the center of gravity of apparatus 412 is aligned over frame 456 of apparatus 410.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles “a,” “an,” “the” or “said,” is not to be construed as limiting the element to the singular. Directional terms, such as “vertical,” “horizontal,” “top,” “bottom,” “upper,” “lower,” “inner,” “inwardly,” “outer” and “outwardly,” are used to assist in describing the invention based on the orientation of the embodiments shown in the illustrations. The use of directional terms should not be interpreted to limit the invention to any specific orientation(s).

The embodiments of the invention in which an exclusive property or privilege is claimed are defined as follows:

1. A transport apparatus comprising:

a base;

a frame;

a lift mechanism supporting said frame on said base; and a litter deck for supporting a patient, said litter deck having an articulatable back section and an additional section, said litter deck adapted to be reconfigured between first and second configurations, said litter deck being adapted to be removably mounted to said frame, when mounted to said frame said lift mechanism located between said litter deck and said base, and said litter deck being adapted to be at least partially supported by said base while said litter deck is in said first configuration and while being reconfigured between said first and second configurations wherein said base comprises a first base, said transport apparatus system further comprising a second base, after being removed from said first base said litter deck being adapted to be removably supported by said second base.

2. The transport apparatus according to claim 1, wherein said first configuration comprises a chair configuration.

3. The transport apparatus according to claim 1, further comprising a track, said track mounted relative to said litter deck, and said track being located between said litter deck and said frame when said litter deck is in said first configuration and mounted to said frame.

4. The transport apparatus according to claim 1, wherein said lift mechanism comprises an X-frame lift mechanism.

5. The transport apparatus: according to claim 4, wherein said X-frame lift mechanism comprises first and second pairs of X-frames, said first and second pairs of X-frames having telescoping legs to tilt said deck.

6. The transport apparatus according to claim 1, wherein said litter deck has a foot print when in said second configuration, and said lift mechanism being substantially within said foot print of said deck when said litter deck is in said second configuration and is mounted to said frame.

7. The transport apparatus according to claim 1, wherein said additional section comprises a seat section, said frame is coupled to said seat section wherein said back section is independently articulatable with respect to said frame and said lift mechanism.

8. The transport apparatus according to claim 7, wherein said deck has an articulatable leg section.

9. The transport apparatus according to claim 8, wherein said deck includes an extendible head or foot rest to thereby extend the length of said deck.

10. The transport apparatus according to claim 1 wherein said deck is removable from said lift mechanism without disassembly; and said lift mechanism configured to tilt said deck when said deck is mounted to said lift mechanism.

11. The transport apparatus according to claim 10, wherein said additional section comprises a seat section, said frame mounting said lift mechanism to said seat section.

12. The transport apparatus according to claim 11, wherein said deck further includes a leg section articulatable relative to said seat section.

13. The transport apparatus according to claim 11, wherein said lift mechanism comprises an X-frame lift mechanism.

14. The transport apparatus according to claim 13, wherein said X-frame lift mechanism comprises first and second pairs of X-frames.

15. The transport apparatus according to claim 14, wherein each of said first and second pairs of X-frames includes telescoping legs to adjust said angular orientation of said deck.

16. A transport apparatus system comprising:

a first base for forming a part of a first transport apparatus;

a litter frame movably mounted to said first base;

a second base for forming a part of a second transport apparatus;

a litter deck configured to be supported by said second base for supporting a patient thereon, said litter deck reconfigurable between a chair configuration and a cot configuration wherein said litter deck lies in a generally horizontal configuration;

a track mounted relative to said litter deck; and said second base and said litter deck being adapted to be mounted to said litter frame to thereby form a transport apparatus surface for said first transport apparatus.

17. The transport apparatus system according to claim 16, further comprising a lift mechanism supporting said litter frame relative to said first base and for moving said litter frame relative to said first base.

18. The transport apparatus system according to claim 17, wherein said lift mechanism comprises first and second pairs of X-frames, each of said pairs of X-frames having upper ends and lower ends, with the upper ends of said first pair of X-frames pivotally coupled to respective lower ends of the second pair of X-frames.

19. The ambulance apparatus system according to claim 18, wherein one pair of the upper ends of said second pair of X-frames is pinned at said litter frame and another pair of said upper ends of said second pair of X-frames is slidably, pivotally mounted to said litter frame.

20. The transport apparatus system according to claim 19, wherein one pair of the lower ends of said first pair of X-frames is pinned at said first base and another pair of said lower ends of said first pair of X-frames is slidably, pivotally mounted to said first base and is beneath the upper ends of said second pair of X-frames that are slidably, pivotally mounted to said litter frame.

21. The transport apparatus system according to claim 17, wherein said lift mechanism comprises first and second pairs of X-frames, each of said first and second pairs of X-frames having telescoping legs wherein said lift mechanism can tilt said litter deck with respect to said first base when said litter deck is mounted to said litter frame.

22. The transport apparatus system according to claim 16, wherein said litter deck has a seat section and articulatable back and leg sections.

* * * * *